United States Patent
Ho et al.

(10) Patent No.: US 12,464,883 B2
(45) Date of Patent: Nov. 4, 2025

(54) ARTIFICIAL VISUAL SYSTEMS WITH TUNABLE PHOTOCONDUCTIVITY BASED ON ORGANIC MOLECULE-NANOWIRE HETEROJUNCTIONS

(71) Applicant: City University of Hong Kong, Kowloon (HK)

(72) Inventors: Johnny Chung Yin Ho, Shatin (HK); Pengshan Xie, Yau Tsim Mong (HK); Wei Wang, Kowloon (HK); You Meng, Kowloon (HK)

(73) Assignee: City University of Hong Kong, Kowloon (HK)

( * ) Notice: Subject to any disclaimer, the term of this patent is extended or adjusted under 35 U.S.C. 154(b) by 398 days.

(21) Appl. No.: 18/184,287

(22) Filed: Mar. 15, 2023

(65) Prior Publication Data

US 2024/0147743 A1    May 2, 2024

Related U.S. Application Data

(60) Provisional application No. 63/381,158, filed on Oct. 27, 2022.

(51) Int. Cl.
*H10K 30/00*   (2023.01)
*G11C 11/54*   (2006.01)
(Continued)

(52) U.S. Cl.
CPC ......... *H10K 30/671* (2023.02); *G11C 11/54* (2013.01); *H10K 30/10* (2023.02); *H10K 30/60* (2023.02);
(Continued)

(58) Field of Classification Search
CPC ...... H10K 30/671; H10K 30/10; H10K 30/60; H10K 85/113; H10K 85/215; G11C 11/54
See application file for complete search history.

(56) References Cited

U.S. PATENT DOCUMENTS

2021/0175409 A1 *  6/2021  Lee .................. H10N 30/802

FOREIGN PATENT DOCUMENTS

CN          114927620 A  *  8/2022  ............. B82Y 40/00

OTHER PUBLICATIONS

D. Yang, X. Zhang, K. Wang, C. Wu, R. Yang, Y. Hou, Y. Jiang, S. Liu, S. Priya, Nano. Lett, 2019, 19, 3313.
(Continued)

*Primary Examiner* — Elmito Breval
(74) *Attorney, Agent, or Firm* — Renner, Kenner, Greive, Bobak, Taylor & Weber

(57) ABSTRACT

The large-scale artificial synaptic device arrays based on the organic molecule-nanowire heterojunctions with tunable photoconductivity are proposed and demonstrated. The organic thin films of p-type 2,7-dioctyl[1]benzothieno[3,2-b][1] benzothiophene (C8-BTBT) or n-type phenyl-C61-butyric acid methyl ester (PC61BM) are used to wrap the InGaAs nanowire parallel arrays to configure two different type-I heterojunctions, respectively. Due to the difference in carrier injection, persistent negative photoconductivity (NPC) or positive photoconductivity (PPC) are achieved in these heterojunctions. The irradiation with different wavelengths (solar-blind to visible ranges) can stimulate the heterojunction devices, effectively mimicking the synaptic behaviors with two different photoconductivities. Evidently, these photosynaptic devices are illustrated with retina-like behaviors and capabilities for large-area integration, which reveals their promising potential for artificial visual systems.

15 Claims, 42 Drawing Sheets

(51) Int. Cl.
H10K 30/10 (2023.01)
H10K 30/60 (2023.01)
H10K 30/84 (2023.01)
H10K 85/10 (2023.01)
H10K 85/20 (2023.01)

(52) U.S. Cl.
CPC ........... H10K 30/84 (2023.02); H10K 85/113 (2023.02); H10K 85/215 (2023.02)

(56) References Cited

OTHER PUBLICATIONS

J. Han, J. Wang, M. Yang, X. Kong, X. Chen, Z. Huang, H. Guo, J. Gou, S. Tao, Z. Liu, Z. Wu, Y. Jiang, X. Wang, Adv Mater, 2018, 30, 1804020.
C.-H. Chiang, C.-G. Wu, Nat. Photonics, 2016, 10, 196.
S. Foster, F. Deledalle, A. Mitani, T. Kimura, K.-B. Kim, T. Okachi, T. Kirchartz, J. Oguma, K. Miyake, J. R. Durrant, S. Doi, J. Nelson, Adv. Energy. Mater, 2014, 4, 1400311.
Z. Ahmad, M. Awais, M. A. Najeeb, R. A. Shakoor, F. Touati, Springer International Publishing, Cham, 2017, 95.
A. S. Shikoh, Z. Ahmad, F. Touati, R. A. Shakoor, J. Bhadra, N. J. Al-Thani, RSC. Adv, 2017, 7, 35445.
F.-C. Wu, P.-R. Li, B.-R. Lin, R.-J. Wu, H.-L. Cheng, W.-Y. Chou, ACS. Appl. Mater. Interfaces, 2021, 13, 38, 45822-45832.
T. Chang, S.-H. Jo, W. Lu, ACS Nano, 2011, 5, 7669.
L. Wu, A. Wang, J. Shi, J. Yan, Z. Zhou, C. Bian, J. Ma, R. Ma, H. Liu, J. Chen, Y. Huang, W. Zhou, L. Bao, M. Ouyang, S. J. Pennycook, S. T. Pantelides, H.-J. Gao, Nat. Nanotechnol, 2021, 16, 882-887.
J. Meng, T. Wang, Z. He, Q. Li, H. Zhu, L. Ji, L. Chen, Q. Sun, D. W. Zhang, Nano Res. 2021, 15, 2472-2478.
Y. Meng, F. Li, C. Lan, X. Bu, X. Kang, R. Wei, S. Yip, D. Li, F. Wang, T. Takahashi, T. Hosomi, K. Nagashima, T. Yanagida, J. C. Ho, Sci. Adv, 2020, 6, 6389.
S. Hong, H. Cho, B. H. Kang, K. Park, D. Akinwande, H. J. Kim, S. Kim, ACS Nano, 2021, 15, 15362.
C.-Y. Wang, S.-J. Liang, S. Wang, P. Wang, Z. a. Li, Z. Wang, A. Gao, C. Pan, C. Liu, J. Liu, H. Yang, X. Liu, W. Song, C. Wang, B. Cheng, X. Wang, K. Chen, Z. Wang, K. Watanabe, T. Taniguchi, J. J. Yang, F. Miao, Sci. Adv, 2020, 6, 6173.
P. Yao, H. Wu, B. Gao, J. Tang, Q. Zhang, W. Zhang, J. J. Yang, H. Qian, Nature, 2020, 577, 641.
H. Jang, C. Liu, H. Hinton, M.-H. Lee, H. Kim, M. Seol, H.-J. Shin, S. Park, D. Ham, Adv. Mater, 2020, 32, 2002431.
M. Prezioso, F. Merrikh-Bayat, B. D. Hoskins, G. C. Adam, K. K. Likharev, D. B. Strukov, Nature, 2015, 521, 61.
Z. Fan, J. C. Ho, Z. A. Jacobson, R. Yerushalmi, R. L. Alley, H. Razavi, A. Javey, Nano Lett. 2008, 8, 20.
T. Takahashi, K. Takei, J. C. Ho, Y.-L. Chueh, Z. Fan, A. Javey, J. Am. Chem. Soc, 2009, 131, 2102.
Artificial vision adaption mimicked by an optoelectrical In2O3 transistor array, By Jin, Chenxing; Liu, Wanrong; Xu, Yunchao, et al., Nano Letter vol. 22 Issue: 8 p. 3372-3379 Published: Apr. 27, 2022.
Fully optical-driving ionotronic InGaZnO4 phototransistor for gate-tunable bidirectional photofiltering and visual perception, By Gu, Lijuan; Li, Yanran; Xie, Dingdong, et al., IEEE Transactions on Electron Devices vol. 69 Issue: 8 p. 4382-4385 Published: Aug. 2022.
Neuromorphic active pixel image sensor array for visual memory, By Hong, Seongin; Cho, Haewon; Kang, Byung Ha, et al., ACS NANO vol. 15 Issue: 9 p. 15362-15370 Published: Sep. 28, 2021.
Silicon-compatible optoelectronic artificial neuron, By Liu, Zhengyuan; Luo, Bingcheng; Wang, Danyang, Journal of Materials Chemistry C vol. 9 Issue: 4 p. 1150-1155 Published: Jan. 28, 2021.

Self-assembled peptide nanofibers with voltage-regulated inverse photoconductance, By Shi, Huiyao; Li, Minglin; Shi; Jialin, et al., ACS Applied Materials & Interfaces vol. 13 Issue: 1 p. 1057-1064 Published: Jan. 13, 2021.
Z. Zhang, S. Wang, C. Liu, R. Xie, W. Hu, P. Zhou, Nat. Nanotechnol. 2021. 17, 27-32.
I. Sanchez Esqueda, X. Yan, C. Rutherglen, A. Kane, T. Cain, P. Marsh, Q. Liu, K. Galatsis, H. Wang, C. Zhou, ACS. Nano. 2018, 12, 7352.
M.-K. Kim, I.-J. Kim, J.-S. Lee, Sci. Adv. 2021, 7, 1341.
K. Roy, A. Jaiswal, P. Panda, Nature. 2019, 575, 607.
L. F. Abbott, W. G. Regehr, Nature. 2004, 431, 796.
Q. Liu, S. Gao, L. Xu, W. Yue, C. Zhang, H. Kan, Y. Li, G. Shen, Chem. Soc. Rev. 2022, 51, 3341-3379.
L. Gu, S. Poddar, Y. Lin, Z. Long, D. Zhang, Q. Zhang, L. Shu, X. Qiu, M. Kam, A. Javey, Z. Fan, Nature. 2020, 581, 278.
V. K. Sangwan, M. C. Hersam, Nat. Nanotechnol. 2020, 15, 517.
L.-Q. Tao, H. Tian, Y. Liu, Z.-Y. Ju, Y. Pang, Y.-Q. Chen, D.-Y. Wang, X.-G. Tian, J.-C. Yan, N.-Q. Deng, Y. Yang, T.-L. Ren, Nat. Commun. 2017, 8, 14579.
M. Wang, Y. Luo, T. Wang, C. Wan, L. Pan, S. Pan, K. He, A. Neo, X. Chen, Adv. Mater. 2021, 33, 2003014.
J. Xue, Z. Zhu, X. Xu, Y. Gu, S. Wang, L. Xu, Y. Zou, J. Song, H. Zeng, Q. Chen, Nano. Lett, 2018, 18, 7628.
S. Gao, G. Liu, H. Yang, C. Hu, Q. Chen, G. Gong, W. Xue, X. Yi, J. Shang, R.-W. Li, ACS. Nano, 2019, 13, 2634.
F. Guo, M. Song, M.-C. Wong, R. Ding, W. F. Io, S.-Y. Pang, W. Jie, J. Hao, Adv. Funct. Mater, 2022, 32, 2108014.
L. Q. Zhu, C. J. Wan, L. Q. Guo, Y. Shi, Q. Wan, Nat. Commun, 2014, 5, 3158.
S. Lee, R. Peng, C. Wu, M. Li, Nat. Commun, 2022, 13, 1485.
Y. Chen, W. Qiu, X. Wang, W. Liu, J. Wang, G. Dai, Y. Yuan, Y. Gao, J. Sun, Nano. Energy, 2019, 62, 393.
W. Qiu, Y. Huang, L.-A. Kong, Y. Chen, W. Liu, Z. Wang, J. Sun, Q. Wan, J. H. Cho, J. Yang, Y. Gao, Adv. Funct. Mater, 2020, 30, 2002325.
J.-L. Meng, T.-Y. Wang, L. Chen, Q.-Q. Sun, H. Zhu, L. Ji, S.-J. Ding, W.-Z. Bao, P. Zhou, D. W. Zhang, Nano Energy, 2021, 83, 105815.
Q. Shi, D. Liu, D. Hao, J. Zhang, L. Tian, L. Xiong, J. Huang, Nano Energy, 2021, 87, 106197.
J.-Y. Wu, Y. T. Chun, S. Li, T. Zhang, J. Wang, P. K. Shrestha, D. Chu, Adv. Mater, 2018, 30, 1705880.
X. Huang, Q. Li, W. Shi, K. Liu, Y. Zhang, Y. Liu, X. Wei, Z. Zhao, Y. Guo, Y. Liu, Small, 2021, 2102820.
Y. Wang, E. Liu, A. Gao, T. Cao, M. Long, C. Pan, L. Zhang, J. Zeng, C. Wang, W. Hu, S.-J. Liang, F. Miao, ACS Nano, 2018, 12, 9513.
S. Seo, S.-H. Jo, S. Kim, J. Shim, S. Oh, J.-H. Kim, K. Heo, J.-W. Choi, C. Choi, S. Oh, D. Kuzum, H. S. P. Wong, J.-H. Park, Nat. Commun, 2018, 9, 5106.
Z.-x. Yang, N. Han, M. Fang, H. Lin, H.-Y. Cheung, S. Yip, E.-J. Wang, T. Hung, C.-Y. Wong, J. C. Ho, Nat. Commun, 2014, 5, 5249.
D. Li, C. Lan, A. Manikandan, S. Yip, Z. Zhou, X. Liang, L. Shu, Y.-L. Chueh, N. Han, J. C. Ho, Nat. Commun, 2019, 10, 1664.
S. Ham, M. Kang, S. Jang, J. Jang, S. Choi, T.-W. Kim, G. Wang, Sci. Adv, 2020, 6, 1178.
P. Xie, Y. Huang, W. Wang, Y. Meng, Z. Lai, F. Wang, S. Yip, X. Bu, W. Wang, D. Li, J. Sun, J. C. Ho, Nano Energy, 2022, 91, 106654.
J. J. Hou, N. Han, F. Wang, F. Xiu, S. Yip, A. T. Hui, T. Hung, J. C. Ho, ACS Nano, 2012, 6, 3624.
D. Li, S. Yip, F. Li, H. Zhang, Y. Meng, X. Bu, X. Kang, C. Lan, C. Liu, J. C. Ho, Adv. Opt. Mater, 2020, 2001201.
C.-M. Yang, T.-C. Chen, D. Verma, L.-J. Li, B. Liu, W.-H. Chang, C.-S. Lai, Adv. Funct. Mater, 2020, 30, 2001598.
Y. Zhu, C. Wu, Z. Xu, Y. Liu, H. Hu, T. Guo, T. W. Kim, Y. Chai, F. Li, Nano. Lett, 2021, 21, 6087.
J. J. Hou, F. Wang, N. Han, F. Xiu, S. Yip, M. Fang, H. Lin, T. F. Hung, J. C. Ho, ACS Nano, 2012, 6, 9320.
Y. Meng, C. Lan, F. Li, S. Yip, R. Wei, X. Kang, X. Bu, R. Dong, H. Zhang, J. C. Ho, ACS Nano, 2019, 13, 6060.

(56) References Cited

OTHER PUBLICATIONS

W. Wang, S. Yip, Y. Meng, W. Wang, F. Wang, X. Bu, Z. Lai, X. Kang, P. Xie, Q. Quan, C. Liu, J. C. Ho, Adv. Opt. Mater, 2021, 9, 2101289.

P. Xie, T. Liu, J. Sun, J. Yang, Adv. Funct. Mater, 2022, 2200843.

X. Li, P. Xie, X. Mo, Y. Xiang, Z. Xiao, T. Xiongsong, H. Huang, J. Sun, G. Dai, J. Yang, Phys. Status. solidi-R, 2021, 15, 2000479.

H. Kobayashi, N. Kobayashi, S. Hosoi, N. Koshitani, D. Murakami, R. Shirasawa, Y. Kudo, D. Hobara, Y. Tokita, M. Itabashi, J. Chem. Phys, 2013, 139, 014707.

H. Xia, S. Tong, C. Zhang, C. Wang, J. Sun, J. He, J. Zhang, Y. Gao, J. Yang, Appl. Phys. Lett, 2018, 112, 233301.

L. Shen, S. Yip, C. Lan, L. Shu, D. Li, Z. Zhou, C.-Y. Wong, E. Y. B. Pun, J. C. Ho, Adv. Mater. Interfaces, 2018, 5, 1701104.

J. Chen, C. H. Yang, R. A. Wilson, M. J. Yang, Appl. Phys. Lett, 1992, 60, 2113.

N. Guo, W. Hu, L. Liao, S. Yip, J. C. Ho, J. Miao, Z. Zhang, J. Zou, T. Jiang, S. Wu, X. Chen, W. Lu, Adv. Mater, 2014, 26, 8203.

Y. Han, M. Fu, Z. Tang, X. Zheng, X. Ji, X. Wang, W. Lin, T. Yang, Q. Chen, ACS Appl. Mater. Inter, 2017, 9, 2867.

M. Zhang, Z. Tang, X. Liu, J. Van der Spiegel, Nat. Electron, 2020, 3, 191.

H.-L. Park, Y. Lee, N. Kim, D.-G. Seo, G.-T. Go, T.-W. Lee, Adv. Mater, 2020, 32, 1903558.

S. Dai, X. Wu, D. Liu, Y. Chu, K. Wang, B. Yang, J. Huang, ACS Appl. Mater. Inter, 2018, 10, 21472.

C. Han, X. Han, J. Han, M. He, S. Peng, C. Zhang, X. Liu, J. Gou, J. Wang, Adv. Funct. Mater, 2022, 2113053.

C. Fan, X. Xu, K. Yang, F. Jiang, S. Wang, Q. Zhang, Adv. Mater, 2018, 30, 1804707.

W. Eaton Samuel, M. Lai, A. Gibson Natalie, B. Wong Andrew, L. Dou, J. Ma, L.-W. Wang, R. Leone Stephen, P. Yang, P. Natl. A. Sci, 2016, 113, 1993.

Y. Zhao, X. Liu, G. Feng, L. Lyu, L. Li, S. Wang, J. Jiang, Y. Li, D. Niu, H. Xie, Y. Gao, Results. Phys, 2020, 19, 103590.

H. Xie, D. Niu, Y. Zhao, S. Wang, B. Liu, Y. Liu, H. Huang, P. Wang, D. Wu, Y. Gao, Synthetic. Met, 2020, 260, 116261.

\* cited by examiner

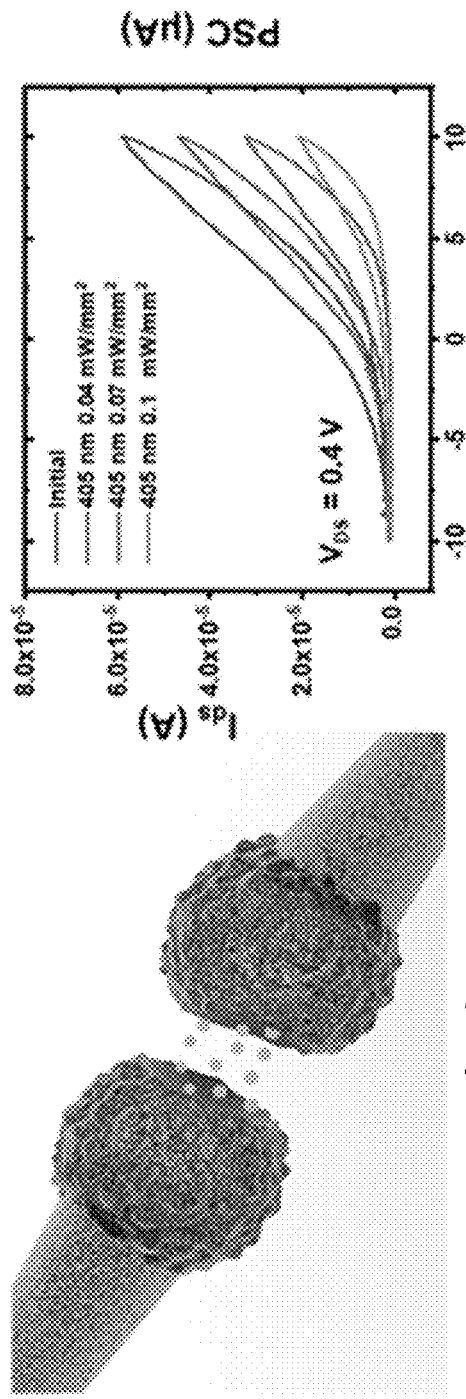
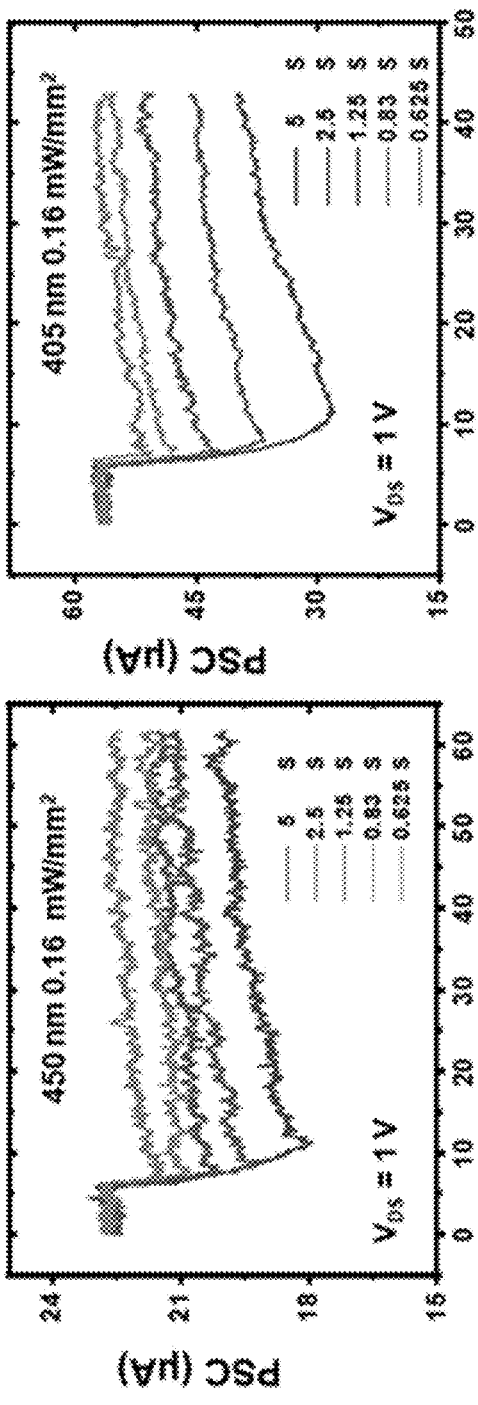
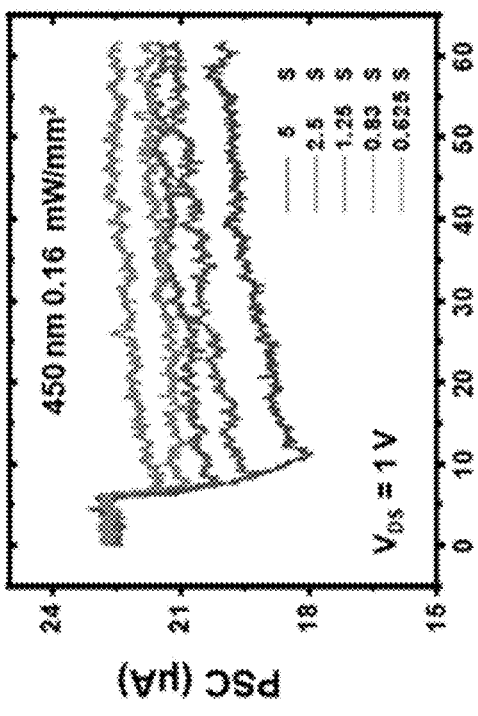
Fig. 2a
Fig. 2b
Fig. 2c
Fig. 2d

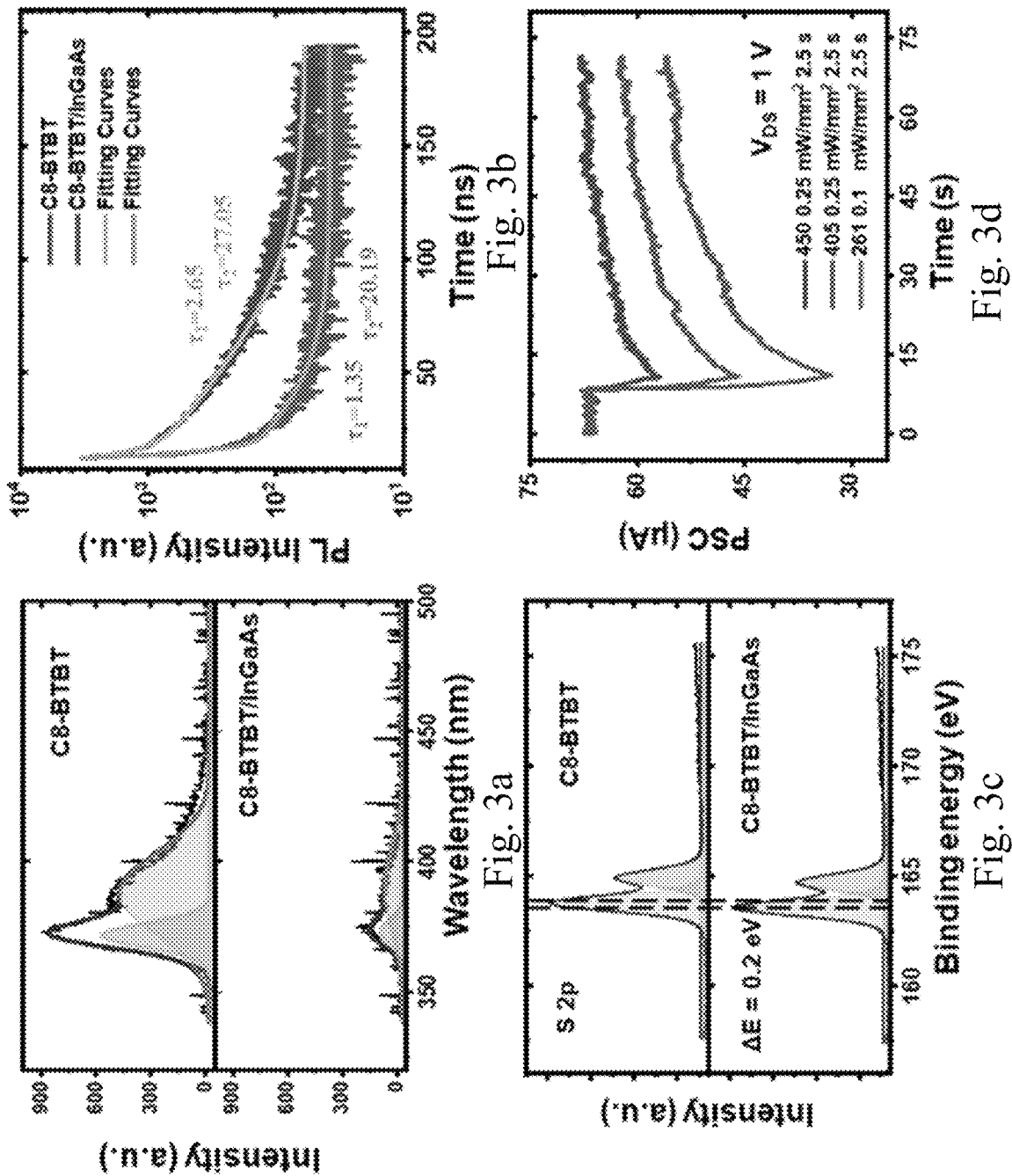

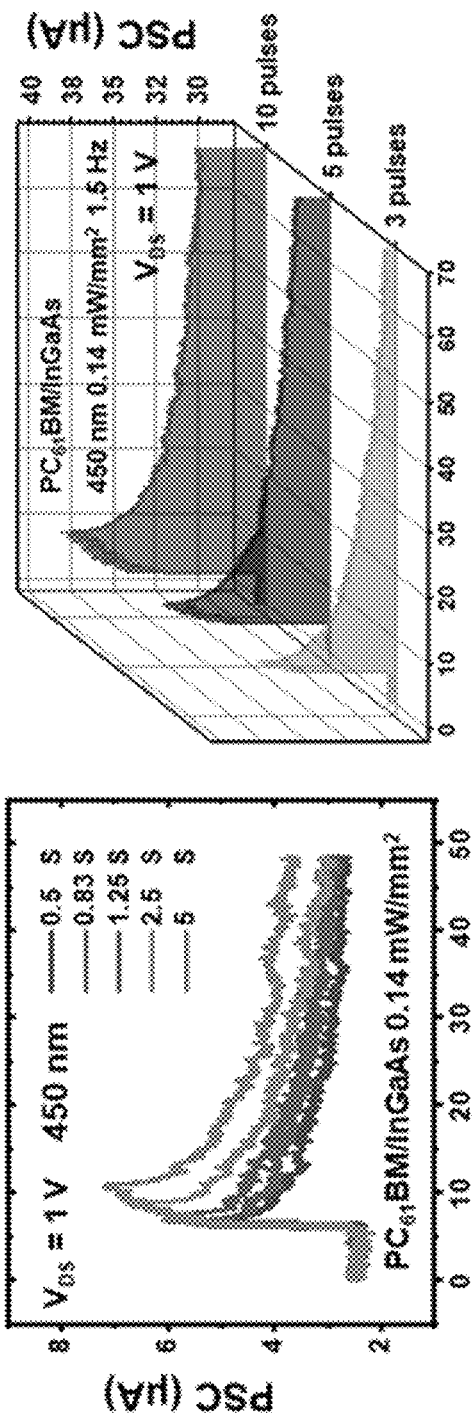
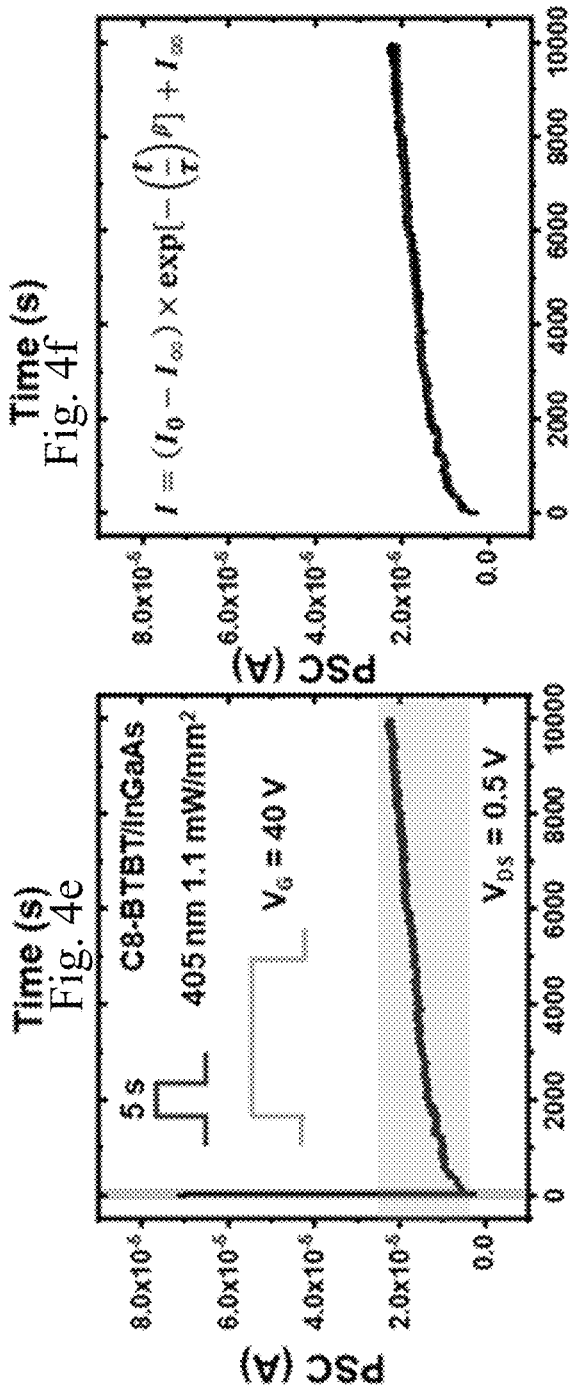
Fig. 4e
Fig. 4f
Fig. 5a
Fig. 5b

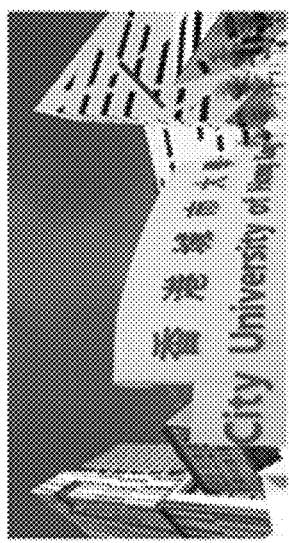
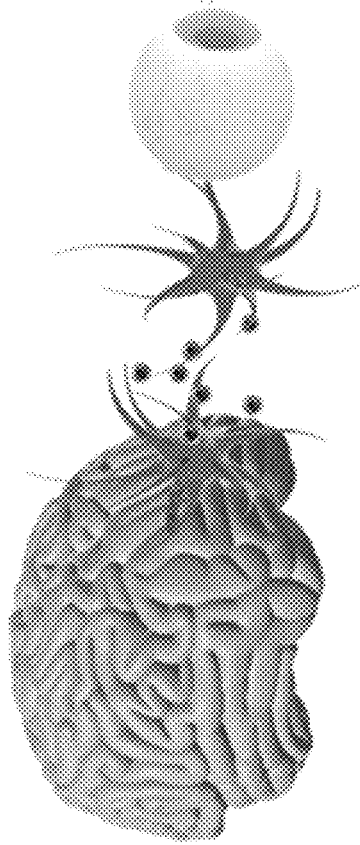
Fig. 6a
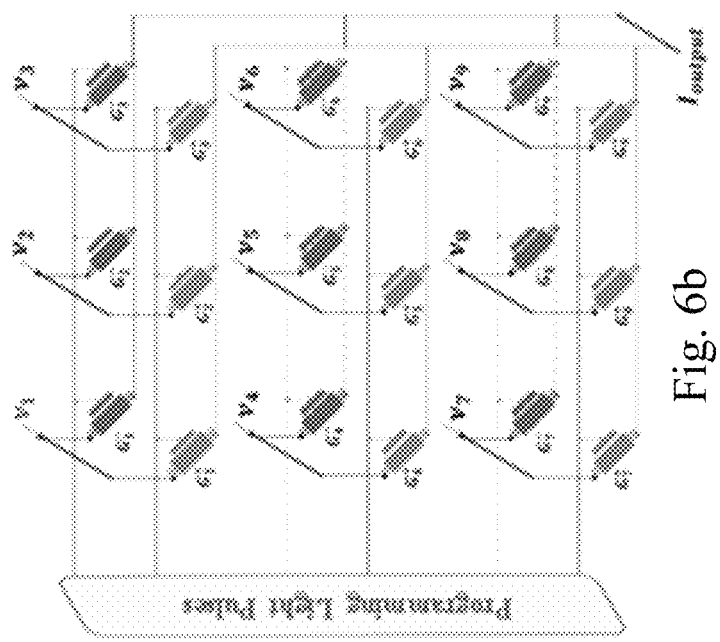
Fig. 6b
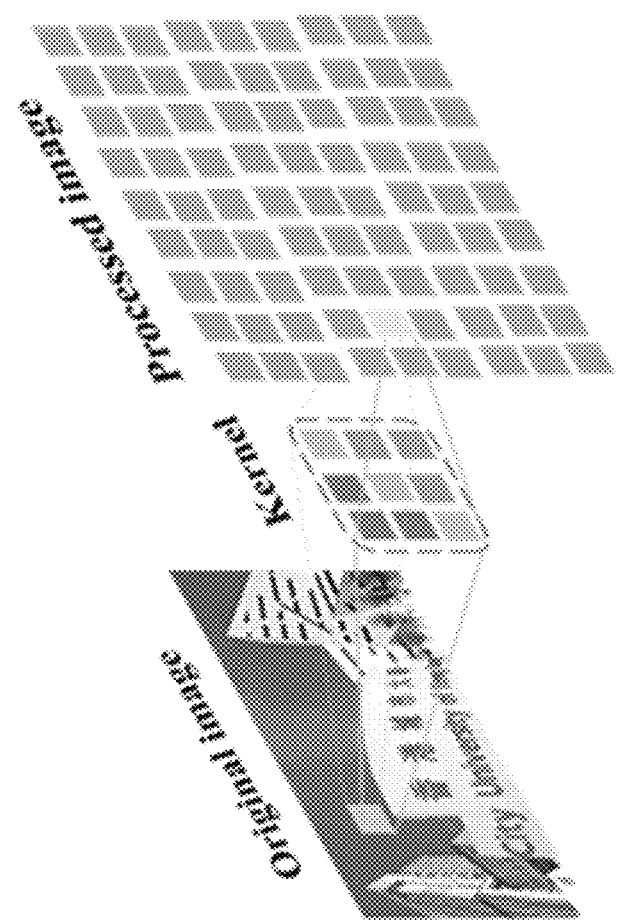
Fig. 6c

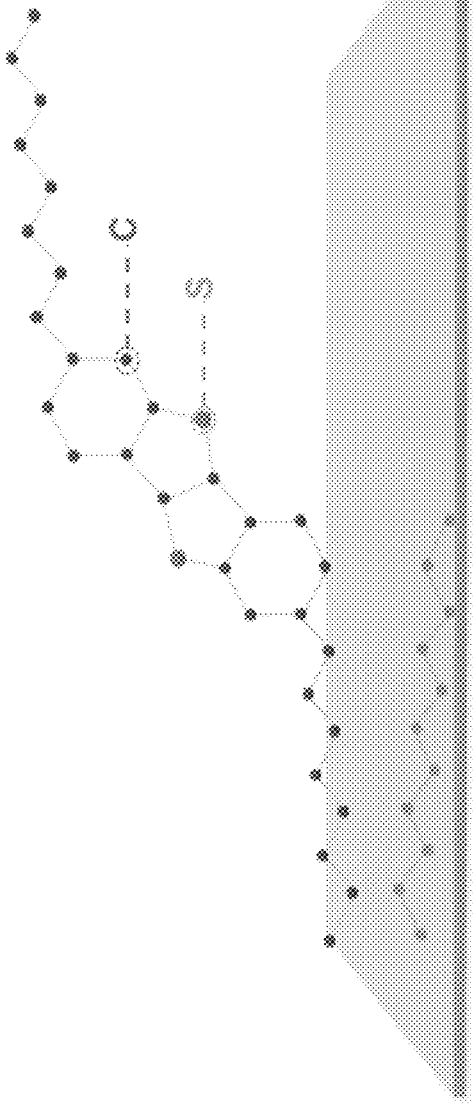
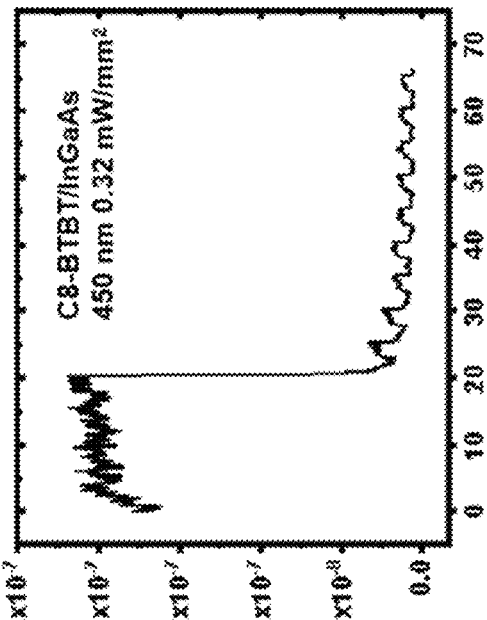
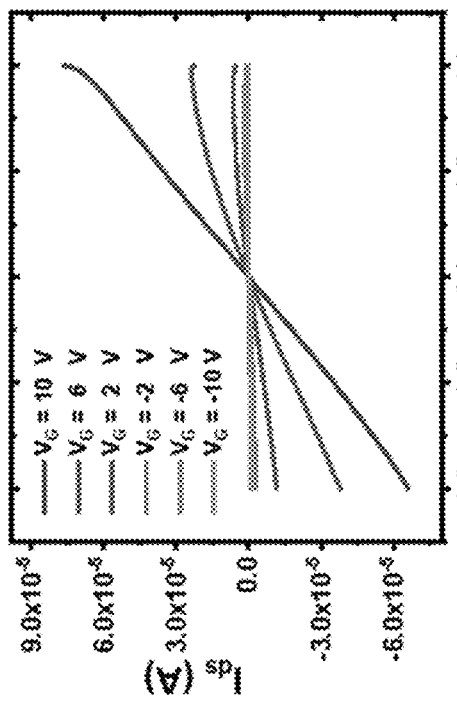
Fig. 11a
Fig. 11b
Fig. 11c

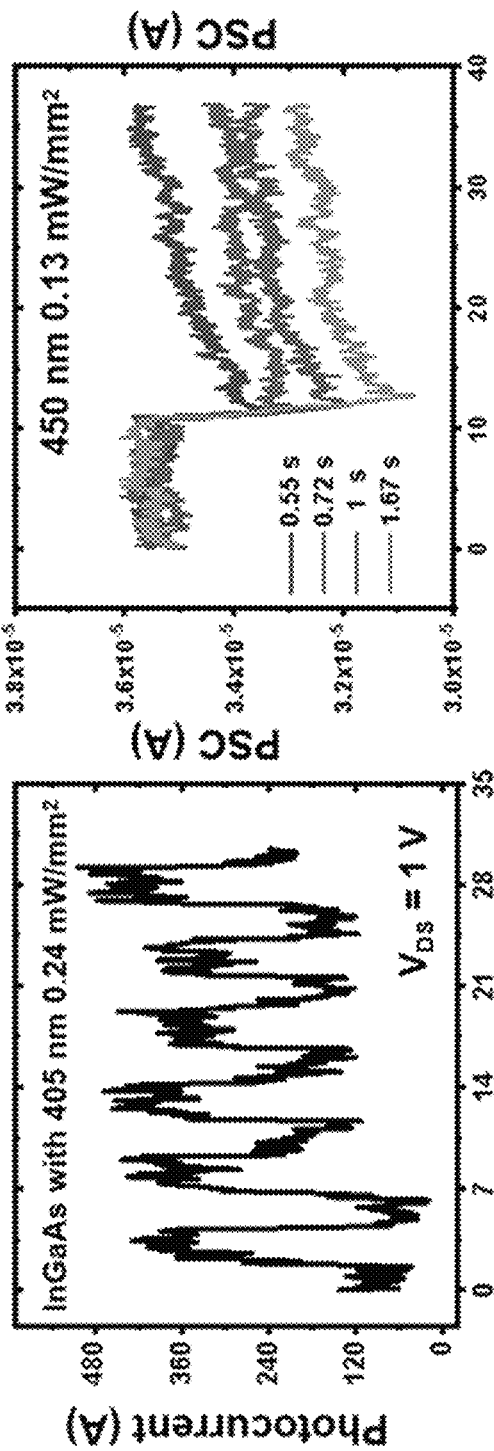
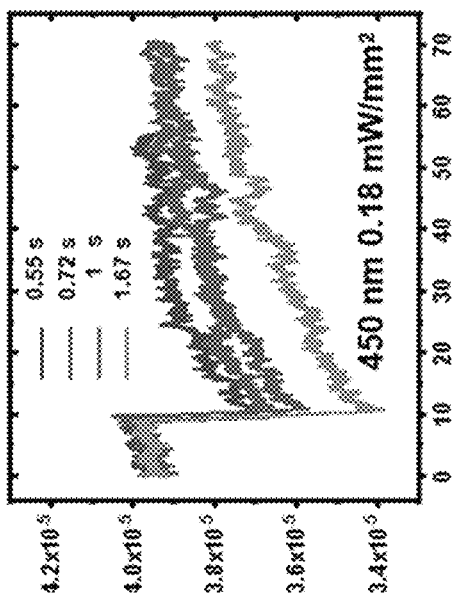
Fig. 15a
Fig. 15b
Fig. 15c

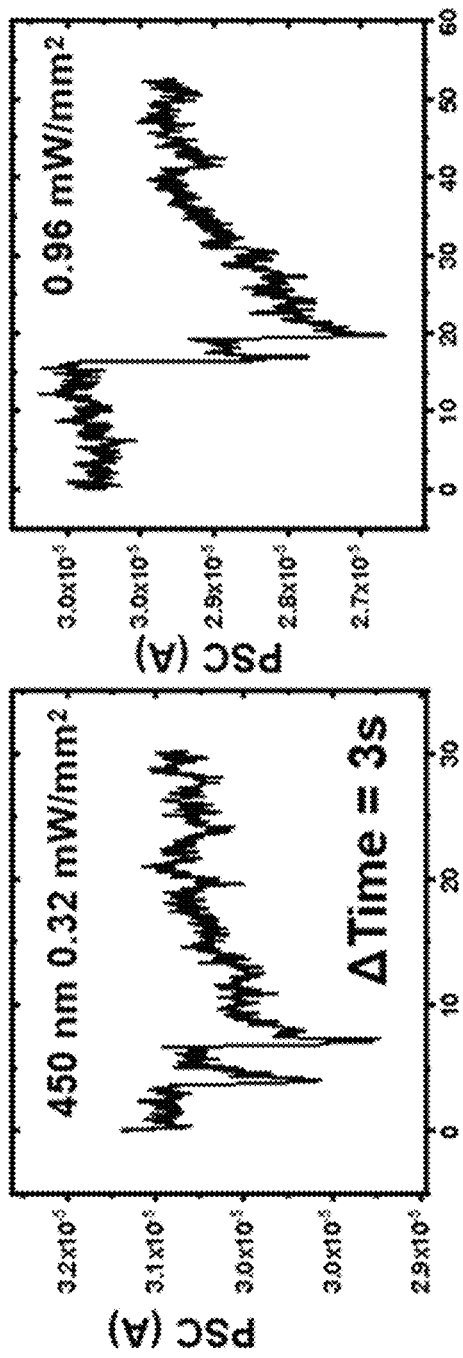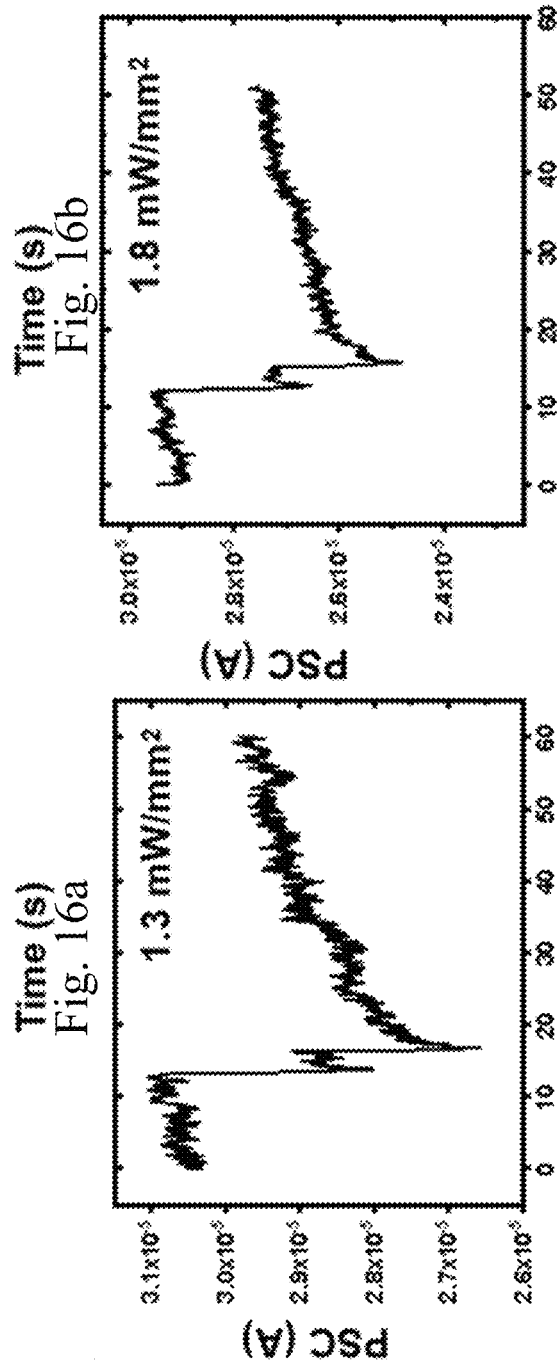
Fig. 16a  Fig. 16b  Fig. 16c  Fig. 16d

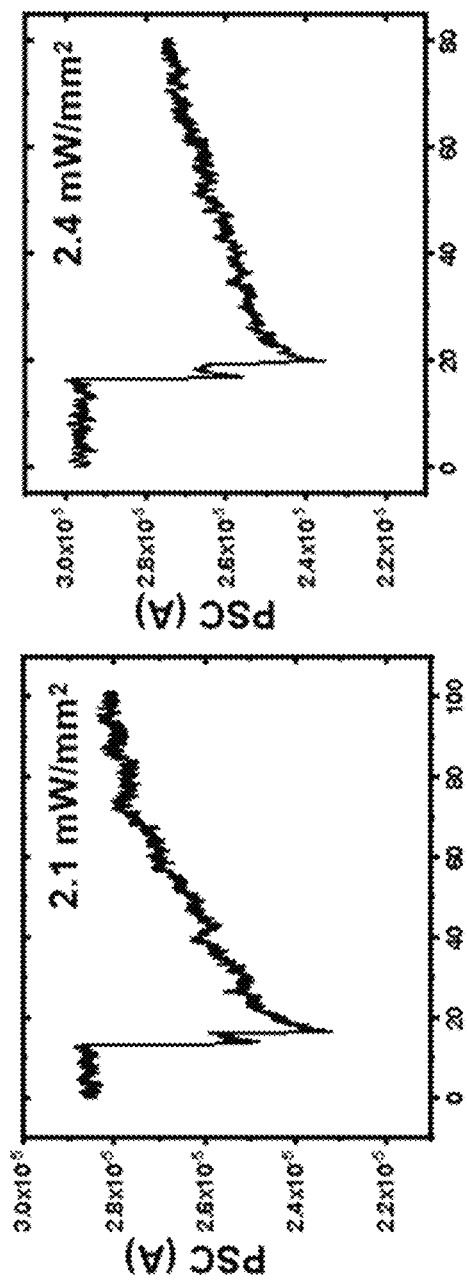
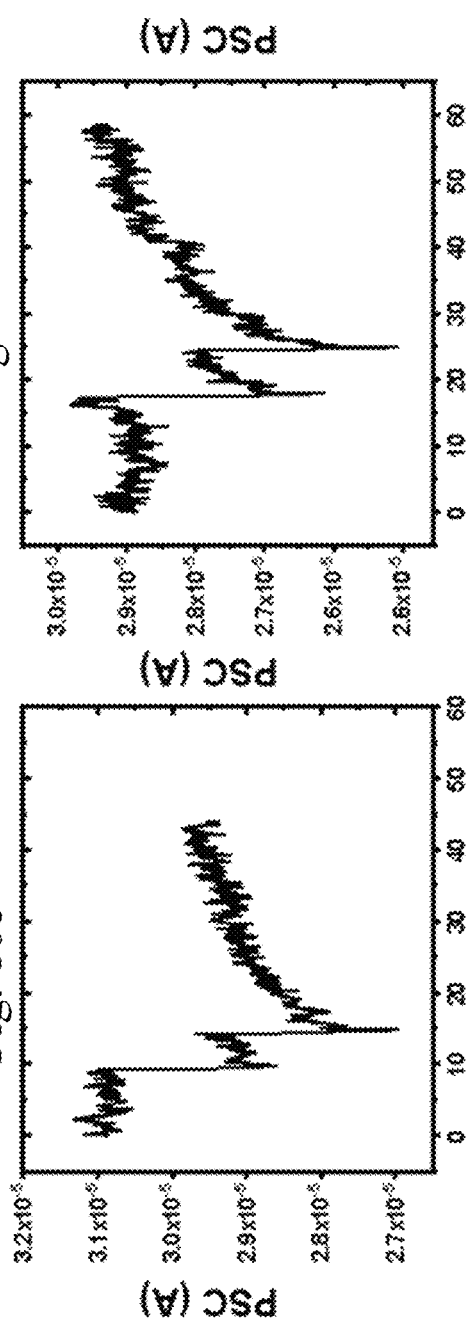
Fig. 16e
Fig. 16f
Fig. 17a
Fig. 17b

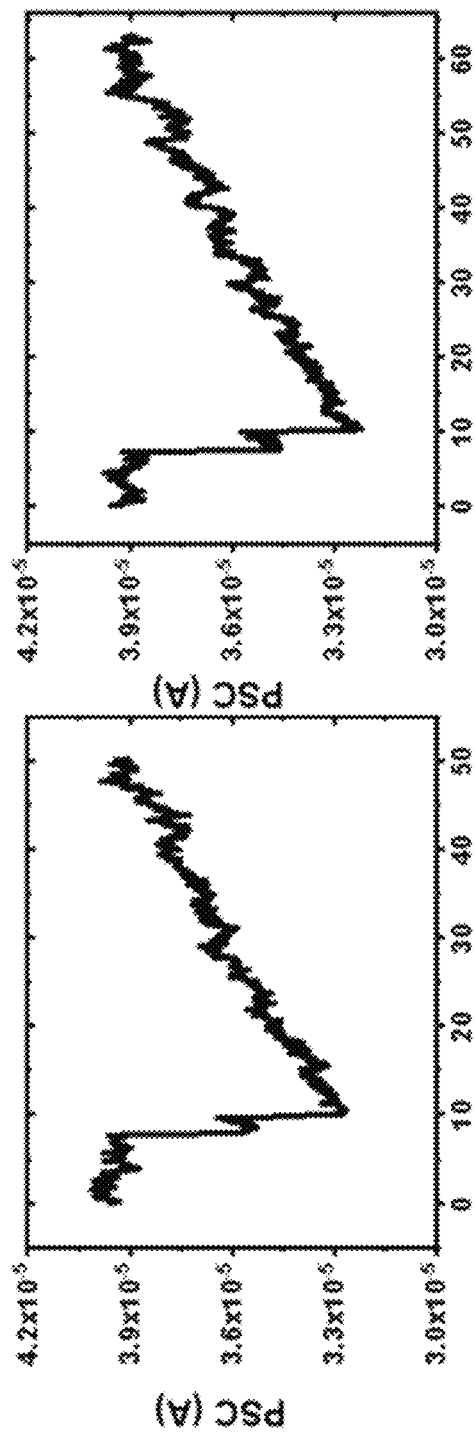
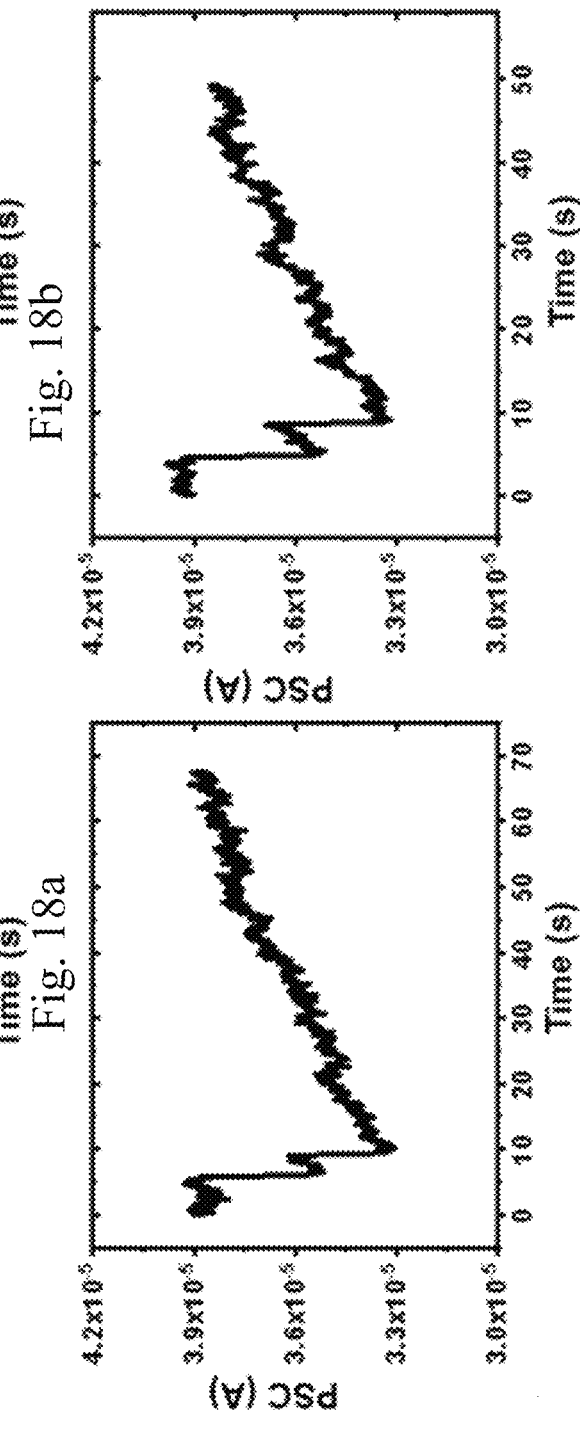
Fig. 18a
Fig. 18b
Fig. 18c
Fig. 18d

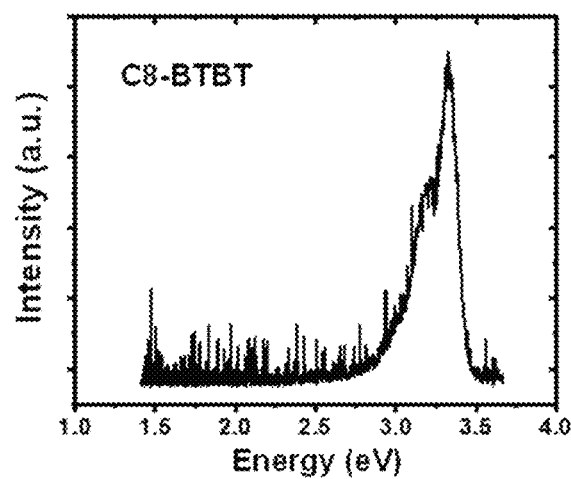
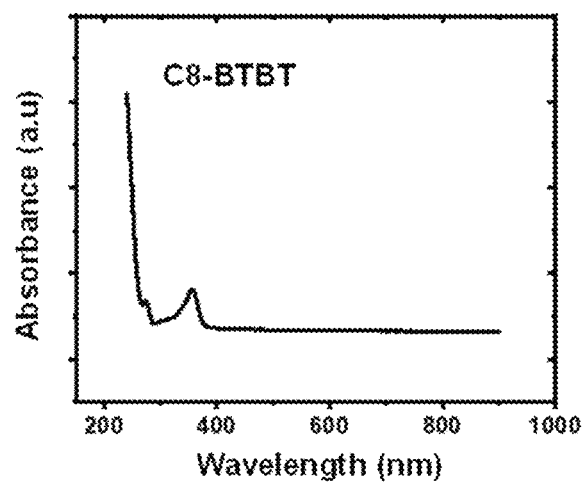
Fig. 19a　　　　　　　　　Fig. 19b
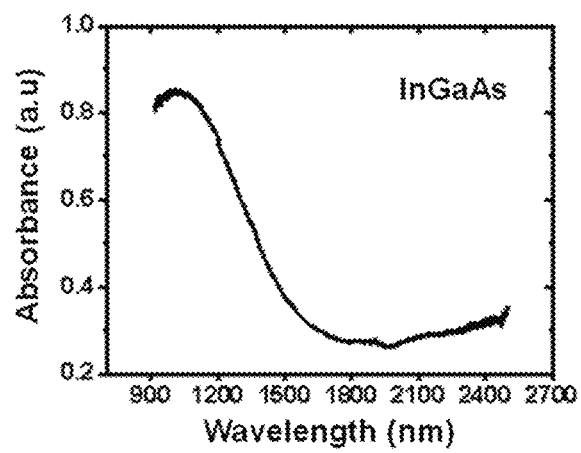
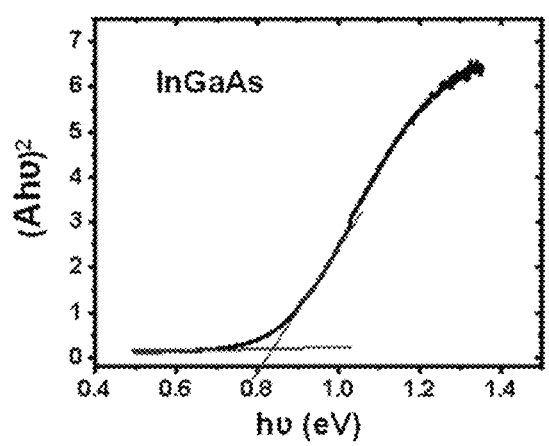
Fig. 20a　　　　　　　　　Fig. 20b

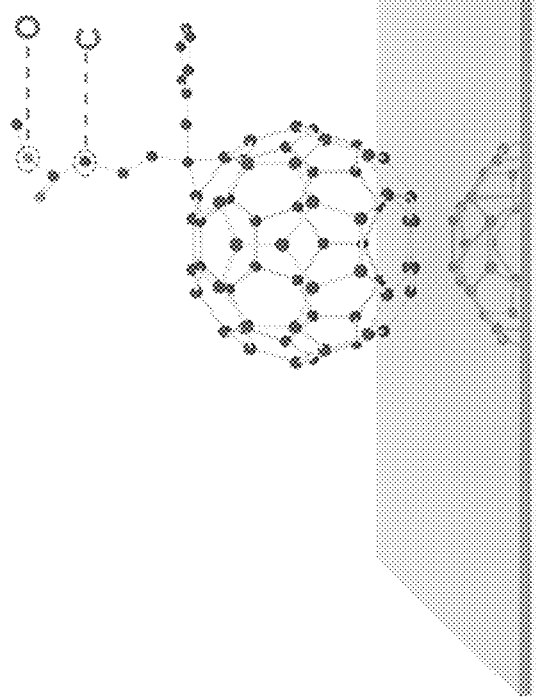
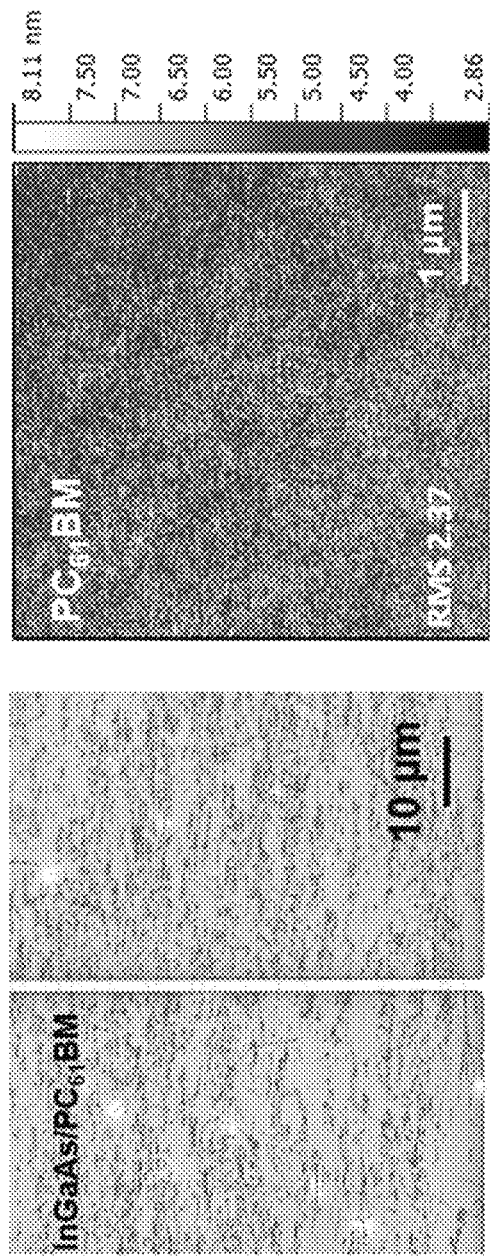
Fig. 25a
Fig. 25b
Fig. 25c

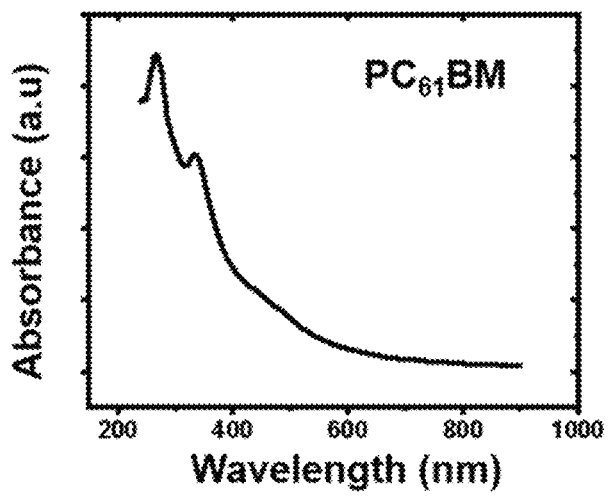
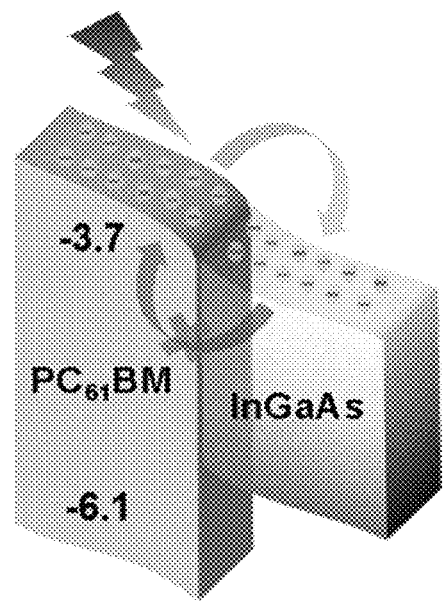
Fig. 26a                    Fig. 26b
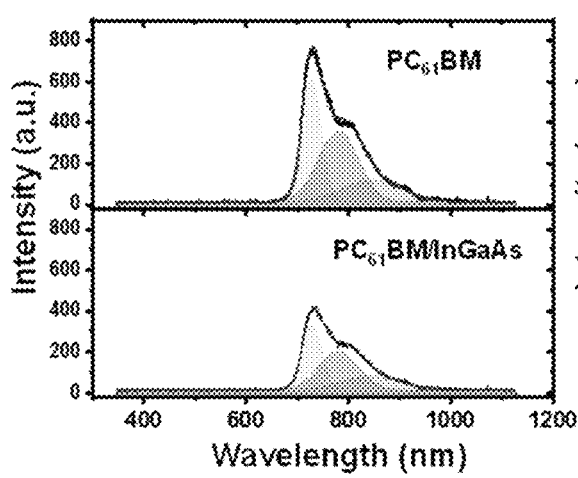
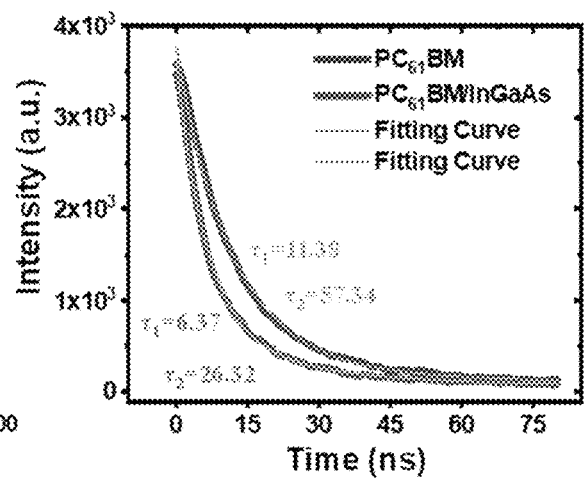
Fig. 27a                    Fig. 27b

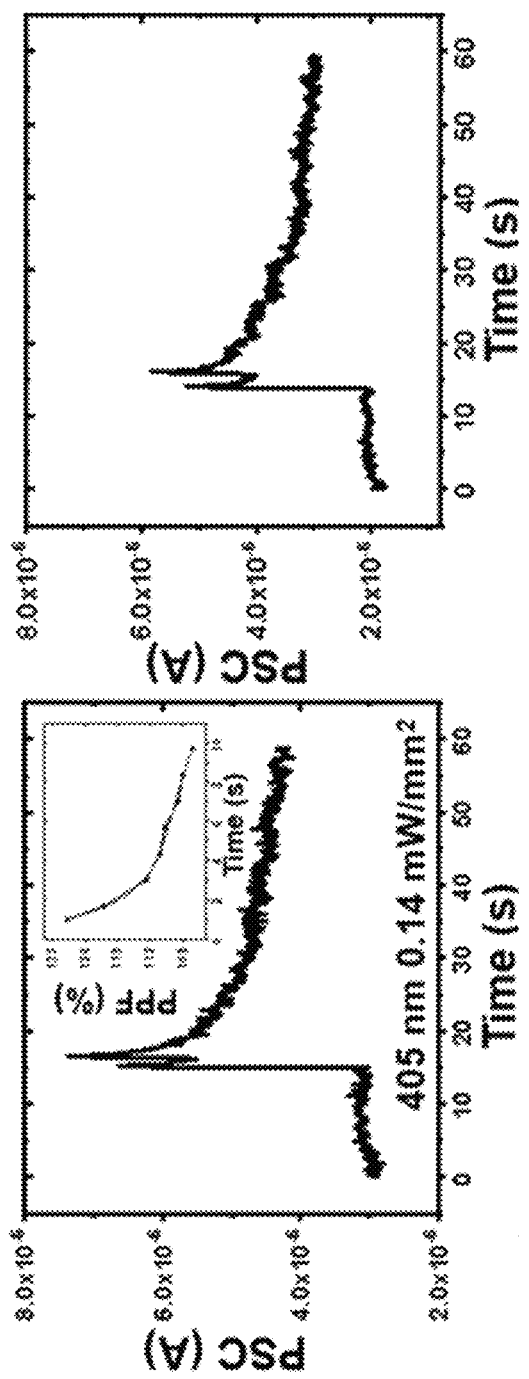
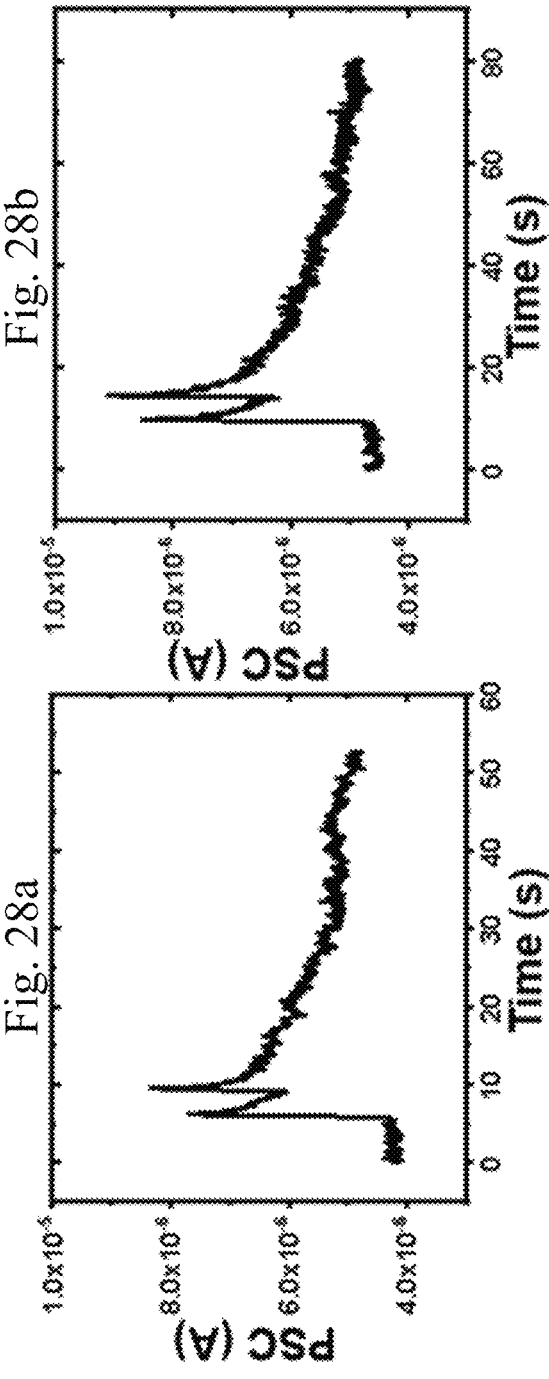
Fig. 28a
Fig. 28b
Fig. 28c
Fig. 28d

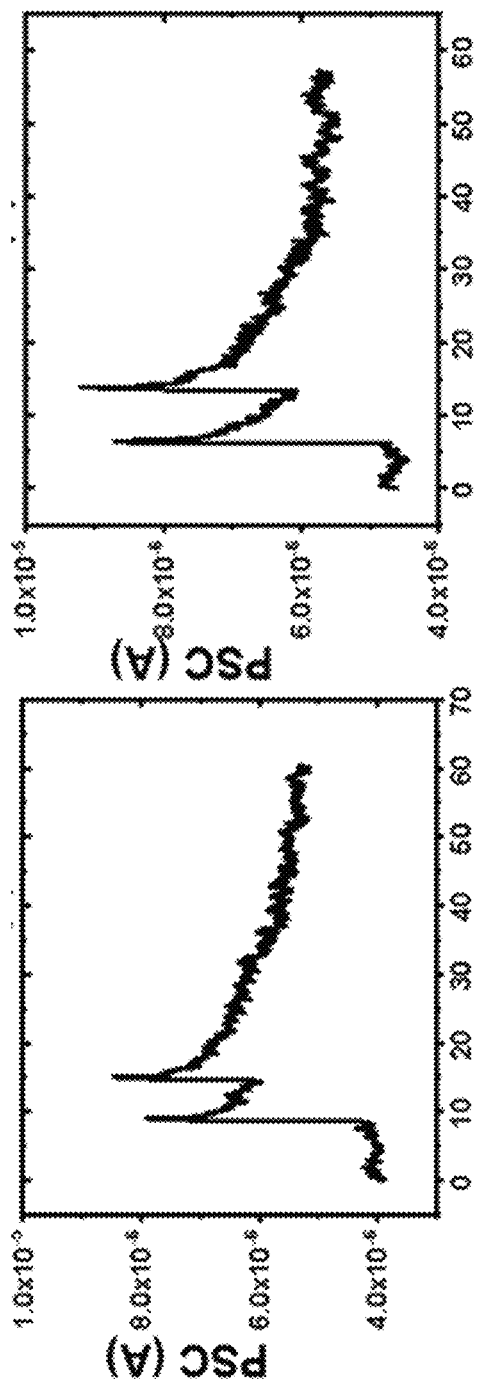
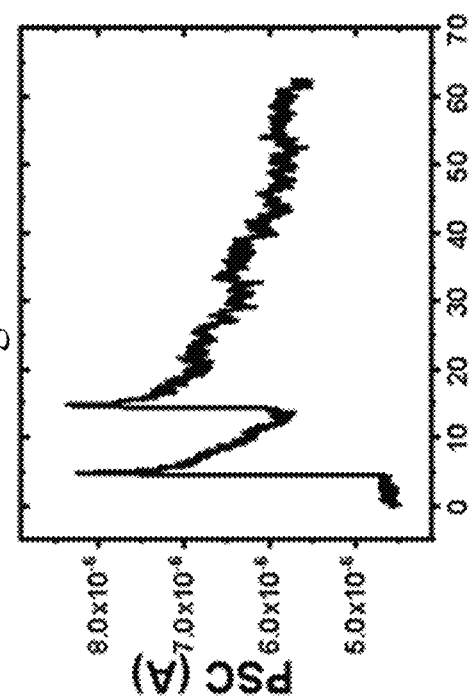
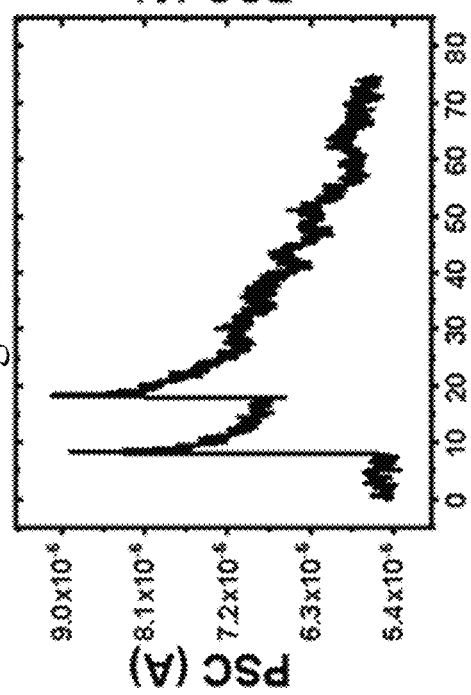
Fig. 28e
Fig. 28f
Fig. 28g
Fig. 28h

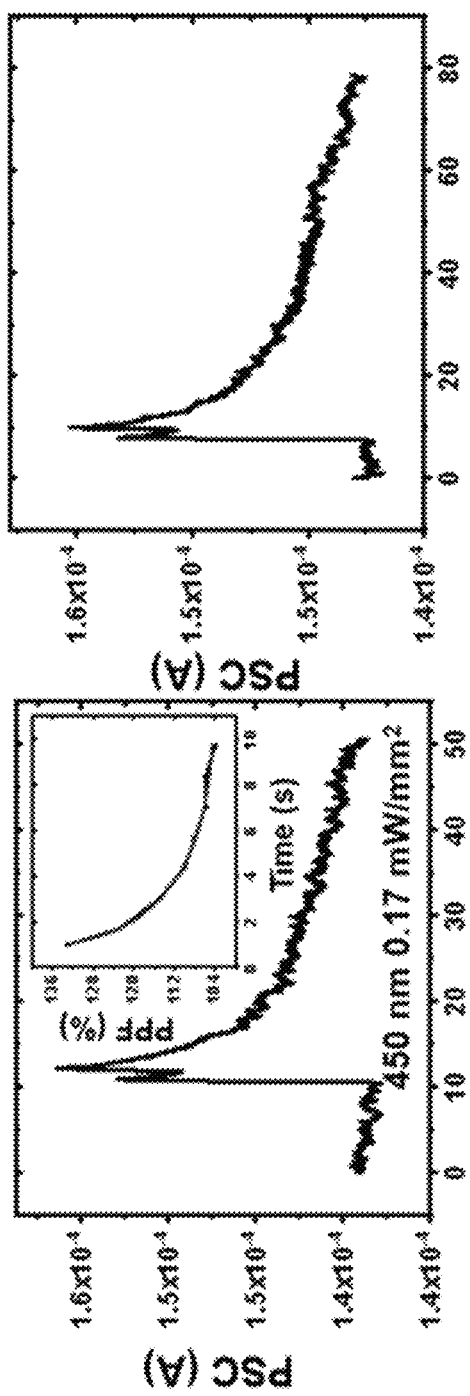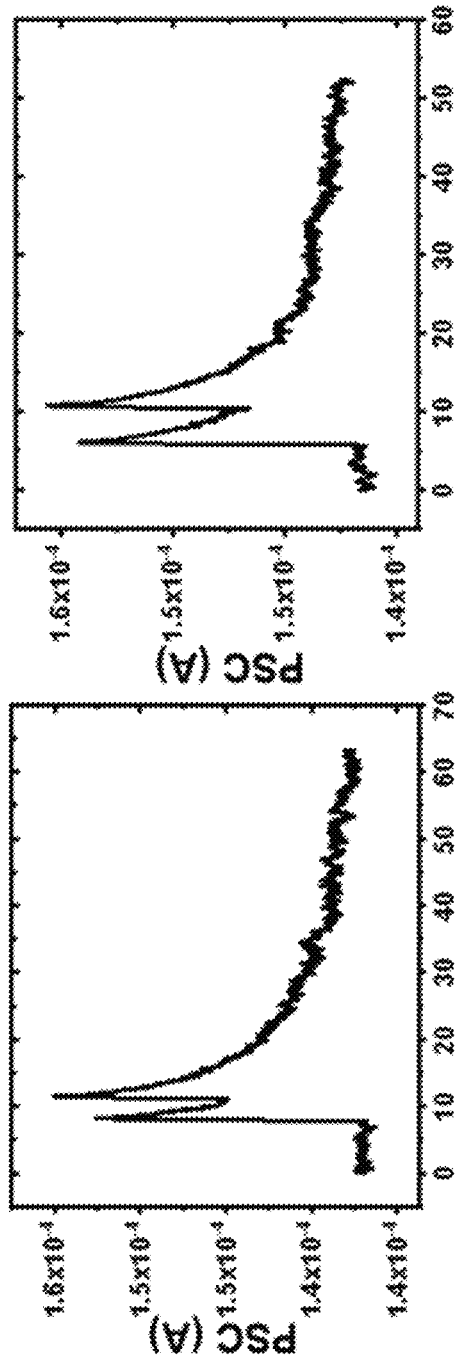
Fig. 29a  Fig. 29b  Fig. 29c  Fig. 29d

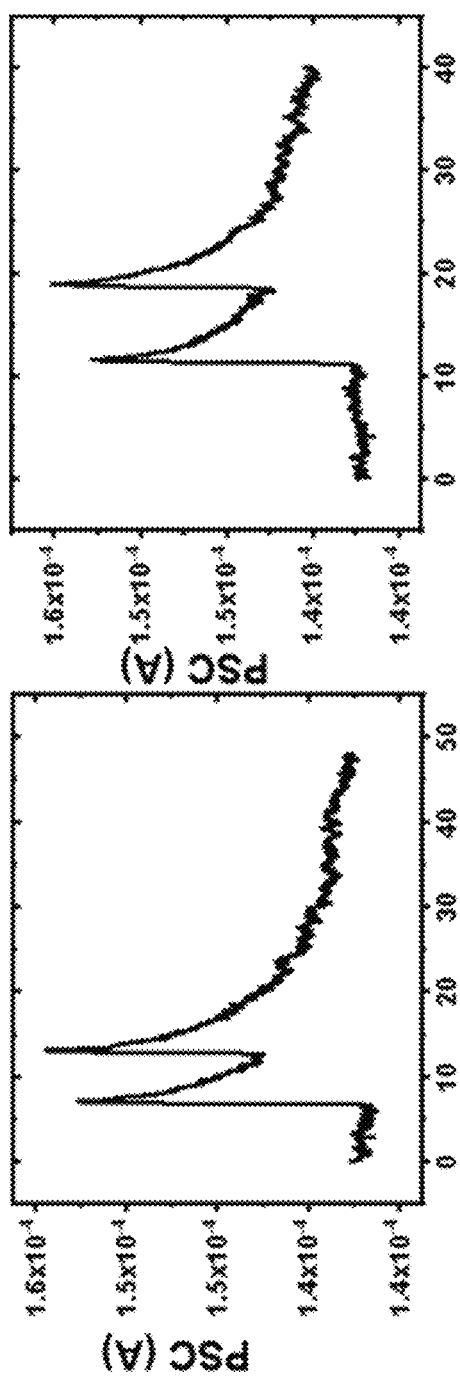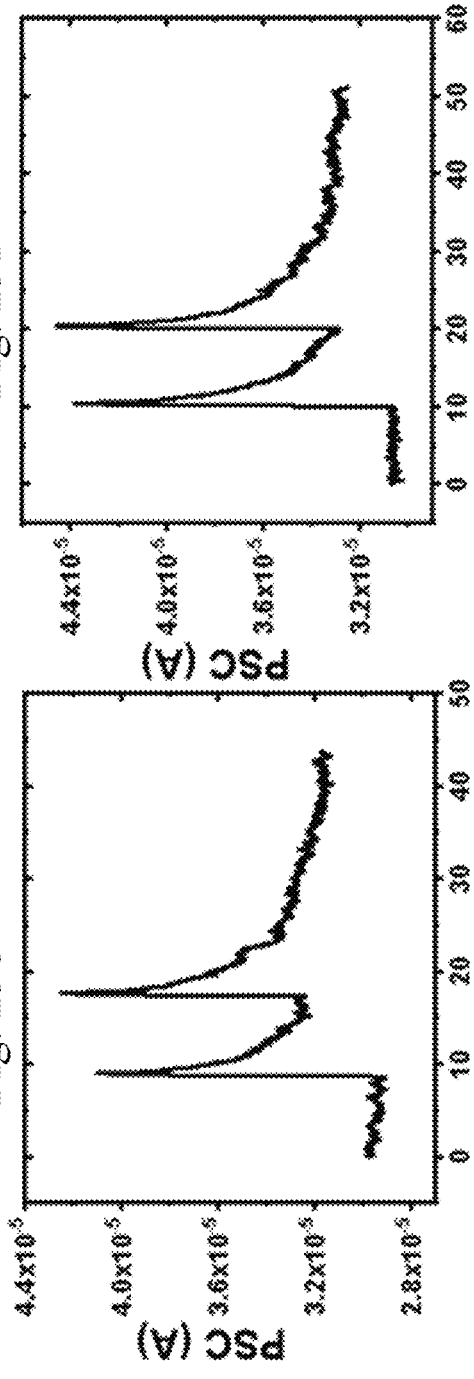
Fig. 29e
Fig. 29f
Fig. 29g
Fig. 29h

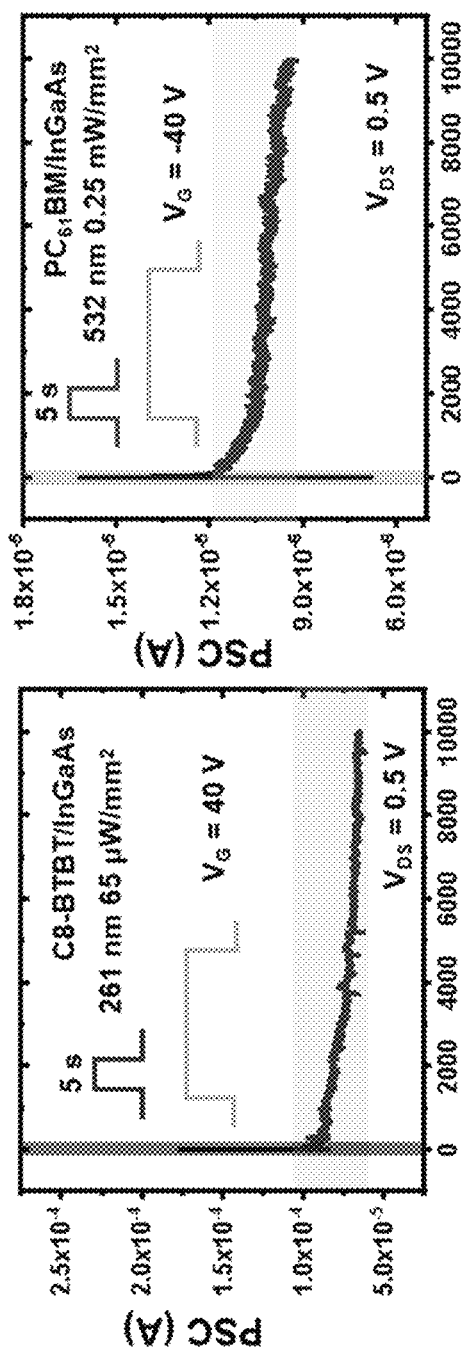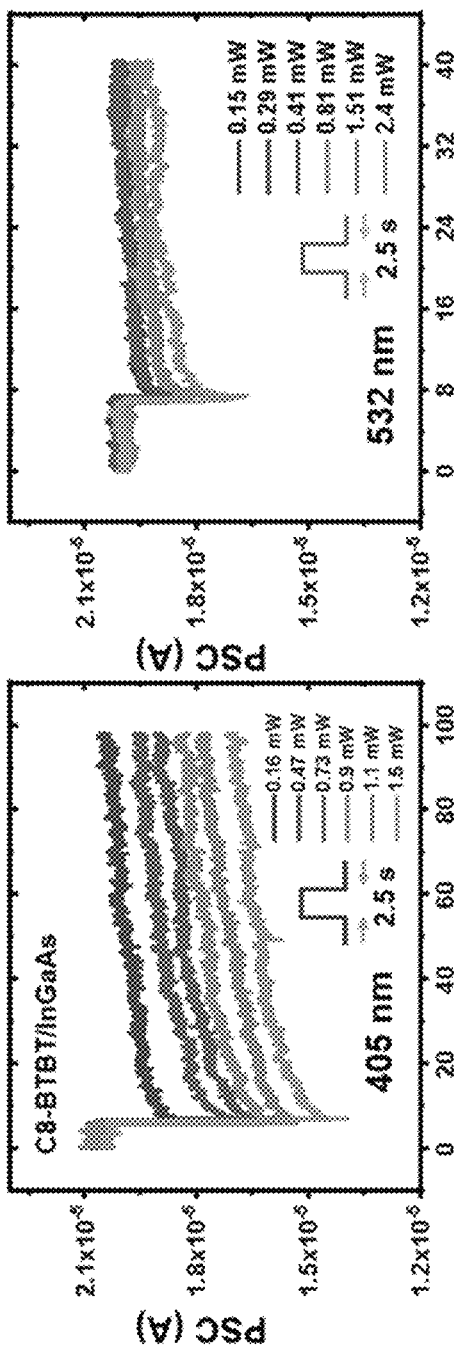
Fig. 32a  Fig. 32b  Fig. 33a  Fig. 33b

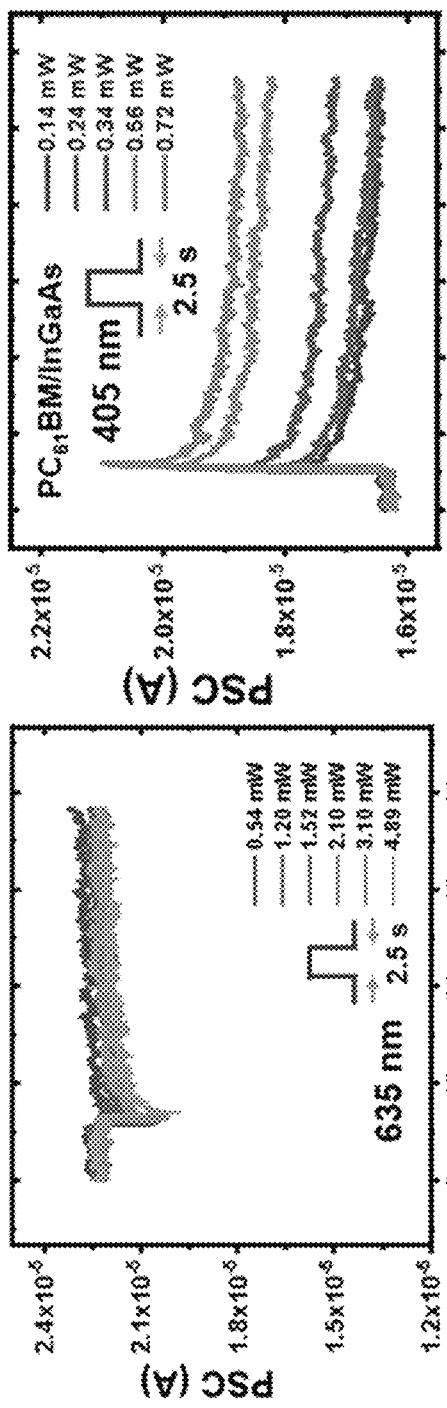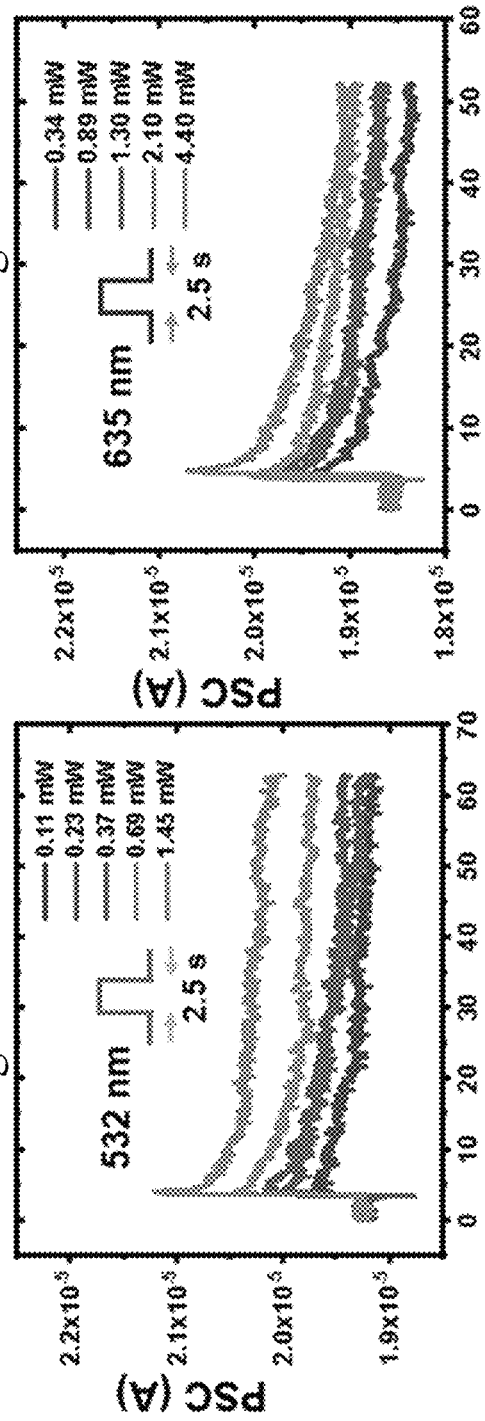
Fig. 34a
Fig. 34c
Fig. 33c
Fig. 34b

ARTIFICIAL VISUAL SYSTEMS WITH TUNABLE PHOTOCONDUCTIVITY BASED ON ORGANIC MOLECULE-NANOWIRE HETEROJUNCTIONS

FIELD OF INVENTION

This invention relates to artificial visual systems, for example those used for intelligent sensory electronic devices.

BACKGROUND OF INVENTION

Since the advent of artificial intelligence (AI), the evolution of information and communication technologies has contributed significantly to the recent development of the Internet of Things (IoT), artificial vision systems, unmanned driving, etc.[1-3] In fact, the human brain, one of the most sophisticated structures in nature, can process and store large quantities of data simultaneously with high-speed and ultralow-power consumption[4-5]. Inspired by the human brain, much progress with artificial synapse-based devices and systems has been achieved. Various intelligent sensory electronic devices, such as artificial throats, artificial skin, and artificial visual systems, are particularly focused[7-10]. It is noted that 80% of the information is obtained by human vision; therefore, vision is the essential way to receive external signals[11-12] (see FIG. 6a). FIG. 2a demonstrates the schematic of a biological synapse, which the presynaptic cells transmit information to postsynaptic cells by the neurotransmitters. Also, the human visual system recognizes complex images of different wavelengths and converts optical signals into biological signals for processing, inspiring the development of artificial visual systems with optoelectronic devices (see FIG. 6c). In this case, the artificial visual system has the potential to act as the signal receiver of bionic processors and artificial synapses.

It is known that neuronal electrical activity is the fundamental property of a visual system in the human brain, related to neuroplasticity. This neuroplasticity depends on the ability to process, maintain and inherit neurons based on the previous stimuli. Different from electrical signals, optical signals in human vision systems here have several advantages, including wide bandwidth, low power consumption, and long-distance transmission[15]. Sun et al. applied $SnO_2$ nanowires with ion gel to realize photo-synapses with the photoresponse in the solar-blind range. Subsequently, the In—Ga—Zn—O material was introduced with ion gel to fabricate the artificial vision system with a low back sweep subthreshold swing (<60 mV per decade). In addition to introducing the dielectric layer, using heterojunction is also an effective method to realize the synaptic functions. Meng et al. introduced a 2D/0D hybrid structure to fabricate artificial synapses, where sub-femtojoule power consumption was realized by simply integrating black phosphorus quantum dots (QDs) onto 2D MoSSe.[18] Similarly, Huang et al. dispersed $CsPbBr_3$ QDs into C8-BTBT/PS organic films for synaptic transistors, demonstrating ultra-low power consumption and effectively mimicking synaptic behaviors with response in the ultraviolet band[19]. Moreover, various artificial visual systems with negative photo-conductivity based on two-dimensional (2D) materials and perovskites have been developed.[1, 20, 21]. On the one hand, to realize positive and negative photoconductivities in different wavelengths, heterojunctions stacked with multilayer 2D materials are commonly employed.[22, 23] A complex transfer process is then difficult to be avoided to configure these heterojunctions, while large-area heterojunction arrays are challenging to be achieved for practical utilization. On the other hand, perovskite materials are suitable for large-area fabrication but suffer from poor air stability. Due to the unique wide-range photoresponse, excellent electrical performance, robust stability, and, more importantly, the easy formation of large-scale arrays, III-V nanowire (NW) materials are anticipated to yield promising applications in artificial synaptic devices.[24, 25] Notably, the morphological and topological characteristics of these one-dimensional (1D) NWs resemble the tubular axons, vital for efficient connections in the nervous system.[26, 27] In this regard, it is ideal to utilize III-V NW arrays integrated with other material systems, such as organic semiconductors, for heterojunctions in order to construct high-performance artificial visual systems.

REFERENCES

Each of the following references (and associated appendices and/or supplements) is expressly incorporated herein by reference in its entirety:

[1] Z. Zhang, S. Wang, C. Liu, R. Xie, W. Hu, P. Zhou, Nat. Nanotechnol. 2021, 17, 27.
[2] I. Sanchez Esqueda, X. Yan, C. Rutherglen, A. Kane, T. Cain, P. Marsh, Q. Liu, K. Galatsis, H. Wang, C. Zhou, ACS Nano 2018, 12, 7352.
[3] M.-K. Kim, I.-J. Kim, J.-S. Lee, Sci. Adv. 2021, 7, 1341.
[4] K. Roy, A. Jaiswal, P. Panda, Nature 2019, 575, 607.
[5] L. F. Abbott, W. G. Regehr, Nature 2004, 431, 796.
[6] Q. Liu, S. Gao, L. Xu, W. Yue, C. Zhang, H. Kan, Y. Li, G. Shen, Chem. Soc. Rev. 2022, 51, 3341.
[7] L. Gu, S. Poddar, Y. Lin, Z. Long, D. Zhang, Q. Zhang, L. Shu, X. Qiu, M. Kam, A. Javey, Z. Fan, Nature. 2020, 581, 278.
[8] V. K. Sangwan, M. C. Hersam, Nat. Nanotechnol. 2020, 15, 517.
[9] L.-Q. Tao, H. Tian, Y. Liu, Z.-Y. Ju, Y. Pang, Y.-Q. Chen, D.-Y. Wang, X.-G. Tian, J.-C. Yan, N.-Q. Deng, Y. Yang, T.-L. Ren, Nat. Commun. 2017, 8, 14579.
[10] M. Wang, Y. Luo, T. Wang, C. Wan, L. Pan, S. Pan, K. He, A. Neo, X. Chen, Adv. Mater. 2021, 33, 2003014.
[11] J. Xue, Z. Zhu, X. Xu, Y. Gu, S. Wang, L. Xu, Y. Zou, J. Song, H. Zeng, Q. Chen, Nano Lett. 2018, 18, 7628.
[12] S. Gao, G. Liu, H. Yang, C. Hu, Q. Chen, G. Gong, W. Xue, X. Yi, J. Shang, R.-W. Li, ACS Nano 2019, 13, 2634.
[13] F. Guo, M. Song, M.-C. Wong, R. Ding, W. F. Io, S.-Y. Pang, W. Jie, J. Hao, Adv. Funct. Mater. 2022, 32, 2108014.
[14] L. Q. Zhu, C. J. Wan, L. Q. Guo, Y. Shi, Q. Wan, Nat. Commun. 2014, 5, 3158.
[15] S. Lee, R. Peng, C. Wu, M. Li, Nat. Commun. 2022, 13, 1485.
[16] Y. Chen, W. Qiu, X. Wang, W. Liu, J. Wang, G. Dai, Y. Yuan, Y. Gao, J. Sun, Nano. Energy 2019, 62, 393.
[17] W. Qiu, Y. Huang, L.-A. Kong, Y. Chen, W. Liu, Z. Wang, J. Sun, Q. Wan, J. H. Cho, J. Yang, Y. Gao, Adv. Funct. Mater. 2020, 30, 2002325.
[18] J.-L. Meng, T.-Y. Wang, L. Chen, Q.-Q. Sun, H. Zhu, L. Ji, S.-J. Ding, W.-Z. Bao, P. Zhou, D. W. Zhang, Nano Energy 2021, 83, 105815.
[19] Q. Shi, D. Liu, D. Hao, J. Zhang, L. Tian, L. Xiong, J. Huang, Nano Energy 2021, 87, 106197.
[20] J.-Y. Wu, Y. T. Chun, S. Li, T. Zhang, J. Wang, P. K. Shrestha, D. Chu, Adv. Mater. 2018, 30, 1705880.
[21] X. Huang, Q. Li, W. Shi, K. Liu, Y. Zhang, Y. Liu, X. Wei, Z. Zhao, Y. Guo, Y. Liu, Small 2021, 2102820.

[22] Y. Wang, E. Liu, A. Gao, T. Cao, M. Long, C. Pan, L. Zhang, J. Zeng, C. Wang, W. Hu, S.-J. Liang, F. Miao, ACS Nano 2018, 12, 9513.

[23] S. Seo, S.-H. Jo, S. Kim, J. Shim, S. Oh, J.-H. Kim, K. Heo, J.-W. Choi, C. Choi, S. Oh, D. Kuzum, H. S. P. Wong, J.-H. Park, Nat. Commun. 2018, 9, 5106.

[24] Z.-x. Yang, N. Han, M. Fang, H. Lin, H.-Y. Cheung, S. Yip, E.-J. Wang, T. Hung, C.-Y. Wong, J. C. Ho, Nat. Commun. 2014, 5, 5249.

[25] D. Li, C. Lan, A. Manikandan, S. Yip, Z. Zhou, X. Liang, L. Shu, Y.-L. Chueh, N. Han, J. C. Ho, Nat. Commun. 2019, 10, 1664.

[26] S. Ham, M. Kang, S. Jang, J. Jang, S. Choi, T.-W. Kim, G. Wang, Sci. Adv. 2020, 6, 1178.

[27] P. Xie, Y. Huang, W. Wang, Y. Meng, Z. Lai, F. Wang, S. Yip, X. Bu, W. Wang, D. Li, J. Sun, J. C. Ho, Nano Energy 2022, 91, 106654.

[28] J. J. Hou, N. Han, F. Wang, F. Xiu, S. Yip, A. T. Hui, T. Hung, J. C. Ho, ACS Nano 2012, 6, 3624.

[29] D. Li, S. Yip, F. Li, H. Zhang, Y. Meng, X. Bu, X. Kang, C. Lan, C. Liu, J. C. Ho, Adv. Opt. Mater. 2020, 2001201.

[30] C.-M. Yang, T.-C. Chen, D. Verma, L.-J. Li, B. Liu, W.-H. Chang, C.-S. Lai, Adv. Funct. Mater. 2020, 30, 2001598.

[31] Y. Zhu, C. Wu, Z. Xu, Y. Liu, H. Hu, T. Guo, T. W. Kim, Y. Chai, F. Li, Nano Lett. 2021, 21, 6087.

[32] J. J. Hou, F. Wang, N. Han, F. Xiu, S. Yip, M. Fang, H. Lin, T. F. Hung, J. C. Ho, ACS Nano 2012, 6, 9320.

[33] Y. Meng, C. Lan, F. Li, S. Yip, R. Wei, X. Kang, X. Bu, R. Dong, H. Zhang, J. C. Ho, ACS Nano 2019, 13, 6060.

[34] W. Wang, S. Yip, Y. Meng, W. Wang, F. Wang, X. Bu, Z. Lai, X. Kang, P. Xie, Q. Quan, C. Liu, J. C. Ho, Adv. Opt. Mater. 2021, 9, 2101289.

[35] P. Xie, T. Liu, J. Sun, J. Yang, Adv. Funct. Mater. 2022, 2200843.

[36] X. Li, P. Xie, X. Mo, Y. Xiang, Z. Xiao, T. Xiongsong, H. Huang, J. Sun, G. Dai, J. Yang, Phys. Status. solidi-R 2021, 15, 2000479.

[37] H. Kobayashi, N. Kobayashi, S. Hosoi, N. Koshitani, D. Murakami, R. Shirasawa, Y. Kudo, D. Hobara, Y. Tokita, M. Itabashi, J. Chem. Phys. 2013, 139, 014707.

[38] H. Xia, S. Tong, C. Zhang, C. Wang, J. Sun, J. He, J. Zhang, Y. Gao, J. Yang, Appl. Phys. Lett. 2018, 112, 233301.

[39] L. Shen, S. Yip, C. Lan, L. Shu, D. Li, Z. Zhou, C.-Y. Wong, E. Y. B. Pun, J. C. Ho, Adv. Mater. Interfaces 2018, 5, 1701104.

[40] J. Chen, C. H. Yang, R. A. Wilson, M. J. Yang, Appl. Phys. Lett. 1992, 60, 2113.

[41] N. Guo, W. Hu, L. Liao, S. Yip, J. C. Ho, J. Miao, Z. Zhang, J. Zou, T. Jiang, S. Wu, X. Chen, W. Lu, Adv. Mater. 2014, 26, 8203.

[42] Y. Han, M. Fu, Z. Tang, X. Zheng, X. Ji, X. Wang, W. Lin, T. Yang, Q. Chen, ACS Appl. Mater. Interfaces 2017, 9, 2867.

[43] M. Zhang, Z. Tang, X. Liu, J. Van der Spiegel, Nat. Electron. 2020, 3, 191.

[44] H.-L. Park, Y. Lee, N. Kim, D.-G. Seo, G.-T. Go, T.-W. Lee, Adv. Mater. 2020, 32, 1903558.

[45] S. Dai, X. Wu, D. Liu, Y. Chu, K. Wang, B. Yang, J. Huang, ACS Appl. Mater. Interfaces 2018, 10, 21472.

[46] C. Han, X. Han, J. Han, M. He, S. Peng, C. Zhang, X. Liu, J. Gou, J. Wang, Adv. Funct. Mater. 2022, 2113053.

[47] C. Fan, X. Xu, K. Yang, F. Jiang, S. Wang, Q. Zhang, Adv. Mater. 2018, 30, 1804707.

[48] W. Eaton Samuel, M. Lai, A. Gibson Natalie, B. Wong Andrew, L. Dou, J. Ma, L.-W. Wang, R. Leone Stephen, P. Yang, P. Natl. A. Sci 2016, 113, 1993.

[49] Y. Zhao, X. Liu, G. Feng, L. Lyu, L. Li, S. Wang, J. Jiang, Y. Li, D. Niu, H. Xie, Y. Gao, Results. Phys 2020, 19, 103590.

[50] H. Xie, D. Niu, Y. Zhao, S. Wang, B. Liu, Y. Liu, H. Huang, P. Wang, D. Wu, Y. Gao, Synthetic. Met 2020, 260, 116261.

[51] D. Yang, X. Zhang, K. Wang, C. Wu, R. Yang, Y. Hou, Y. Jiang, S. Liu, S. Priya, Nano Lett. 2019, 19, 3313.

[52] J. Han, J. Wang, M. Yang, X. Kong, X. Chen, Z. Huang, H. Guo, J. Gou, S. Tao, Z. Liu, Z. Wu, Y. Jiang, X. Wang, Adv. Mater. 2018, 30, 1804020.

[53] C.-H. Chiang, C.-G. Wu, Nat. Photonics 2016, 10, 196.

[54] S. Foster, F. Deledalle, A. Mitani, T. Kimura, K.-B. Kim, T. Okachi, T. Kirchartz, J. Oguma, K. Miyake, J. R. Durrant, S. Doi, J. Nelson, Adv. Energy. Mater 2014, 4, 1400311.

[55] Z. Ahmad, M. Awais, M. A. Najeeb, R. A. Shakoor, F. Touati, Springer International Publishing Cham 2017, 95.

[56] A. S. Shikoh, Z. Ahmad, F. Touati, R. A. Shakoor, J. Bhadra, N. J. Al-Thani, RSC Adv. 2017, 7, 35445.

[57] F.-C. Wu, P.-R. Li, B.-R. Lin, R.-J. Wu, H.-L. Cheng, W.-Y. Chou, ACS. Appl. Mater. Interfaces 2021, 13, 45822.

[58] T. Chang, S.-H. Jo, W. Lu, ACS Nano 2011, 5, 7669.

[59] L. Wu, A. Wang, J. Shi, J. Yan, Z. Zhou, C. Bian, J. Ma, R. Ma, H. Liu, J. Chen, Y. Huang, W. Zhou, L. Bao, M. Ouyang, S. J. Pennycook, S. T. Pantelides, H.-J. Gao, Nat. Nanotechnol. 2021, 16, 882.

[60] J. Meng, T. Wang, Z. He, Q. Li, H. Zhu, L. Ji, L. Chen, Q. Sun, D. W. Zhang, Nano Res. 2021, 15, 2472.

[61] Y. Meng, F. Li, C. Lan, X. Bu, X. Kang, R. Wei, S. Yip, D. Li, F. Wang, T. Takahashi, T. Hosomi, K. Nagashima, T. Yanagida, J. C. Ho, Sci. Adv. 2020, 6, 6389.

[62] S. Hong, H. Cho, B. H. Kang, K. Park, D. Akinwande, H. J. Kim, S. Kim, ACS Nano 2021, 15, 15362.

[63] C.-Y. Wang, S.-J. Liang, S. Wang, P. Wang, Z. a. Li, Z. Wang, A. Gao, C. Pan, C. Liu, J. Liu, H. Yang, X. Liu, W. Song, C. Wang, B. Cheng, X. Wang, K. Chen, Z. Wang, K. Watanabe, T. Taniguchi, J. J. Yang, F. Miao, Sci. Adv. 2020, 6, 6173.

[64] P. Yao, H. Wu, B. Gao, J. Tang, Q. Zhang, W. Zhang, J. J. Yang, H. Qian, Nature 2020, 577, 641.

[65] H. Jang, C. Liu, H. Hinton, M.-H. Lee, H. Kim, M. Seol, H.-J. Shin, S. Park, D. Ham, Adv. Mater. 2020, 32, 2002431.

[66] M. Prezioso, F. Merrikh-Bayat, B. D. Hoskins, G. C. Adam, K. K. Likharev, D. B. Strukov, Nature 2015, 521, 61.

[67] Z. Fan, J. C. Ho, Z. A. Jacobson, R. Yerushalmi, R. L. Alley, H. Razavi, A. Javey, Nano Lett. 2008, 8, 20.

[68] T. Takahashi, K. Takei, J. C. Ho, Y.-L. Chueh, Z. Fan, A. Javey, J. Am. Chem. Soc. 2009, 131, 2102

SUMMARY OF INVENTION

Accordingly, the invention in one aspect provides an artificial photosynaptic device comprising organic molecule-nanowire heterojunctions.

In some embodiments, the artificial photosynaptic device further includes a first heterojunction formed by wrapping a first organic material film around a first nanowire device, and a second heterojunction formed by wrapping a second organic material film around a second nanowire device.

In some embodiments, the first and second nanowire devices are printed nanowire arrays.

In some embodiments, the first and second nanowire devices are III-V semiconductor nanowire arrays.

In some embodiments, the first and second nanowire devices are InGaAs (indium gallium arsenide) nanowire arrays.

In some embodiments, the first organic material film is different from the second organic material film so that the artificial photosynaptic device has a tunable photoconductivity.

In some embodiments, the first organic material film is C8-BTBT, and the second organic material film is $PC_{61}BM$.

In some embodiments, the InGaAs nanowire arrays are synthesized through a two-step catalytic solid-source chemical vapor deposition (CVD) method.

In some embodiments, persistent negative photoconductivity (NPC) or positive photoconductivity (PPC) is induced in the first and second heterojunctions.

In some embodiments, the III-V semiconductor nanowire arrays are either p-type, n-type or ambipolar.

In some embodiments, the III-V semiconductor nanowire arrays are either binary, ternary or quaternary.

In some embodiments, the III-V semiconductor nanowire arrays are located on or beneath the first organic material film or the second organic material film.

In some embodiments, a dielectric layer of the device is a thermally grown SiO2 layer on Si wafers.

According to another aspect of the invention, there is provided a method of manufacturing an artificial photosynaptic device containing organic molecule-nanowire heterojunctions, the method includes the steps of ultraviolet (UV) photolithography, spin-coating and electron beam lithography.

BRIEF DESCRIPTION OF FIGURES

The foregoing and further features of the present invention will be apparent from the following description of embodiments which are provided by way of example only in connection with the accompanying figures, of which:

FIG. 2a shows a schematic illustration of a biological synapse.

FIG. 2b shows transfer curves of an artificial photosynaptic device photosynapses according to an embodiment of the invention which is configured with printed InGaAs NW arrays wrapped with the C8-BTBT film, under 405 nm light irradiation with different power densities.

FIG. 2c illustrates EPSC (excitatory postsynaptic current) behavior of the artificial photosynaptic device under 450 nm with a power density of 0.16 mW/mm$^2$.

FIG. 2d illustrates EPSC behavior of the artificial photosynaptic device under 405 nm with a power density of 0.16 mW/mm$^2$.

FIG. 3a shows the photoluminescence (PL) spectra of the C8-BTBT film and InGaAs/C8-BTBT heterojunction.

FIG. 3b illustrates the corresponding time-resolved PL of the C8-BTBT film and InGaAs/C8-BTBT heterojunction.

FIG. 3c is a X-ray photoelectron spectroscopy (XPS) of the C8-BTBT film and InGaAs/C8-BTBT heterojunction.

FIG. 3d shows EPSC behaviors of the artificial photosynaptic device with a single light pulse of different wavelengths.

FIG. 4e illustrates EPSC behaviors of the synaptic device under 450 nm light pulse with different pulse widths.

FIG. 4f illustrate EPSC behaviors of the synaptic device with different numbers of 450 nm light pulses and the fixed frequency (1.5 Hz).

FIG. 5a shows a synergistic photoelectric modulation for long-time memory with InGaAs/C8-BTBT heterojunction device, the optical memory function realized with the artificial photosynaptic device arrays.

FIG. 5b shows corresponding relaxation time fitted with the Kohlrausch stretched exponential function.

FIG. 6a is a schematic illustration of the human visual system.

FIG. 6b is a demonstration of the kernel array network in a hardware kernel for simulating the visual processing and recognition functions of the human eye based on NPC and PPC devices.

FIG. 6c shows functions of visual processing based on the hardware kernel.

FIG. 11a illustrates a molecular structure of C8-BTBT.

FIG. 11b shows the output curves of the device with C8-BTBT/InGaAs.

FIG. 11c depicts NPC phenomenon of the device with C8-BTBT/InGaAs.

FIG. 15a illustrates the photoresponse of the printing InGaAs NWs with 405 nm light.

FIGS. 15b and 15c illustrate EPSCs of the photosynaptic device with 450 nm light with different power densities.

FIG. 16a illustrates PPF behaviors of the synaptic device with C8-BTBT/InGaAs with the fixed interspike interval ($\Delta$Time=3 s) and a light power density of 0.32 mW/mm$^2$.

FIG. 16b illustrates PPF behaviors of the synaptic device with C8-BTBT/InGaAs with the fixed interspike interval ($\Delta$Time=3 s) and a light power density of 0.96 mW/mm$^2$.

FIG. 16c illustrates PPF behaviors of the synaptic device with C8-BTBT/InGaAs with the fixed interspike interval ($\Delta$Time=3 s) and a light power density of 1.3 mW/mm$^2$.

FIG. 16d illustrates PPF behaviors of the synaptic device with C8-BTBT/InGaAs with the fixed interspike interval ($\Delta$Time=3 s) and a light power density of 1.8 mW/mm$^2$.

FIG. 16e illustrates PPF behaviors of the synaptic device with C8-BTBT/InGaAs with the fixed interspike interval ($\Delta$Time=3 s) and a light power density of 2.1 mW/mm$^2$.

FIG. 16f illustrates PPF behaviors of the synaptic device with C8-BTBT/InGaAs with the fixed interspike interval ($\Delta$Time=3 s) and a light power density of 2.4 mW/mm$^2$.

FIGS. 17a-17f show PPF behaviors of the synaptic device with C8-BTBT/InGaAs with the fixed power density (450 nm, 0.96 mW/mm$^2$) and different interspike intervals ($\Delta$Time).

FIGS. 18a-18g show respectively PPF behaviors of the synaptic device with C8-BTBT/InGaAs with the fixed power density (405 nm, 0.17 mW/mm$^2$) and different interspike intervals ($\Delta$Time).

FIG. 19a illustrates the band gap of C8-BTBT from the PL spectrum.

FIG. 19b illustrates the absorption of C8-BTBT film.

FIG. 20a shows the absorption of the InGaAs NWs.

FIG. 20b illustrates the corresponding (ahv)$^2$-hv curves of the InGaAs NWs.

FIG. 25a illustrates the molecular structure of PC$_{61}$BM.

FIG. 25b is an optical image of the device with PC$_{61}$BM/InGaAs.

FIG. 25c shows the AFM image of PC$_{61}$BM film covered InGaAs NWs.

FIG. 26a illustrates the absorption of PC$_{61}$BM film.

FIG. 26b shows the band structure of PC$_{61}$BM/InGaAs.

FIG. 27a shows the PL of the devices with PC$_{61}$BM/InGaAs.

FIG. 27b shows time-resolved PL of the devices with PC$_{61}$BM/InGaAs.

FIGS. 28a-28h illustrate PPF behaviors of the synaptic device with PC$_{61}$BM/InGaAs with the fixed power density (405 nm) and different $\Delta$Time.

FIGS. 29a-29h illustrate PPF behaviors of the synaptic device with PC$_{61}$BM/InGaAs with the fixed power density (450 nm) and different $\Delta$Time.

FIG. 32a shows the 261 nm laser stimuli applied to C8-BTBT/InGaAs and $PC_{61}BM$/InGaAs photosynaptic devices, respectively, to achieve the long-term memory function.

FIG. 32b shows the 532 nm laser stimuli applied to C8-BTBT/InGaAs and $PC_{61}BM$/InGaAs photosynaptic devices, respectively, to achieve the long-term memory function.

FIGS. 33a-33c illustrate photoresponse of NPC devices with different light power densities and wavelengths.

FIGS. 34a-34c illustrate photoresponse of PPC devices with different light power densities and wavelengths.

DETAILED DESCRIPTION

The visual system, one of the most crucial units of the human perception system, combines the functions of multi-wavelength signal detection and data processing. Embodiments of the invention as will be described hereinafter provide large-scale artificial synaptic device arrays based on the organic molecule-nanowire heterojunctions with tunable photoconductivity.

Figure 1A:
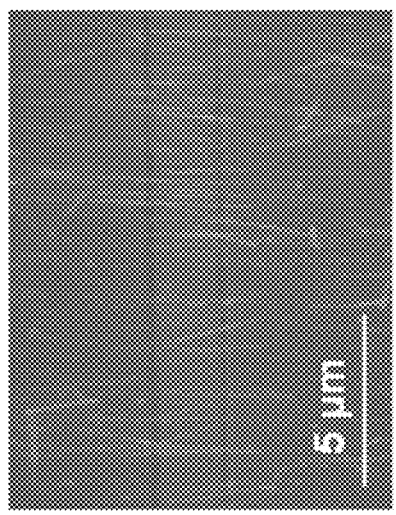
FIG. 1a is a schematic illustration of a photosynaptic device structure according to one embodiment of the invention.

Referring to FIG. 1a, the first embodiment of the invention is an artificial photo-synaptic device 20 that includes organic molecule-nanowire heterojunctions. The device 20 is configured with printed InGaAs NW arrays 22 and top-wrapped organic semiconductor films 24. The device 20 further contains source/drain (S/D) metal contact electrodes 30 which are made from nitride (Ni). The InGaAs NW arrays 22 are parallel to each other, and are supported on top of a Silicon dioxide ($SiO_2$) layer 26 which is further configured on top of a silicon (Si) layer 28. In one implementation, the Si layer 28 is highly boron-doped p-type wafer pieces. The $SiO_2$ layer 26 is a 50 nm thick thermally grown gate oxide, and the metal contact electrodes 30 are thermally deposited on the $SiO_2$ layer 26 and having a thickness of 50 nm.

As skilled persons would understand, InGaAs is an alloy of gallium arsenide and indium arsenide. In a more general sense, it belongs to the InGaAsP quaternary system that consists of alloys of indium arsenide (InAs), gallium arsenide (GaAs), indium phosphide (InP), and gallium phosphide (GaP). As gallium and indium belong to Group III of the Periodic Table, and arsenic and phosphorous belong to Group V, these binary materials and their alloys are all III-V compound semiconductors.

The organic semiconductor films 24 are organic thin films of p-type 2,7-dioctyl[1]benzothieno[3,2-b][1] benzothiophene (C8-BTBT) or n-type phenyl-C61-butyric acid methyl ester ($PC_{61}BM$), which are used to wrap the InGaAs NW arrays 22 to configure two different type-I heterojunctions (i.e., p-n C8-BTBT/InGaAs and n-n $PC_{61}BM$/InGaAs), respectively. The two type-I heterojunctions (i.e., InGaA s/C8-BTBT and InGaAs/$PC_{61}BM$) can effectively mimic the essential synaptic visual behaviors, such as paired-pulse facilitation (PPF) and EPSC, based on their different photoconductivities. Due to the difference in carrier injection, persistent negative photoconductivity (NPC) or positive photoconductivity (PPC) are achieved in these heterojunctions.

Now turning to the operation principle of the artificial photo synaptic device 20. Irradiation with different wavelengths (solar-blind to visible ranges) and power densities can stimulate the photosynaptic device 20, effectively mimicking the synaptic behaviors with two different photoconductivities. Long-term memory (LTM) and multi-state light memory are also realized through synergistic photoelectric modulation. Notably, the InGaAs NW arrays 22 with NPC and PPC phenomena are adopted to build the hardware kernel for the visual system. Due to the tunable photoconductivity and response to multiple wavelengths, the recognition rate of neural networks with hardware kernels can reach 100% with lower complexity and power consumption. As will be demonstrated later, the artificial photo-synaptic device 20 has retina-like behaviors and capabilities for large-area integration, which reveals their promising potential for artificial visual systems.

Because of the different major carriers in the two different organic materials (i.e., p-type C8-BTBT and n-type $PC_{61}BM$), tunable photoconductivity could be achieved under irradiation stimuli from the UV to the visible range. It is revealed that the hole carriers of C8-BTBT or the electron carriers of $PC_{61}BM$ would inject into InGaAs NWs under optical stimuli, which induced the NPC or PPC accordingly. Owing to the high surface-to-volume ratio of InGaAs NWs, these two different heterojunctions can readily realize the well-defined synaptic functions.[28, 29] It is remarkable that the short-term plasticity (STP), LTM, EPSC, inhibitory postsynaptic current (IPSC), and long-term potentiation/depression (LTP/LTD) synaptic behaviors are reliably demonstrated with both visible and UV lasers, including the solar-blind range.[30, 31] In contrast to single NW-based devices, the integration of printed NW arrays and solution-processed organic materials illustrate their great potential as active materials for large-area neural visual networks. A prototype of 4×4 artificial photosynaptic device arrays was demonstrated with optical memory function under the application of gate bias voltage (V G). At the same time, two photosynaptic devices with tunable photoconductivity (i.e., InGaAs/C8-BTBT for NPC and InGaAs/$PC_{61}BM$ for PPC) were employed to construct the hardware kernel for simulating visual processing and recognition of the human eye. Each of the two photosynaptic devices has a structure similar to the artificial photo-synaptic device 20 shown in FIG. 1a. Different hardware kernels can detect various features in the image, such as the receptive field of the human retina. Then, these features were put into a neural network to classify 6 different letters with different colors. An impressive 100% classification accuracy was achieved, while only 51% was realized without hardware kernels. All these results evidently indicate the promising potential of these photosynaptic devices based on organic molecule-nanowire heterojunctions for practical utilization in artificial visual systems.

Figure 7:
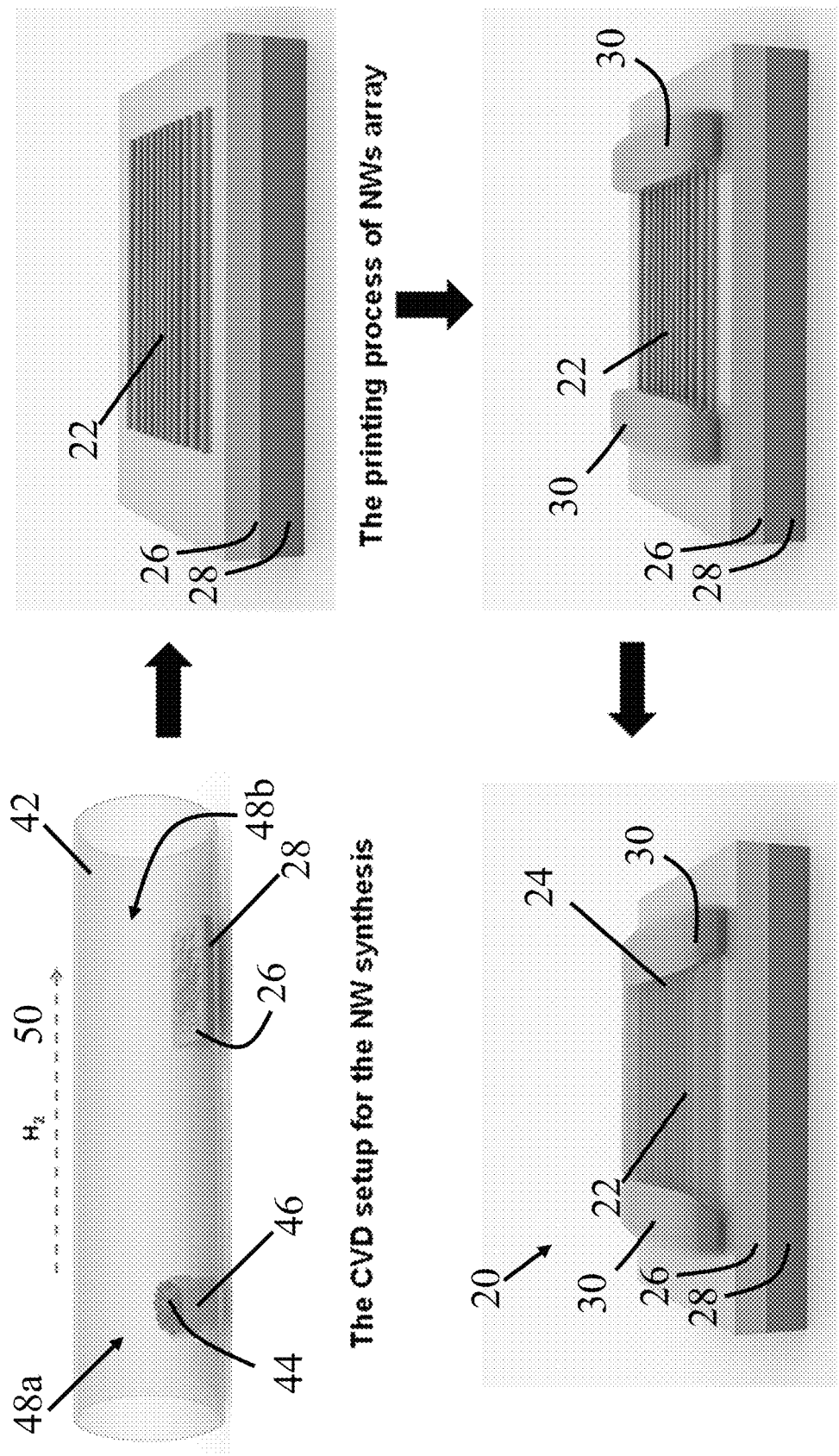
FIG. 7 is a schematic illustration of the fabrication procedures of photosynaptic devices array according to one embodiment of the invention.
Figure 8A:
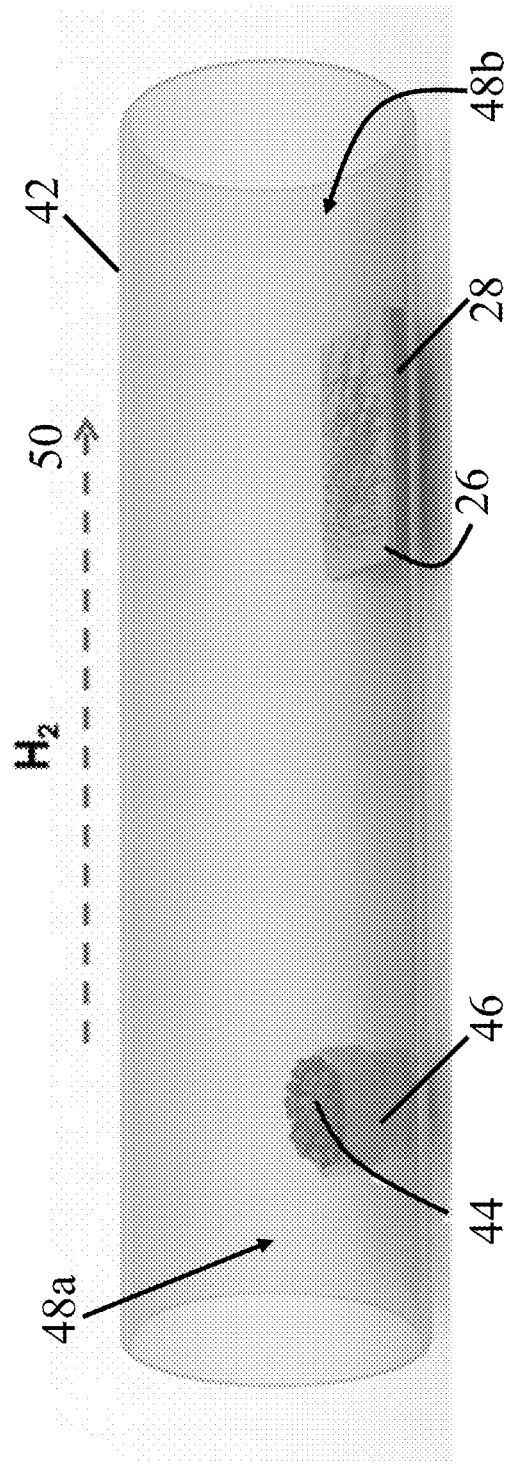
FIG. 8a shows a schematic illustration of the CVD setup for the NW synthesis.

According to one embodiment of the invention, there is provided a method of fabricating InGaAs NWs and the artificial photosynaptic device, with references to FIGS. 7 and 8a. The schematic illustration of the CVD setup for the NW synthesis is shown in FIG. 8a. In addition, FIG. 7 illustrates the method flow of fabricating the InGaAs NWs and then the artificial photosynaptic device. FIG. 1a as described above depicts the schematic illustration of the artificial photosynaptic device 20 configured with printed InGaAs NW arrays and top-wrapped organic semiconductor films, and the artificial photosynaptic device 20 of FIG. 1a is used as example in FIG. 7 to illustrates the method flow. It should be emphasized that the artificial photosynaptic device 20 of FIG. 1a may also be fabricated using any other suitable method and is not limited by the method shown in FIGS. 7 and 8a.

In the method, the InGaAs NWs are synthesized through the two-step catalytic solid-source CVD method reported in previous works[28, 32]. In particular, as shown in FIGS. 7 and 8a, InGaAs nanowires are synthesized on SiO$_2$/Si wafer pieces 26, 28 (which includes a 50 nm thick thermally grown oxide that is the SiO2 layer 26 as mentioned above) in a two-zone horizontal tube furnace 42 using a chemical vapor transport method (see FIG. 7). The mixed InAs and GaAs powders 44 (with a ratio of 1:9 in wt. %) are loaded into a boron nitride crucible 46 placed at the upstream zone 48a of the furnace 42. The growth substrate pre-deposited with a 0.5 nm thick (nominal thickness) Au film (not shown) as the catalyst is set at the downstream zone 48b of the furnace 42. The temperature of the downstream zone is first elevated to 800° C. and kept for 10 minutes in order to anneal the Au catalyst. Then, the temperature of the downstream zone 48b is cooled directly to the growth temperature (660° C.) for the first step of growth, and the source temperature starts to elevate simultaneously. When the source temperature reaches the designated value (820° C.), the first nucleation step begin. After 1-2 minutes, the downstream is stopped with the heating and then cooled to a second step growth temperature (580° C.). Finally, the second step of growth lasts for 40 minutes. During the entire growth process, hydrogen (99.9995%) is used as a carrier gas, with the flowrate maintained at 100 sccm. The arrow 50 in FIGS. 7 and 8a show the flow direction of hydrogen as the carrier gas in the furnace 42.

After the InGaAs NWs are synthesized, as shown in FIG. 7 the method then goes to the fabrication of the photosynaptic device. The well-developed contact printing technique is adopted to fabricate NW parallel arrays 22 on the highly boron-doped p-type Si substrates 26, 28 with a 50 nm thick thermally grown gate oxide which is the SiO$_2$ layer 26.[67, 68] Photolithography is utilized to define the source and drain regions, while 50 nm thick Ni is thermally deposited as the top electrodes 30, followed by the lift-off process. The C8-BTBT and PC$_{61}$BM are dissolved in chlorobenzene with concentrations of 20 mg/ml and 25 mg/ml, respectively. The spin-coating method is utilized to fabricate top-wrapped C8-BTBT film (not shown in FIG. 7) with 2000 rpm per 30 s. After the spin-coating process, the film is annealed at 100° C. for 5 min. The PC$_{61}$BM organic film (not shown in FIG. 7) is fabricated by the same spin-coating method with 1800 rpm per 30 s, followed by annealing at 60° C. for 5 min. By now, the artificial photosynaptic device 20 of FIG. 1 is fabricated.

In an experimental setup of the above-mentioned method, the electrical performance of the FETs is then characterized with a standard electrical probe station and an Agilent 4155C semiconductor analyzer (Agilent Technologies, Santa Clara, CA). The morphologies and EDS mapping of as-prepared NWs were examined using scanning electron microscopy (SEM, Quanta 450 FEG, FEI) and HRTEM, Thermo Scientific, Talos F200X). The morphologies of organic films were evaluated by AFM (Bruker Dimension Icon AFM). The band structure of NWs was investigated by UPS (ThermoFisher, ESCALAB 250Xi). The charge transfer process was characterized by PL and time-resolved PL (FLS980).

Figure 1B:
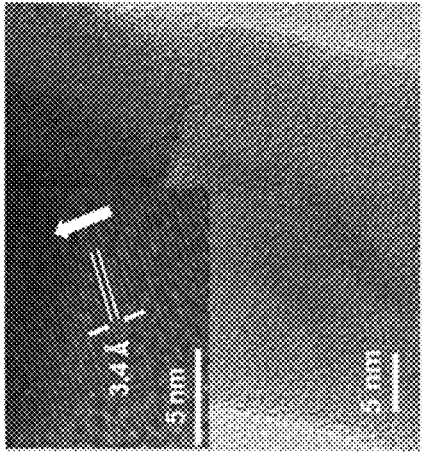
FIG. 1b is a high-resolution transmission electron microscopy (HRTEM) image of a typical InGaAs NW, and the inset demonstrates the lattice spacing along the <111> direction of the NW.
Figure 1C:
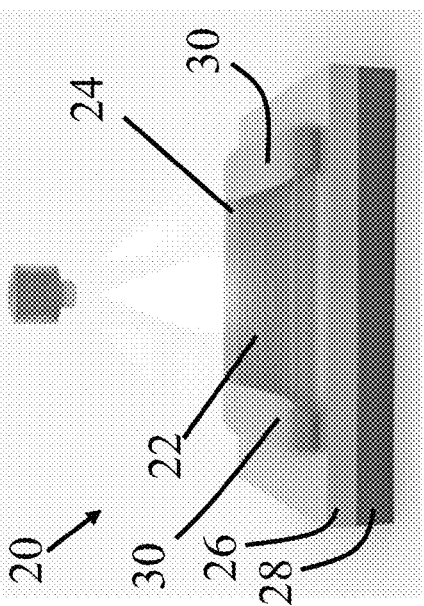
FIG. 1c is an Scanning electron microscopy (SEM) image of a printed InGaAs NW arrays device according to one embodiment of the invention.
Figure 1D:
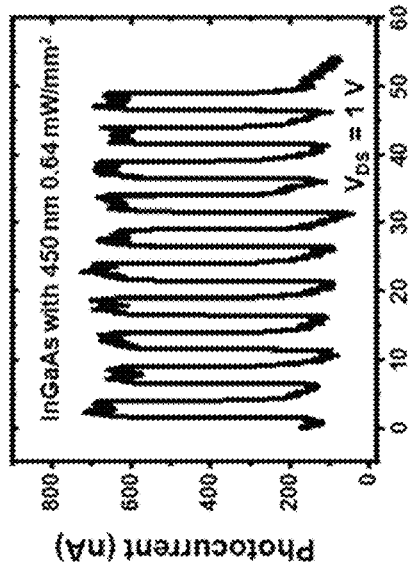
FIG. 1d depicts transfer curves of the obtained InGaAs NWs and artificial photosynaptic devices with and without C8-BTBT.
Figure 8C:
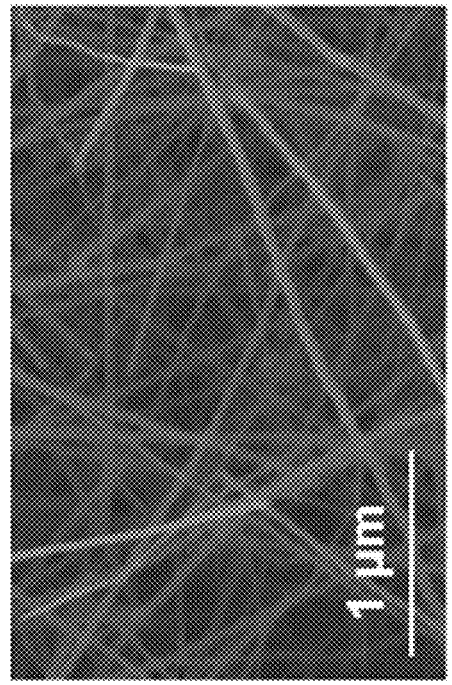
FIG. 8c shows the SEM image of the grown InGaAs NWs with the scale bar at 1 μm.
Figure 8B:
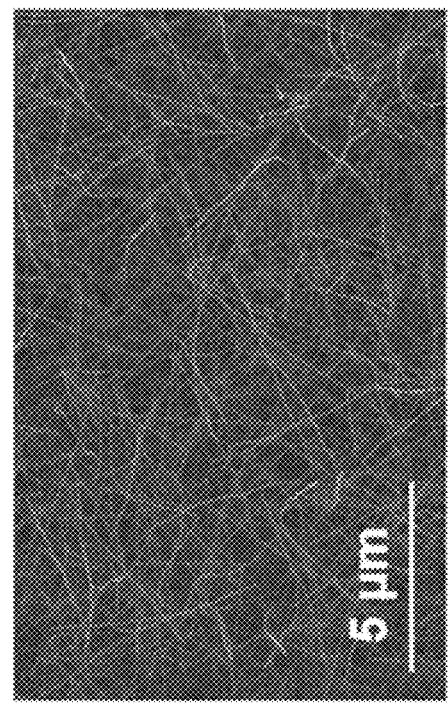
FIG. 8b shows the SEM image of the grown InGaAs NWs with the scale bar at 5 μm.
Figure 9B:
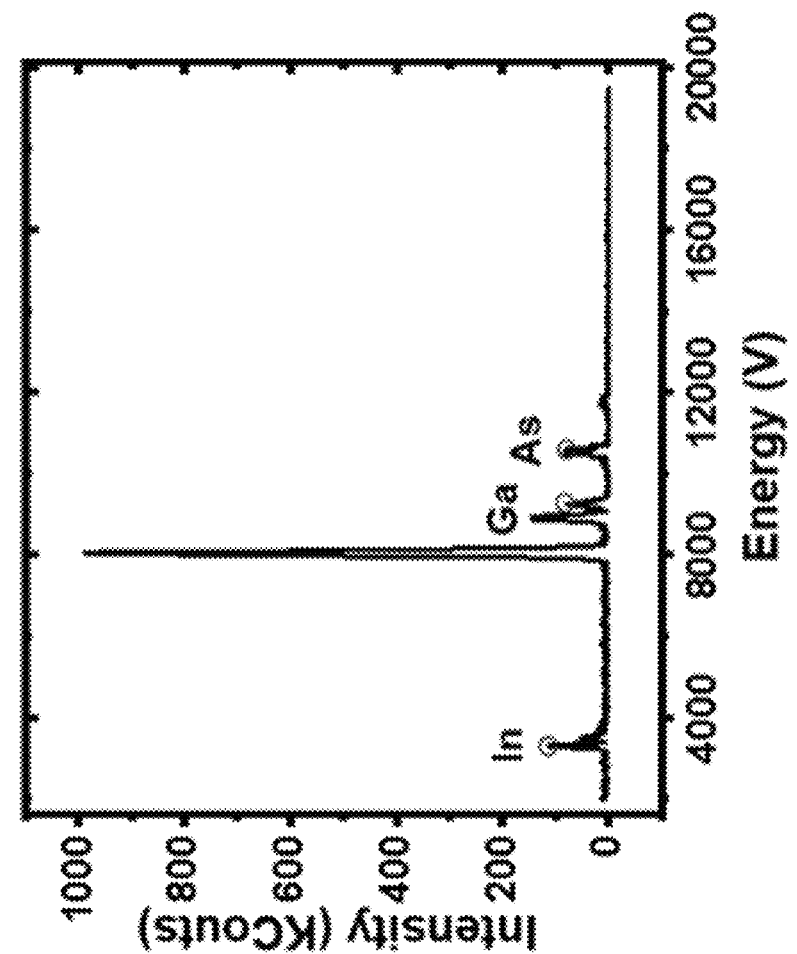
FIG. 9b shows an energy-dispersive X-ray spectroscopy (EDS) spectrum of the corresponding InGaAs NWs.
Figure 9A:
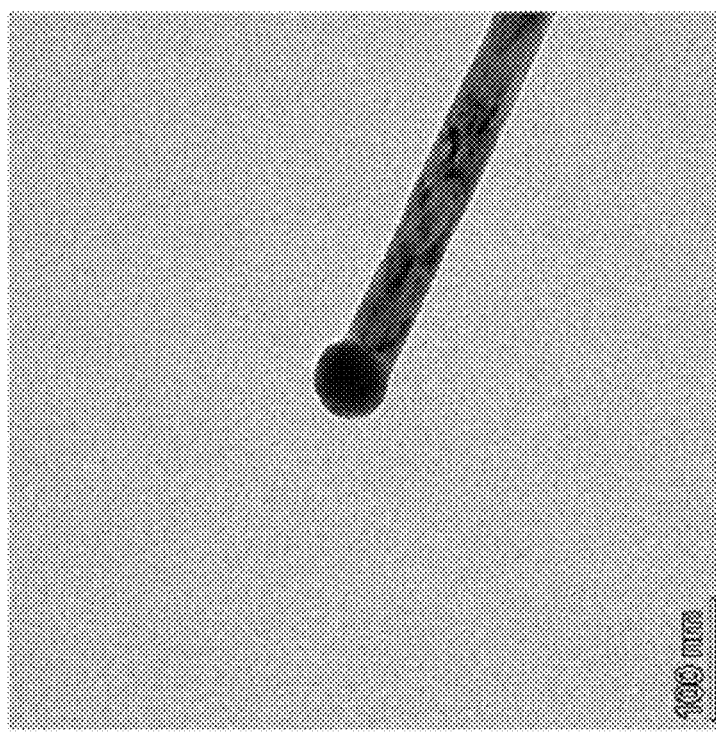
FIG. 9a shows transmission electron microscopy (TEM) images of NW.
Figure 10B:
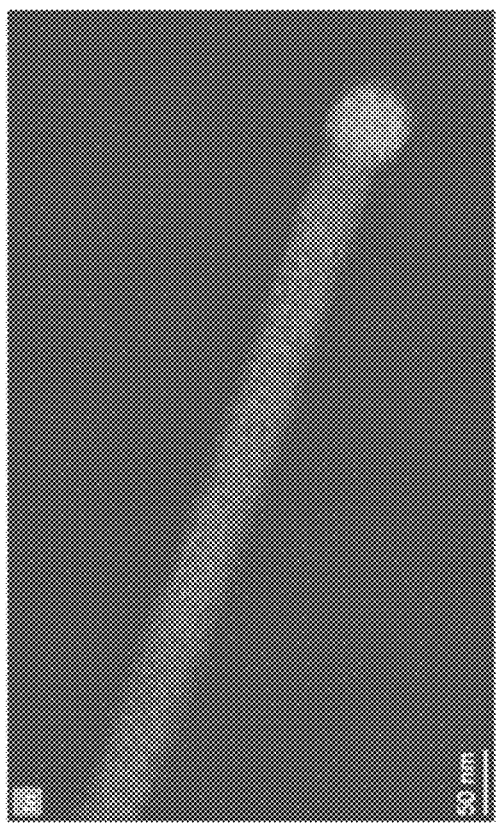
FIGS. 10a-10d show respectively elemental mappings of In, As and Ga of a representative InGaAs NW.
Figure 10D:
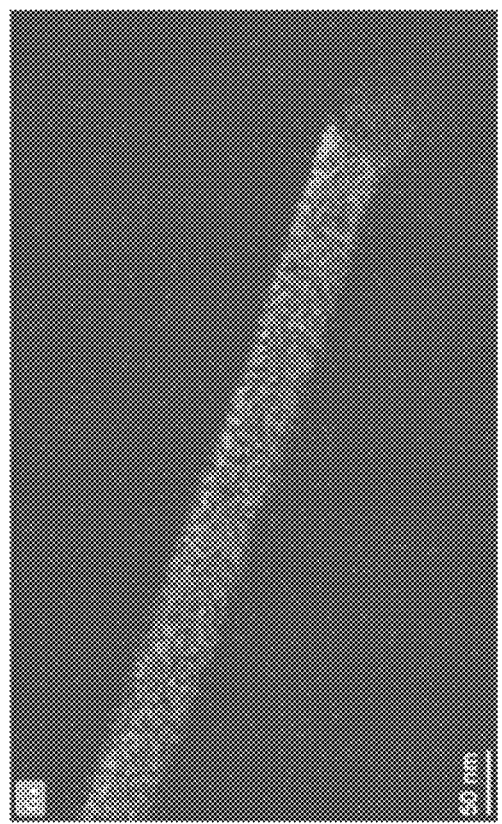
Figure 10A:
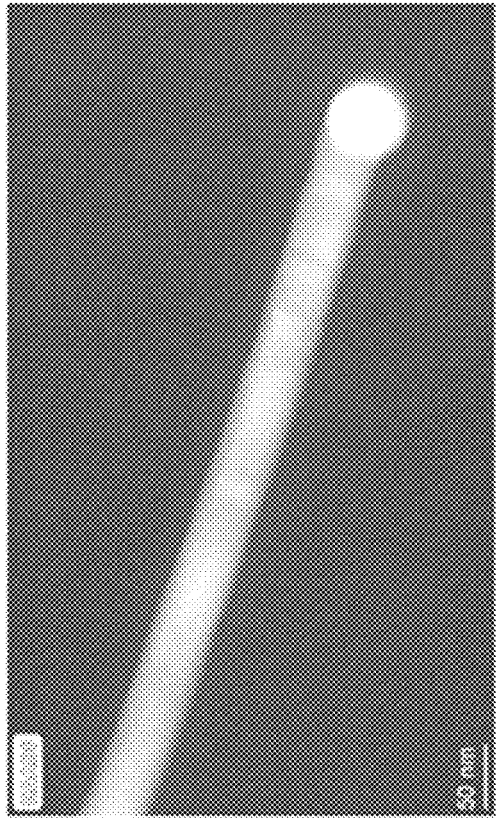
Figure 10C:
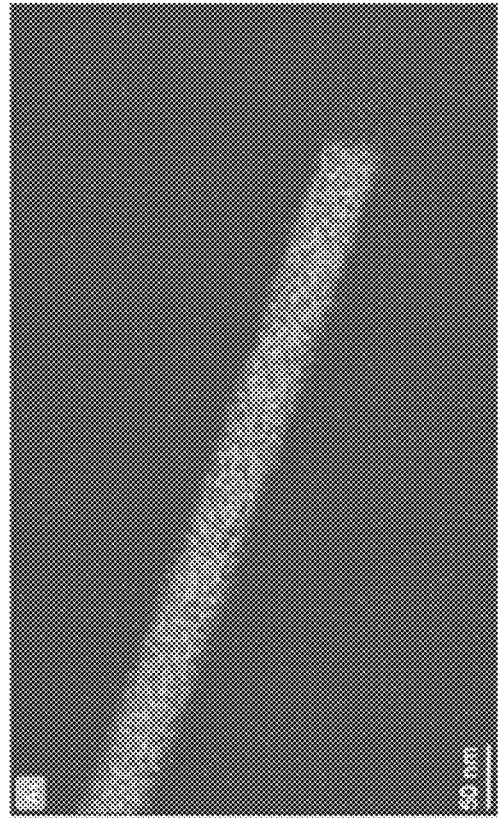

Next, the performance of the artificial photosynaptic device 20 as manufactured using the above method will be discussed and its experimental data will be demonstrated. SEM was first adopted to assess the thickness, length, density, and surface condition of InGaAs NWs obtained by the two-step CVD method (see FIG. 8b and FIG. 8c). Based on the TEM images, spherical catalytic seeds are clearly observed at the NW tips (FIG. 9a), where this observation is consistent with the vapor-liquid-solid (VLS) growth mechanism typically known for InGaAs NWs. [33,34] Obvious lattice fringes are witnessed by HRTEM with a spacing of 0.34 nm between adjacent lattice planes, corresponding to the <111> dominant direction of the InGaAs NWs (FIG. 1b). EDS was then applied to evaluate the composition of the InGaAs NW, which confirmed the composition of In$_x$Ga$_{1-x}$As with x being about 0.49 (FIG. 9b). The corresponding elemental mappings were also obtained, demonstrating the homogenous distribution of In, As and Ga along the NW body (see FIGS. 10a-10d). After material characterization, various steps of the fabrication method described above were applied. In particular, the NW printing process method was used to fabricate large-scale InGaAs NW arrays. Then, photolithography was employed to define the channel region with 2 μm in length, and Ni was used as source/drain (S/D) metal contact electrodes, as presented in FIG. 1c. C8-BTBT is an excellent p-type organic semiconductor widely used for high-performance field-effect transistors, artificial synapses, and phototransistors. The relatively wide band gap (~3.8 eV) of C8-BTBT offers the ability to demonstrate good UV responsive characteristics and potential applications with persistent photoconductivity. [36-38] The molecular structure of C8-BTBT is displayed in FIG. 11a. Spin-coating was adopted to fabricate the C8-BTBT film top-wrapped onto the InGaAs NW arrays to construct the artificial photosynaptic device. Because of the band structure of type-I p-n heterojunction, the conduction band (CB) and valence band (VB) of InGaAs are completely covered by LOMO (lowest unoccupied molecular orbital) and HOMO (highest occupied molecular orbital) levels of C8-BTBT. The transfer curves of the devices with and without C8-BTBT are depicted in FIG. 1d. The decrease of source/drain current ($I_{ds}$) (from 51 μA to 38 μA) and the shift of threshold voltage ($V_{th}$) (from −3.5 V to −2 V) demonstrate that the holes, as the major carrier, injected from C8-BTBT would recombine with the electrons in InGaAs NWs. The output curves of the InGaAs/C8-BTBT device are shown in FIG. 11b, which illustrates the effective V G modulation and ohmic contact of the device. The photoresponse of the devices with and without C8-BTBT is shown in FIG. 1e, which again indicates the reduced photocurrent in InGaAs/C8-BTBT device, consistent with the results of transfer curves. Typically, the InGaAs NWs have strong light absorption in the infrared band, but there is no photoresponse of C8-BTBT film in the same optical band. Therefore, both dark current and photocurrent of the device with organic molecule-nanowire heterojunctions decrease because of the carrier recombination that existed within the InGaAs NWs. It is noted that many intriguing photoelectric properties of 1D NWs are observed, where NPC is one of the most widely investigated phenomena.[39, 40] Due to the narrow band gap of InGaAs, when the short wavelength laser with higher energy is applied, the induced photogenerated hot electrons would be trapped in the surface oxide, which severe as carrier scattering centers. Therefore, according to the thickness and density of the surface oxide layer, the InGaAs NWs devices would randomly show two different photoconductivities.[41, 42] The positive photoconductivity of the printed InGaAs NW arrays with 450 nm wavelength is demonstrated in FIG. 1f. However, after integrating with the p-type organic semiconductor of C8-BTBT to construct type-I p-n heterojunction, the photoconductivity of the devices is unified to exhibit persistent NPC behavior. The NPC of the device with organic molecule-nanowire heterojunctions is depicted in FIG. 11c, while the corresponding NPC mechanism will be discussed later.

Figure 2E:
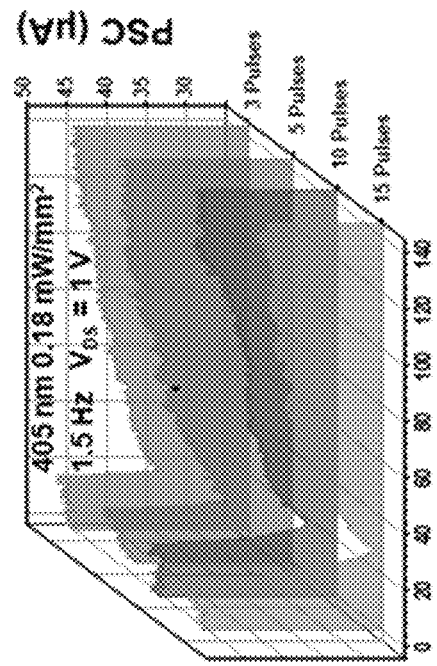
FIG. 2e illustrates EPSC behavior of the artificial photosynaptic device under 405 nm with a power density of 0.26 mW/mm$^2$.
Figure 2F:
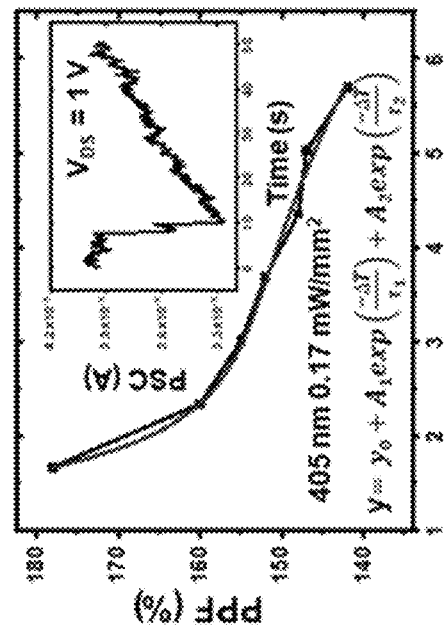
FIG. 2f shows EPSC behaviors of the artificial photosynaptic device with different numbers of 405 nm light pulses and fixed frequency (1.5 Hz).
Figure 2G:
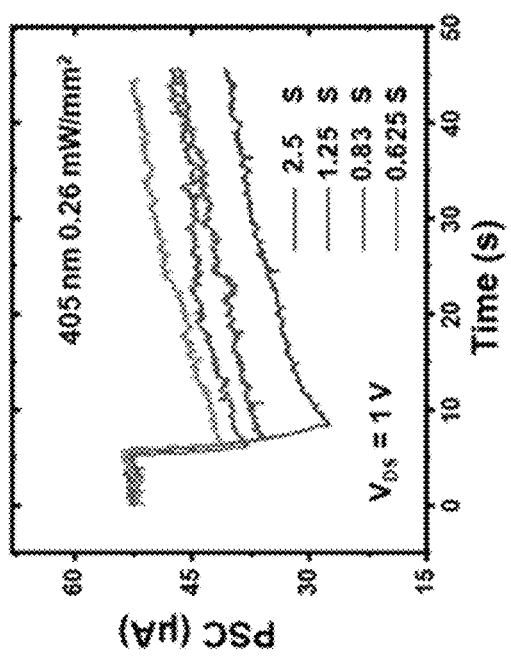
FIG. 2g illustrates the paired-pulse facilitation (PPF) index of the photosynaptic devices under two consecutive pulses with the interval of 450 nm, the insets being the corresponding curve with the highest PPF index value.
Figure 2H:
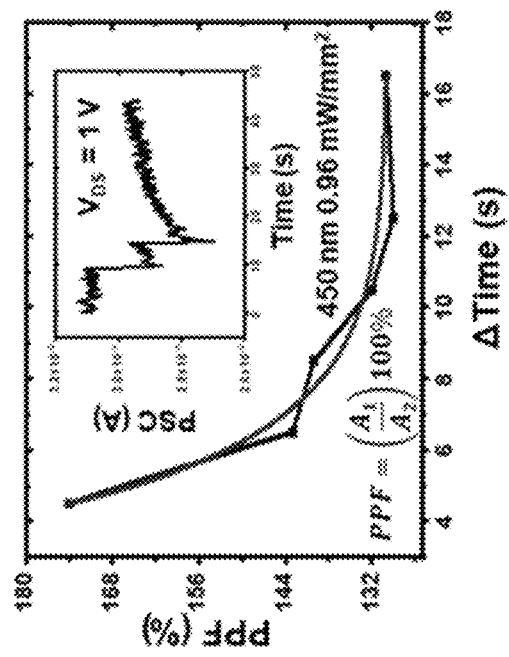
FIG. 2h illustrates the PPF index of the photosynaptic devices under two consecutive pulses with the interval of 405 nm, the insets being the corresponding curve with the highest PPF index value.
Figure 12A:
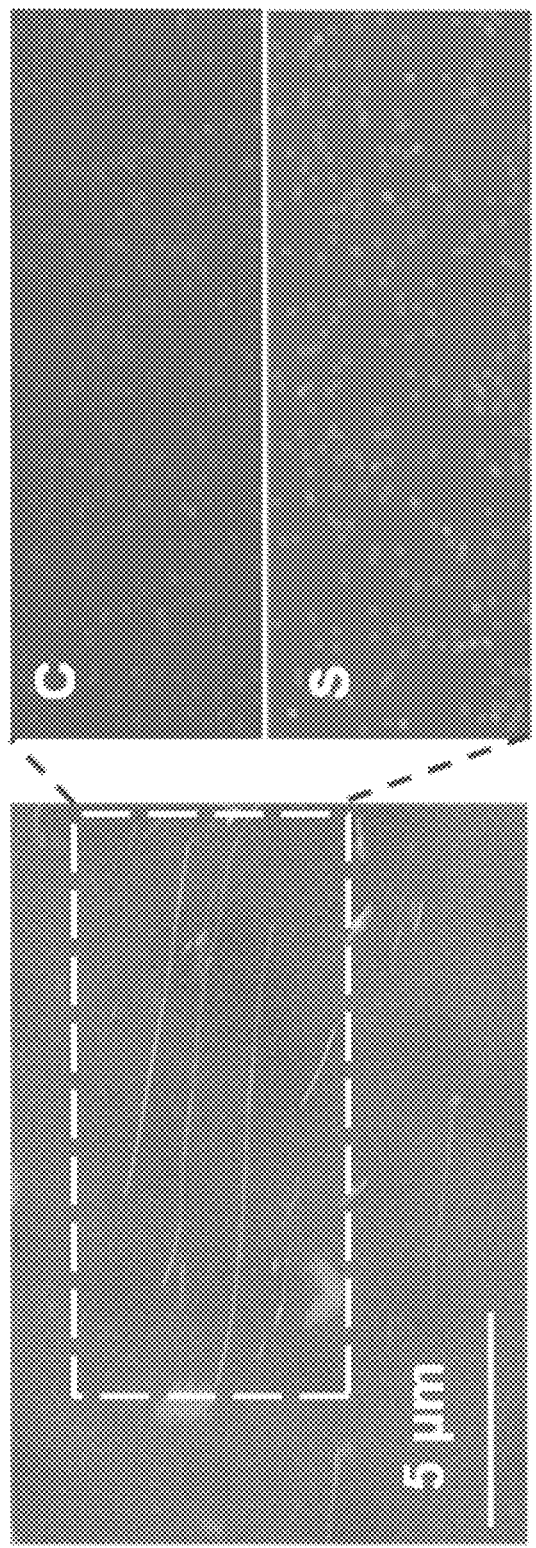
FIG. 12a is a SEM image of InGaAs NWs covered with C8-BTBT film (left) and the EDS of C and S elements which are the components of C8-BTBT (right).
Figure 12B:
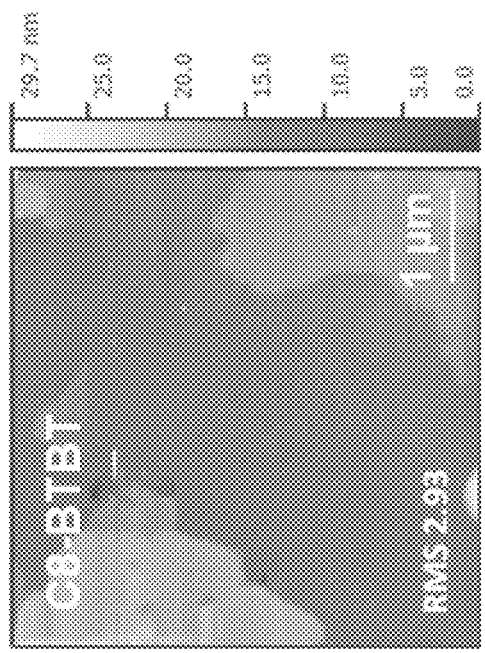
FIG. 12b is an atomic force microscopy (AFM) image of C8-BTBT film covered InGaAs NWs.
Figure 13A:
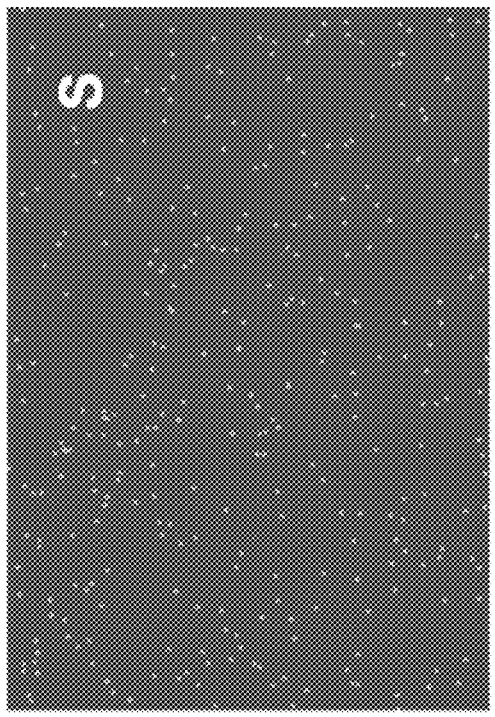
FIGS. 13a-13c are EDS maps of device with C8-BTBT/InGaAs.
Figure 13B:
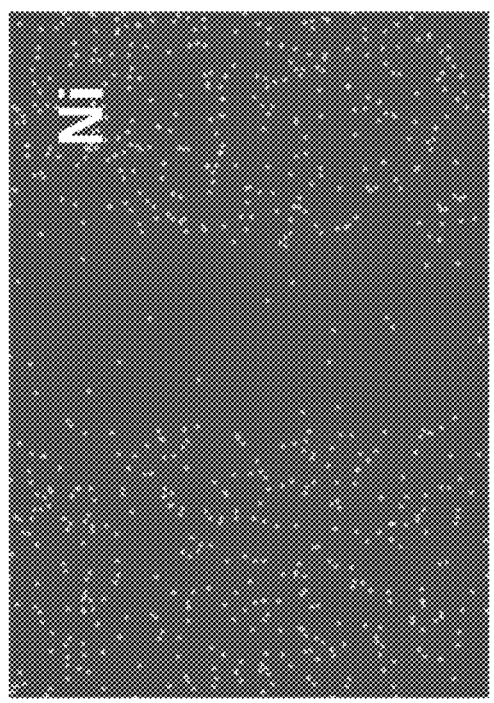
Figure 13C:
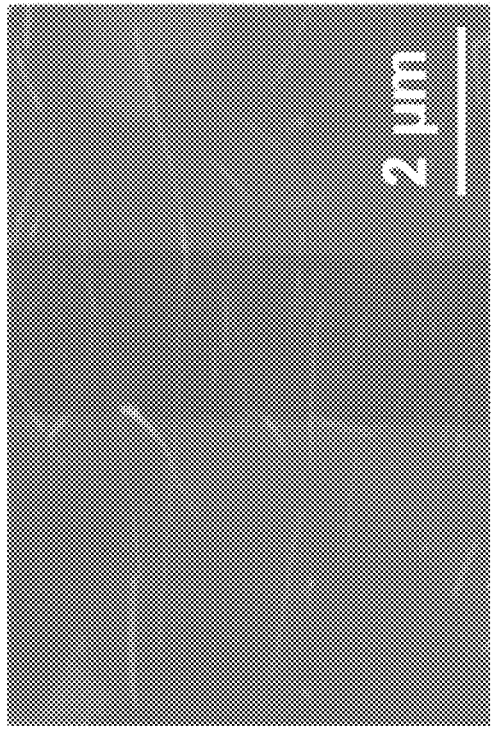
Figure 13D:
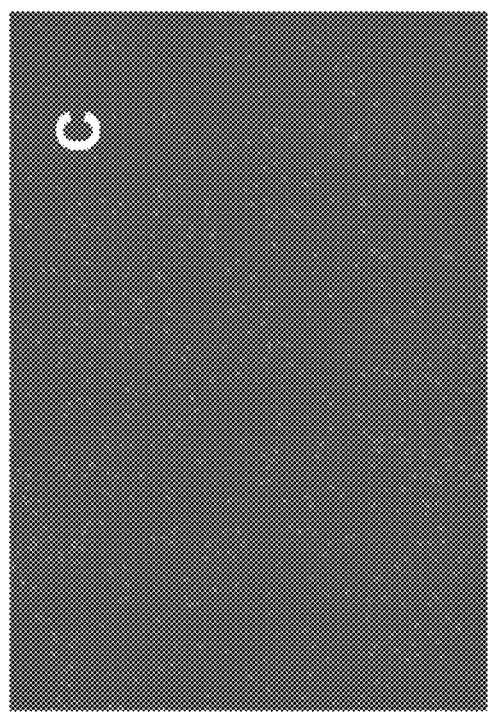
FIG. 13d is the SEM image of the corresponding device.
Figure 14:
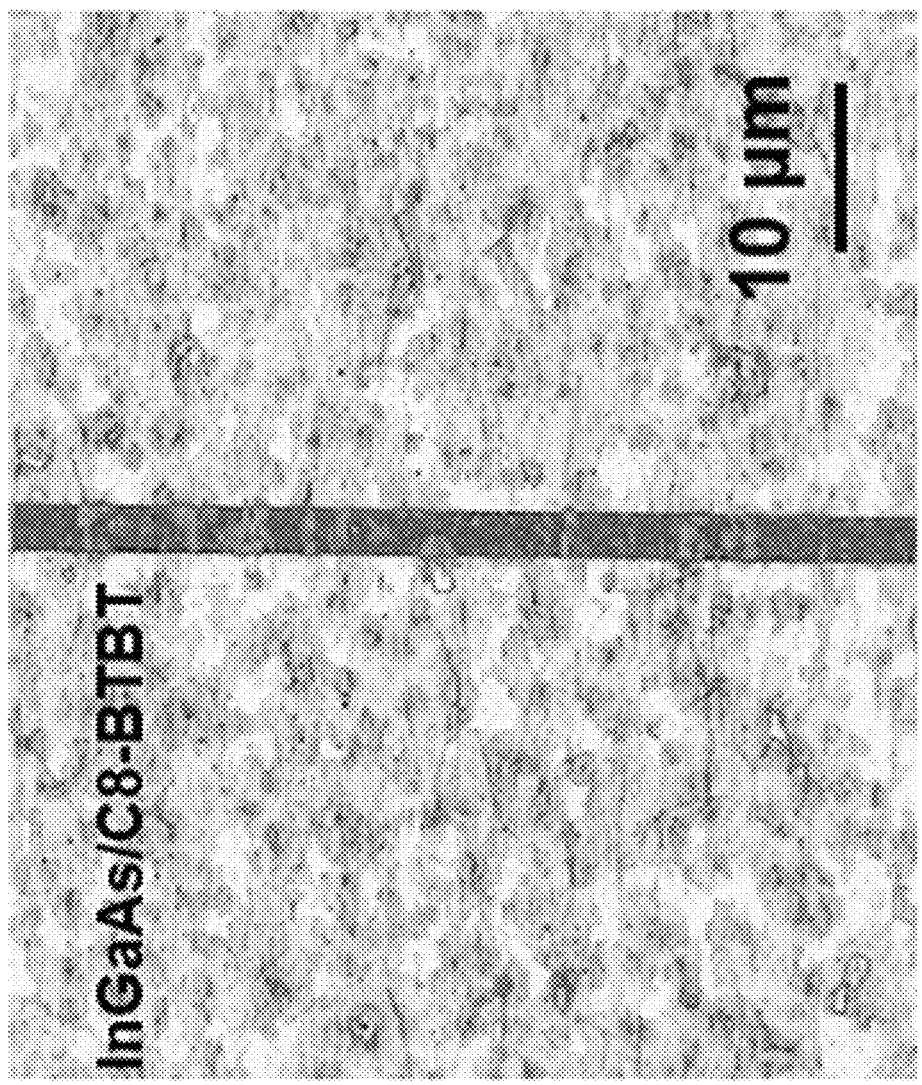
FIG. 14 is an optical image of the device with C8-BTBT/InGaAs.
Figure 17C:
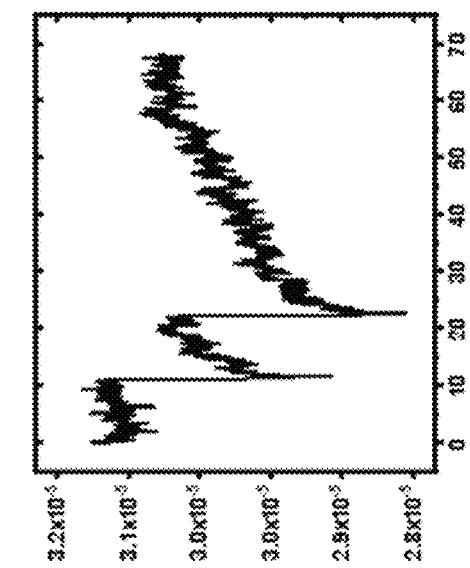
Figure 17D:
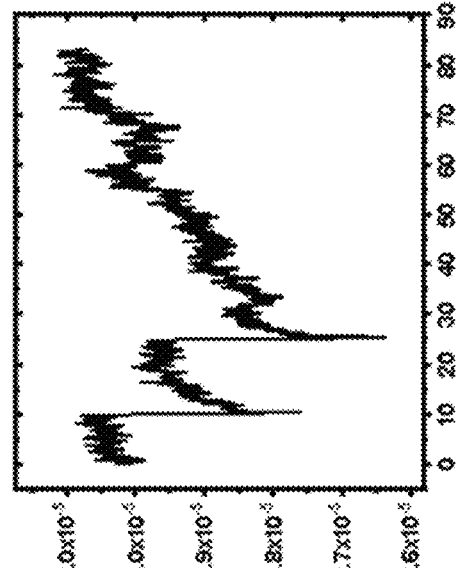
Figure 17E:
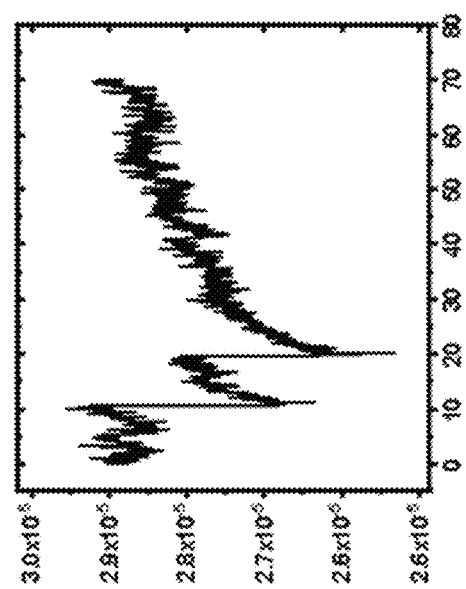
Figure 17F:
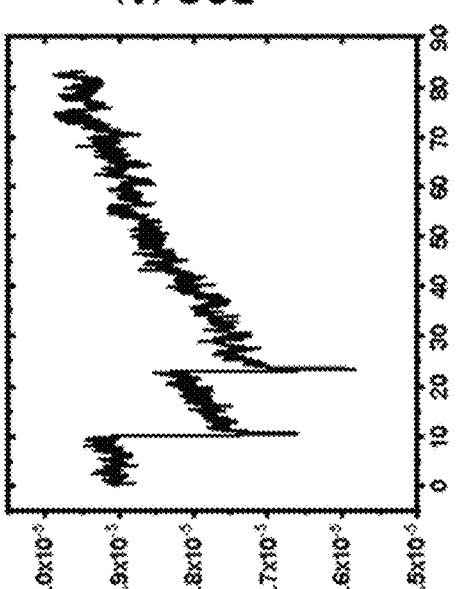
Figure 18F:
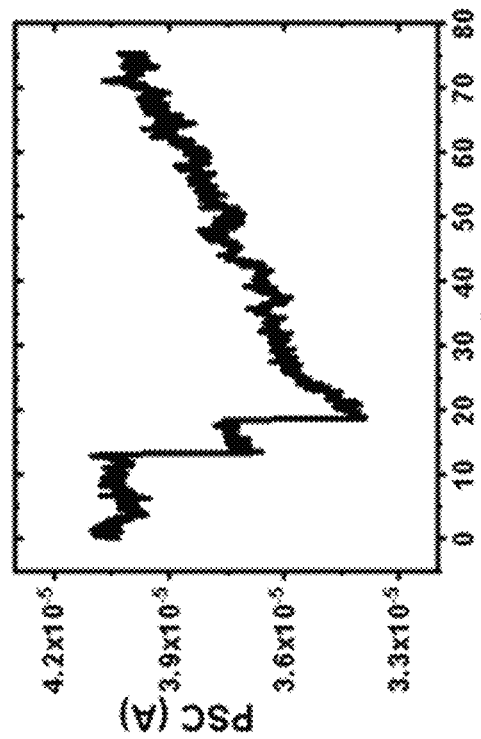
Figure 18E:
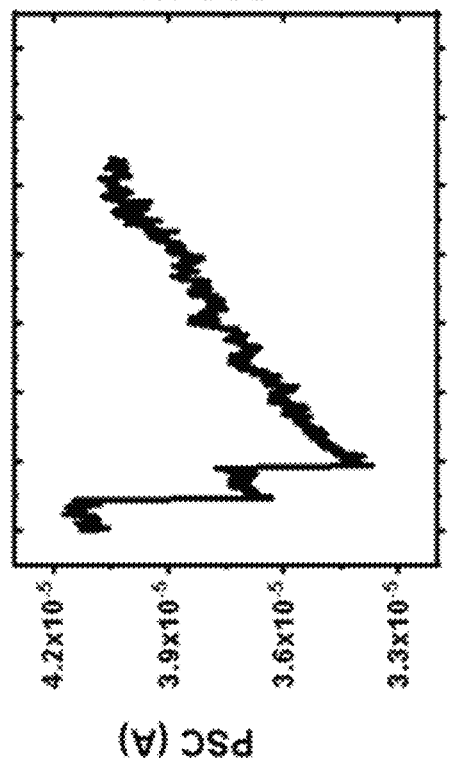
Figure 18G:
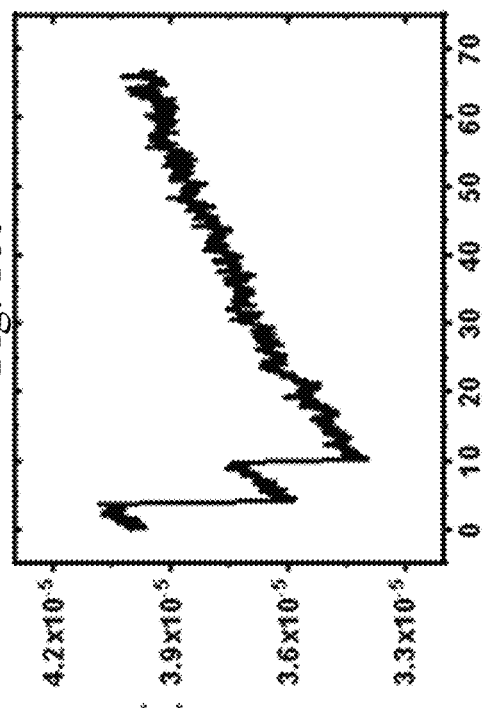

In biological synapses, the neurotransmitters are released by the presynaptic terminal when they receive external signals. The potential in the postsynaptic terminal would change according to the stimuli of neurotransmitters. Here, the stable and controllable persistent NPC phenomenon based on type-I p-n organic molecule-nanowire heterojunctions demonstrates the potential of their use in artificial visual systems. To be specific, FIG. 2a illustrates the schematic of a biological synapse. SEM and AFM are utilized to characterize the morphology of C8-BTBT film covering the NWs (see FIGS. 12a-12b). The uniform distribution of S and C elements with a small surface roughness in the InGaAs/C8-BTBT overlap region demonstrates the high density and smoothness of the deposited organic film. Moreover, the SEM and optical images of the photosynaptic device are also presented in FIGS. 13a-13d and FIG. 14, respectively, again illustrating the good quality of the C8-BTBT film obtained. The transfer curves of the device with NPC characteristics under different power densities of 405 nm laser are shown in FIG. 2b. It is obvious that the decrease in carrier concentration is amplified by the increasing irradiation intensity. The spike-intensity dependent plasticity (SIDP) and spike-time-interval-dependent plasticity of the photosynaptic device with 450 and 405 nm lasers are shown in FIGS. 2c-e, respectively. It is revealed that the value of IPSC is highly dependent on the wavelength, intensity, and duration of the laser irradiation. The two basic synaptic functions are categorized into short-term and long-term memory, demonstrating the ability to inherit and retain synaptic weights. Regardless of increasing the exposure time or laser intensity, the photosynaptic device displays the transformation from short-term to long-term memory (S/LTM). The photoresponse of the printed InGaAs NW arrays with 405 nm laser and the IPSC behaviors of the photosynaptic InGaAs/C8-BTBT device under 450 nm laser with different power densities are given in FIGS. 15a-15c. In addition, different numbers of 405 nm laser pulses are applied to the photosynaptic device to demonstrate the ability of weight inheritance (FIG. 2O. It is unambiguous that with the increasing number of pulses, the LTM phenomenon gradually dominates and the photosynaptic device shows spike-number dependent plasticity (SNDP). Next, PPF, one of the basic synaptic behaviors for decoding the temporal information in neurobiology, is mimicked here with two different laser wavelengths[14]. In this case, two consecutive presynaptic light spikes with different interspike intervals (ΔTime) are applied to mimic the PPF behavior in the photosynaptic device. Moreover, the PPF index can be defined by the ratio of the two different EPSC peaks $(A_2/A_1)$[45]. For 450 nm light pulses with an irradiation time of 0.5 s and light power density of 0.96 mW/mm$^{-2}$ (FIG. 2g), when the ΔTime is 4.5 s, the maximum PPF index value is found to be 174%. The PPF of 450 nm light with different power densities and fixed ΔTime (3 s) are shown in FIGS. 16a-16f. Subsequently, similar to the 450 nm light, the PPF behavior is also successfully mimicked by 405 nm light pulses (FIG. 2h). The maximum PPF index value is 178%, obtained at ΔTime=1.67 s. The pulse interval-dependent decay of the PPF index with two different light pulses can be expressed utilizing a double exponential decay function as presented in the inset of FIG. 2h.[46] The $y_0$ parameter is the PPF index when the pulse interval approaches infinity. The $t_1$ and $t_2$ parameters are the decay constants of the rapid and slow phases, respectively. The $A_1$ and $A_2$ parameters are the initial facilitation magnitudes of the respective phases, accordingly. The $t_1$ and $t_2$ extracted from the equation with 450 nm and 405 nm light pulses are found to be 1.96 s and 2.39 s (FIG. 2g), and 0.67 s and 0.83 s (FIG. 2h), respectively. These results indicate that the PPF synaptic behaviors can be successfully mimicked by the organic molecule-nanowire photosynaptic device. Besides, the data about the PPF index of 405 nm and 450 nm light are shown in FIGS. 17a-17f and FIGS. 18a-18g.

Figure 1E:
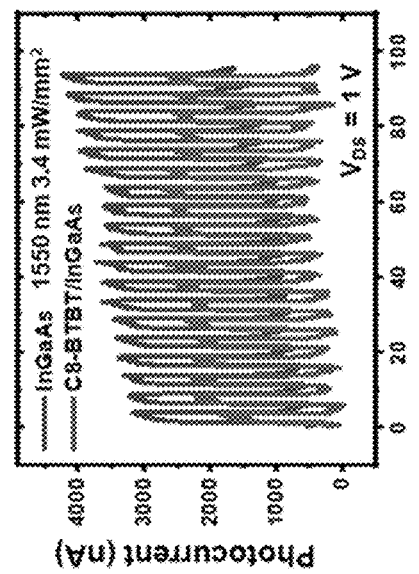
FIG. 1e illustrates photoresponse curves of the devices with and without C8-BTBT (1550 nm laser with the power density of 3.4 mW/mm$^2$).
Figure 1F:
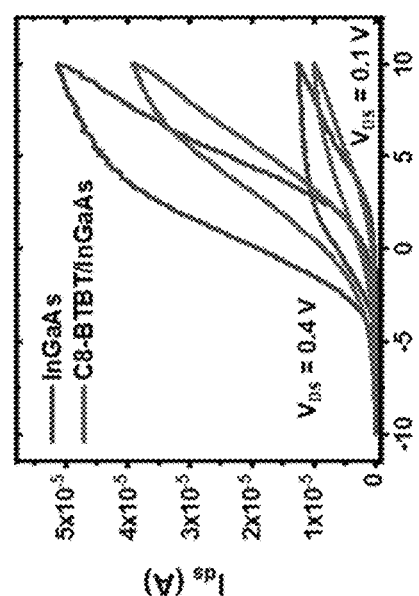
FIG. 1f illustrates photoresponse curves of the printed InGaAs NW arrays device (450 nm laser with the power density of 0.64 mW/mm$^2$).
Figure 3E:
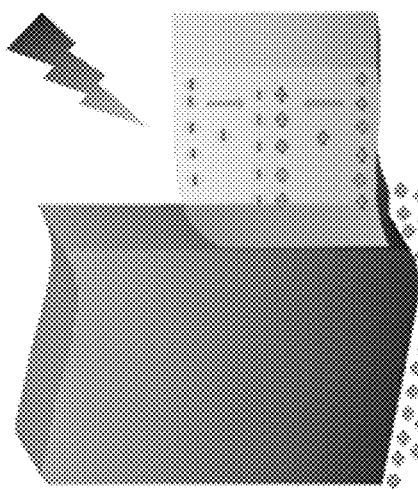
FIG. 3e shows the band structure of the InGaAs/C8-BTBT heterojunction before irradiation.
Figure 3G:
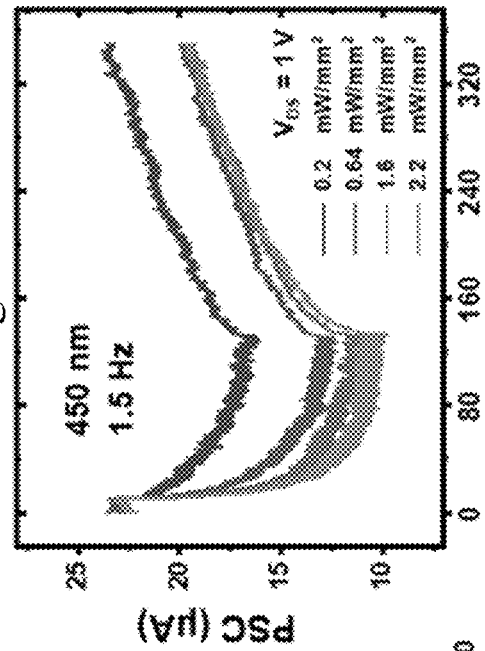
FIG. 3g illustrates long-term potentiation (LTP) characteristics of the artificial photosynaptic device with light pulses of different wavelengths (1.5 Hz).
Figure 3F:
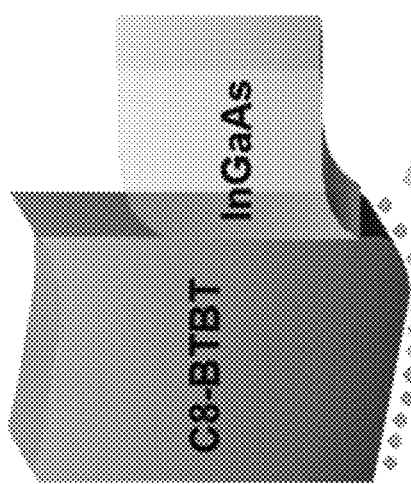
FIG. 3f shows the band structure of the InGaAs/C8-BTBT heterojunction after irradiation.
Figure 3H:
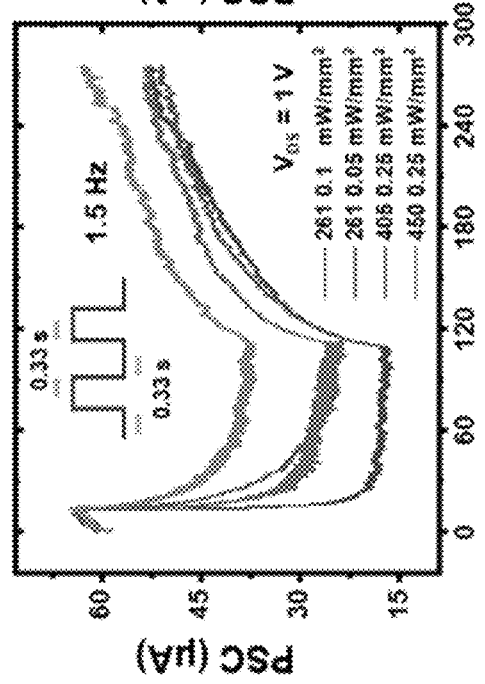
FIG. 3h shows LTP characteristics of the artificial photosynaptic device under 450 nm light pulse with different power densities.
Figure 3I:
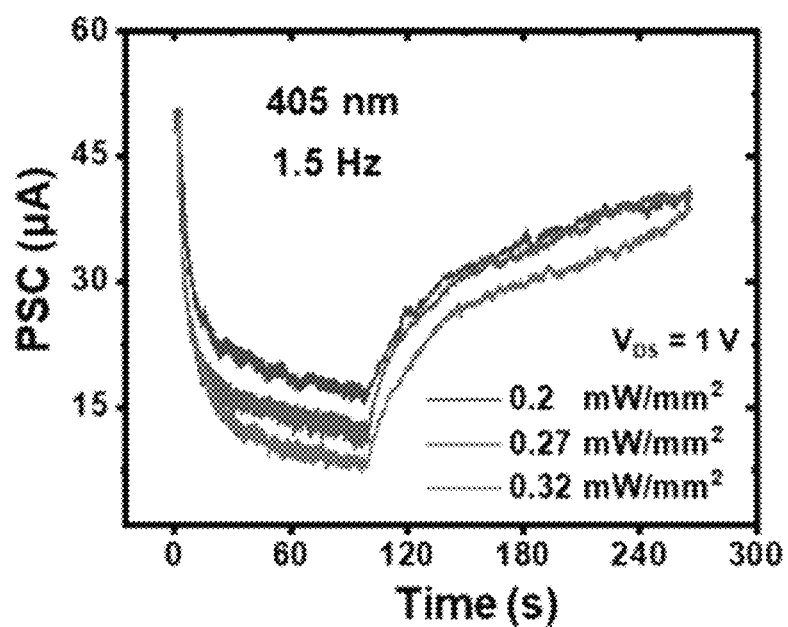
FIG. 3i shows LTP characteristics of the artificial photosynaptic device under 405 nm light pulse with different power densities.
Figure 21:
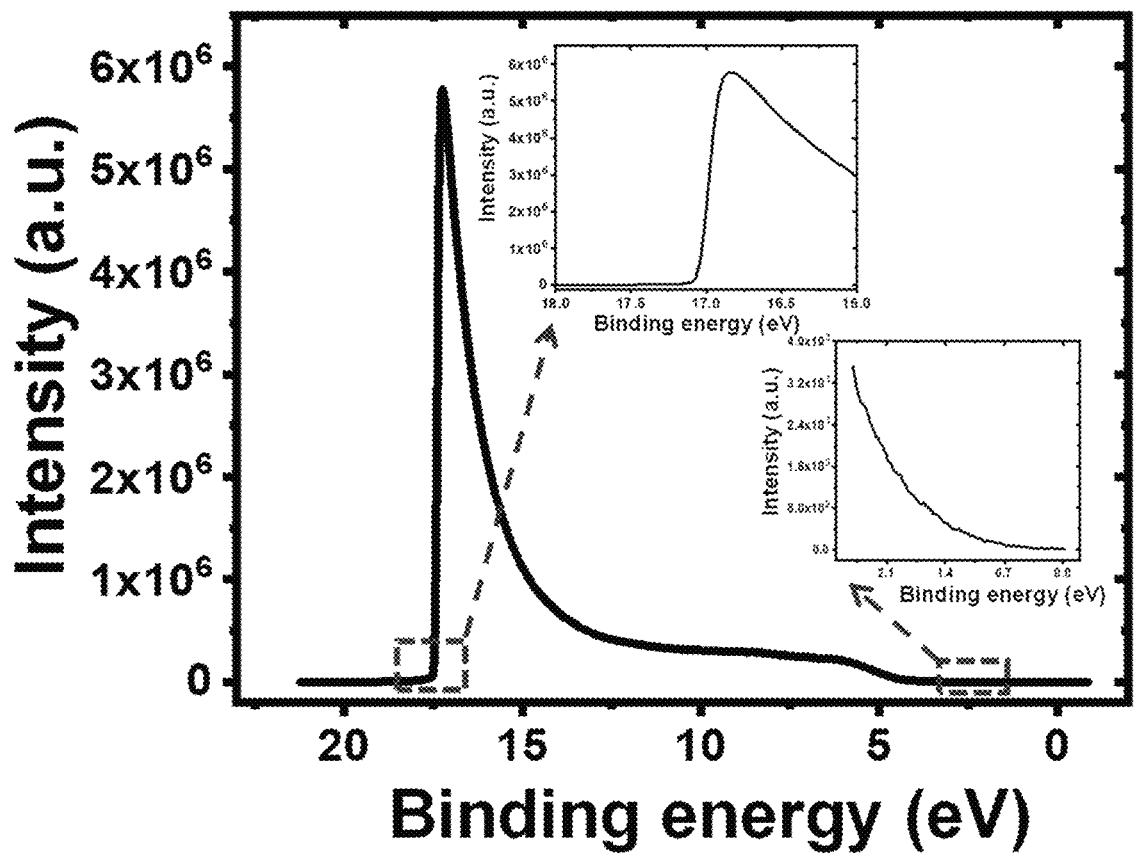
FIG. 21 illustrates the UV photoelectron spectroscopy (UPS) spectrum of the InGaAs NWs.
Figures 22A, 22B:
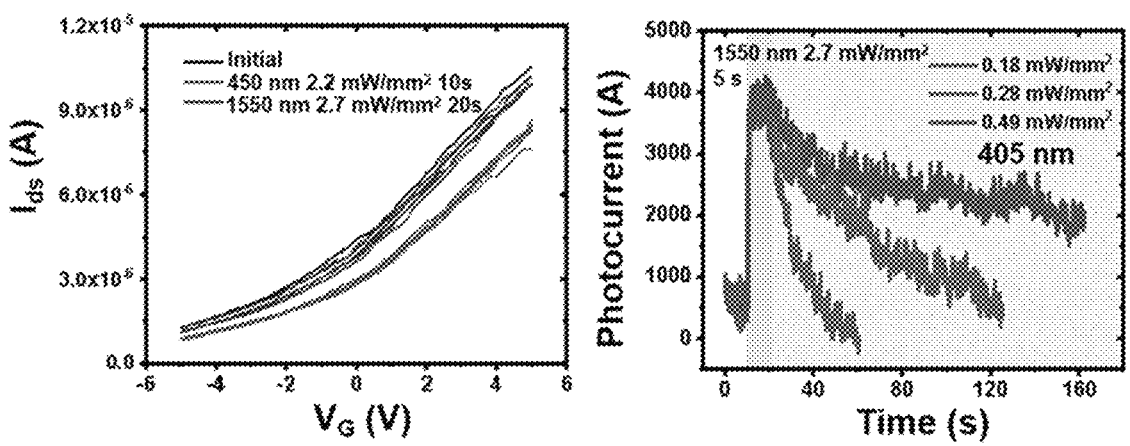
FIG. 22a depicts transfer curves of the C8-BTBT/InGaAs device after 450 nm and 1550 nm light irradiation.
FIG. 22b depicts I-T curves of the C8-BTBT/InGaAs device with two different wavelength lights applied simultaneously after an infrared pulse.
Figure 23A:
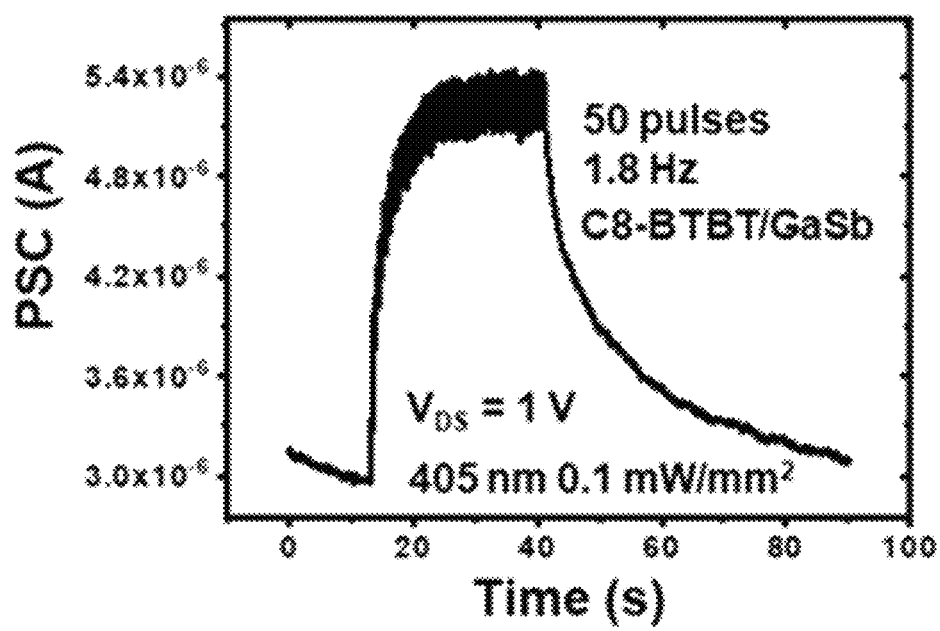
FIG. 23a depicts LTP characteristics of the artificial photosynaptic device based on C8-BTBT/GaSb with 405 nm light pulses.
Figure 23B:
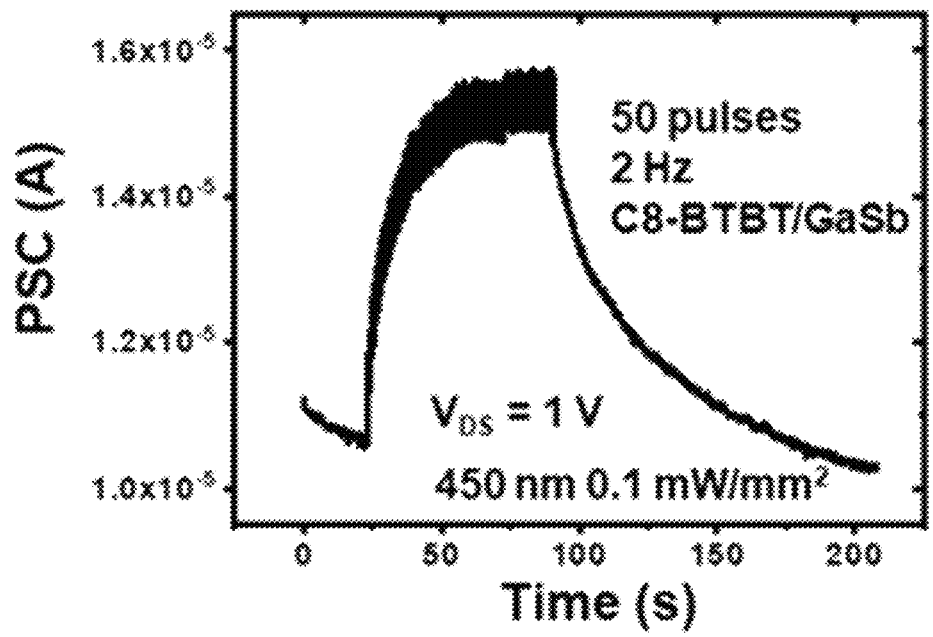
FIG. 23b depicts LTP characteristics of the artificial photosynaptic device based on C8-BTBT/GaSb with 450 nm light pulses.
Figure 24A:
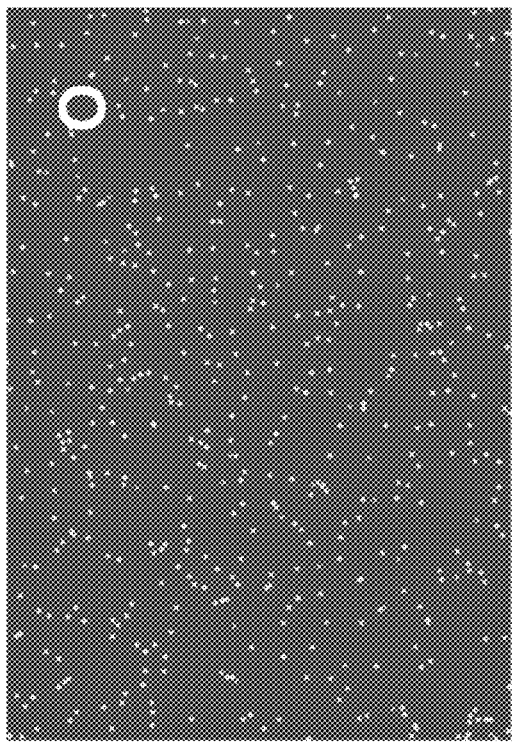
FIGS. 24a-24c show the EDS map of the device with PC$_{61}$BM/InGaAs.
Figure 24B:
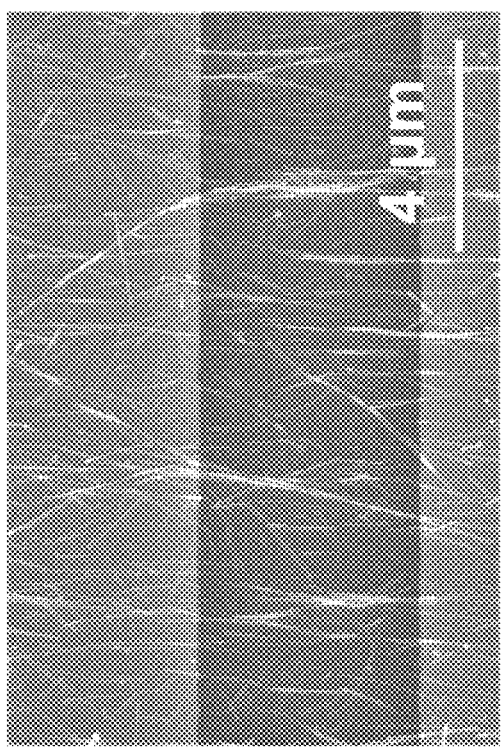
Figure 24C:
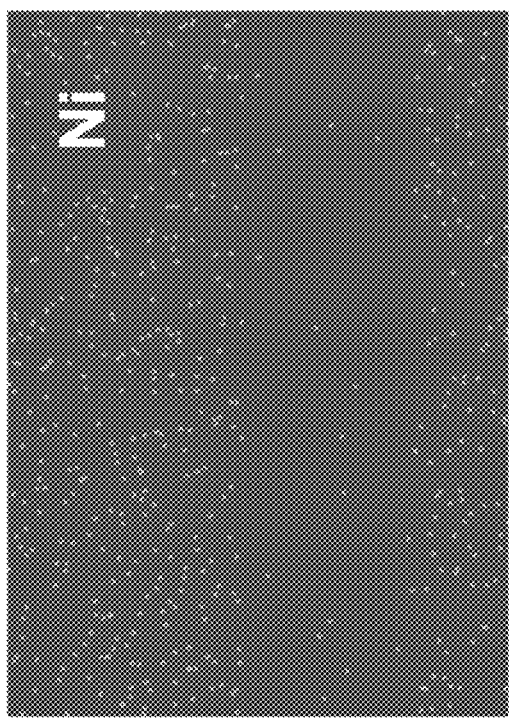
Figure 24D:
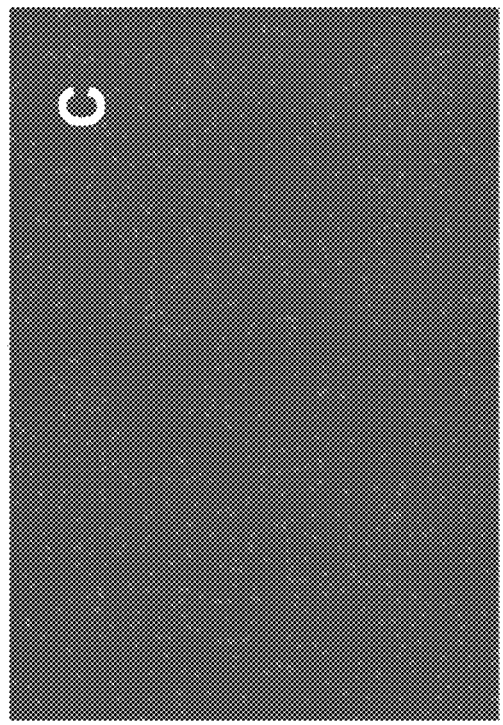
FIG. 24d is the SEM image of the corresponding device.

The stable and persistent NPC phenomenon is achieved with the InGaAs/C8-BTBT heterojunction. Here, the synaptic behaviors with light pulses can also be mimicked by the photosynaptic device. In order to further study the NPC mechanism induced by the organic molecule-nanowire heterojunction, the PL spectra were collected to evaluate the carrier transfer of the heterojunction (FIG. 3a). The C8-BTBT film was fabricated on the printed NW arrays by spin-coating with the same process. The PL spectra of C8-BTBT film and InGaAs/C8-BTBT heterojunction were measured under 320 nm laser excitation with the same power. It is obvious that the latter shows a six-fold intensity decrease of the emission peak at ~372 nm compared with the former, which is similar to the heterostructures with photogenerated carrier transfer processes.[47] Combined with the absorption of the C8-BTBT film (see FIGS. 19a-19b), the wide band gap of the C8-BTBT film is confirmed. Then, the time-resolved PL was assessed with data fitted by the bi-exponential function, revealing the shorter lifetime of the InGaAs/C8-BTBT heterojunction (FIG. 3b).[48] For the C8-BTBT film, the lifetimes of the fast and slow components are 2.65 ns and 27.05 ns, respectively, while those for the organic molecule-nanowire heterostructure decrease to 1.35 ns and 20.19 ns, accordingly. This significant decrease in the lifetime is attributed to the transfer of photogenerated carriers from the C8-BTBT to InGaAs NWs. XPS was next employed to investigate the carrier transfer characteristics of the InGaAs/C8-BTBT heterojunction (FIG. 3c). Compared with the pristine C8-BTBT film, the S 2p peak of the heterojunction illustrates a slight shift of 0.2 eV toward the lower binding energy, confirming the existence of charge carrier transfer at the organic molecule-nanowire interface.[49] FIG. 3d demonstrates the IPSC behaviors with light pulses of different wavelengths. It is interesting that the stronger IPSC effect is obtained with light pulses of the shorter wavelength, even at the weaker light power (i.e., 261 nm). In order to explain the charge carrier transfer and NPC phenomenon, the band structures of the organic molecule-nanowire heterojunction before and after applying light pulses are compiled in FIGS. 3e and 3f. In this work, UPS and absorption spectroscopy are employed to assess the band structure of $In_{0.48}Ga_{0.52}As$ NWs (FIGS. 20a-20b and 21). The band gap and Fermi level extracted from FIGS. 20a-20b and 21 are 0.84 eV and −4.17 eV, respectively. This way, when $In_{0.48}Ga_{0.52}As$ NWs and C8-BTBT are in contact, there is confirmed to have a type-I heterojunction. Due to the difference in Fermi level, a built-in electric field would be developed at the InGaAs-C8-BTBT interface, resulting in the band bending without applying light pulses (FIG. 3e). This prediction is consistent with the results of XPS. [49,50] Also, the p-type C8-BTBT film has holes as the major charge carrier, which would transfer into the InGaAs NWs to suppress the current, as shown in FIGS. 1d and 1e. Moreover, because of the relatively large gap and energy barrier between the LUMO level of C8-BTBT (−1.8 eV) and CB of InGaAs, the electrons transfer from C8-BTBT to InGaAs NWs is more difficult than holes.[51] At the same time, C8-BTBT has a stronger absorption in the UV range (see FIGS. 19a-19b). When light pulses of shorter wavelengths are irradiated at the heterojunction, more photogenerated holes in C8-BTBT are injected into the NWs due to the built-in electric field at the InGaAs-C8-BTBT interface (FIG. 3f). Injected holes would recombine with the electrons in NWs and induce the NPC phenomena.[22, 52] Since InGaAs NWs have the photoresponse in the infrared range, 1550 nm light is used to investigate the carrier recombination of the heterojunction after using visible light pulses. FIG. 22a demonstrates the transfer curves after 450 nm and 1550 nm light irradiation. After 450 nm light (10 s, 0.2.2 mW mm$^{-2}$) irradiation, the decrease of the current indicates the recombination of electrons into the NWs. Subsequently, the infrared irradiation induces photocarriers in the NWs without influence in C8-BTBT, making the transfer curves recover toward the initial state. In FIG. 22b, two different wavelength lights were applied to the heterojunction simultaneously after an infrared pulse (2.7 mW mm$^{-2}$, 5 s). Because infrared excitation and carrier recombination exist simultaneously, the different photocurrents can be controlled by the power density of 405 nm light. As discussed above, the persistent IPSC of the artificial photosynaptic device is highly dependent on the light power and wavelength, which shows similar functions to human eyes. The LTP characteristics of the artificial photosynaptic organic molecule-nanowire heterojunction device induced by persistent IPSC are displayed in FIGS. 3g-3i. The different wavelength light pulses are utilized to induce different levels of LTP characteristics (FIG. 3g). It is noted that solar-blind light (261 nm) can realize strong LTP characteristics even with very weak light. The pulses' power within the UV and visible range can also modulate the weight changes in LTP characteristics (FIGS. 3h and 3i). Therefore, the number of photogenerated holes in C8-BTBT varies with the laser power, wavelength range, and i). pulse numbers. When a weak light pulse with short irradiation time is applied, only a small amount of photogenerated holes can enter the nanowire, which would cause the STM characteristics. As the laser intensity and duration increase, more photogenerated holes will enter the nanowire, resulting in more recombination and causing LTM characteristics. Besides that, in order to further verify the mechanism of the NPC phenomenon, the gallium antimonide (GaSb), as a p-type NW, was applied to fabricate the p-p heterojunction with C8-BTBT. The printing GaSb arrays and C8-BTBT film were fabricated with the same process. Interestingly, this P-P heterojunction would not have the NPC phenomenon. On the contrary, the strong positive photoconductivity would be realized with 405 and 450 nm laser pulses as shown in FIGS. 23a-23b. This result shows that injecting the same type of charge carriers does not induce NPC.

Figure 4B:
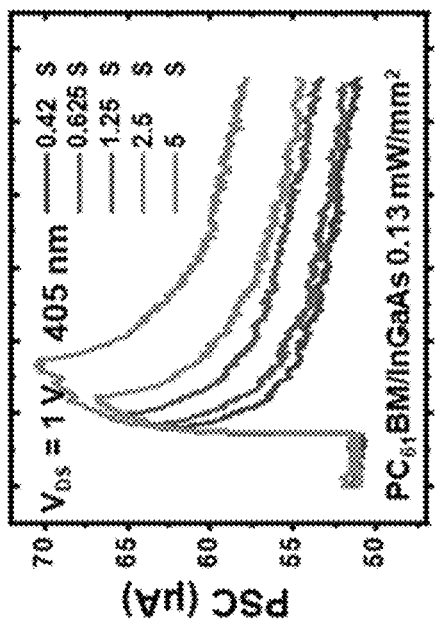
FIG. 4b illustrates EPSC behaviors of the synaptic device under 405 nm light pulse with different pulse widths.
Figure 4D:
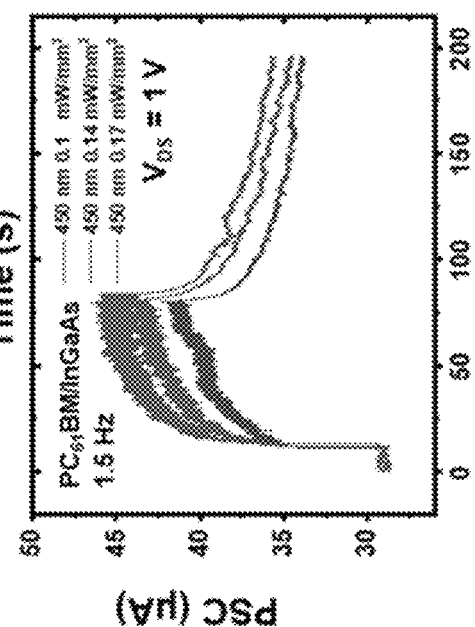
FIG. 4d illustrates the LTP characteristics of the artificial photosynaptic device under 450 nm light pulses with different power densities (1.5 Hz).
Figure 4A:
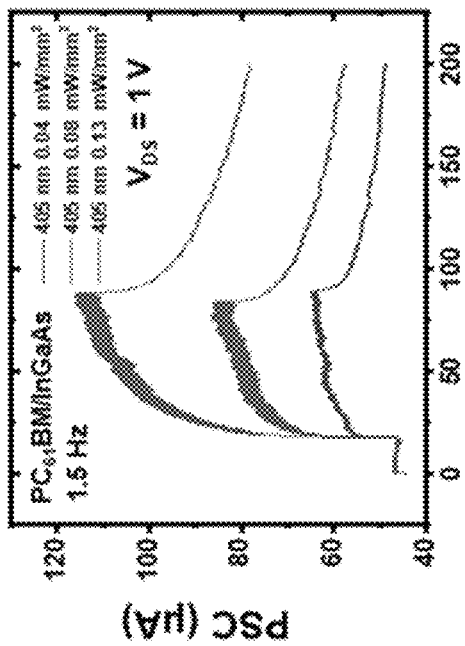
FIG. 4a illustrates the LTP characteristics of the artificial photosynaptic device under 405 nm light pulse with different power densities (1.5 Hz), the artificial photosynapses configured with printed InGaAs NW arrays wrapped with the $PC_{61}BM$ film.
Figure 4C:
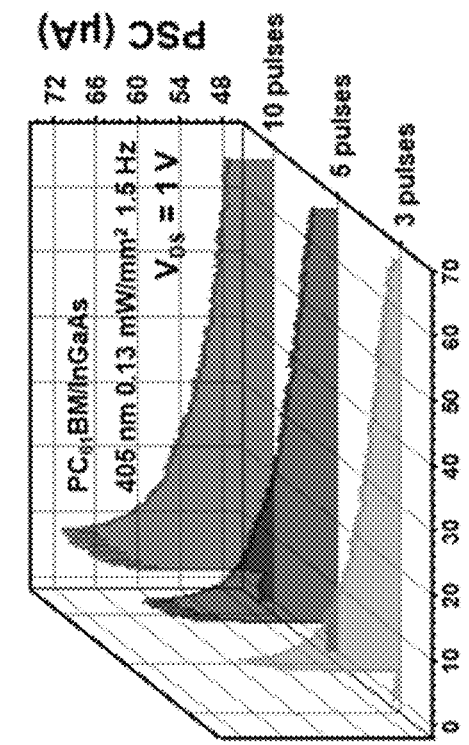
FIG. 4c illustrates EPSC behaviors of the synaptic device with different numbers of 405 nm light pulses and the fixed frequency (1.5 Hz).
Figure 30A:
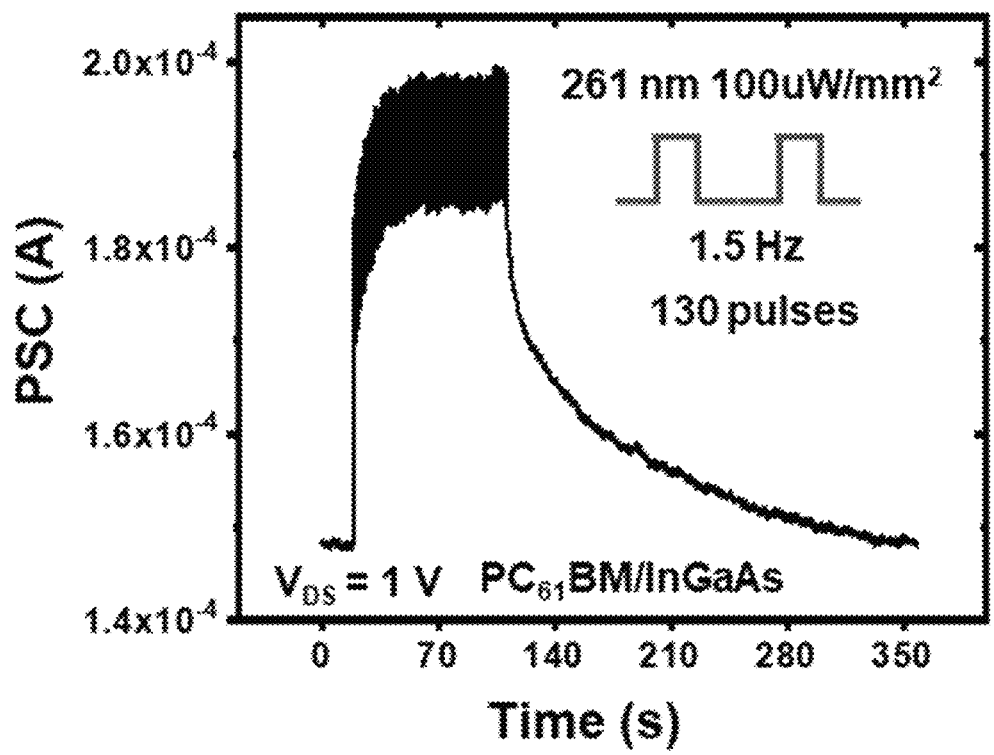
FIG. 30a shows the LTP characteristics of the artificial photosynaptic device with 261 nm light pulses.
Figure 30B:
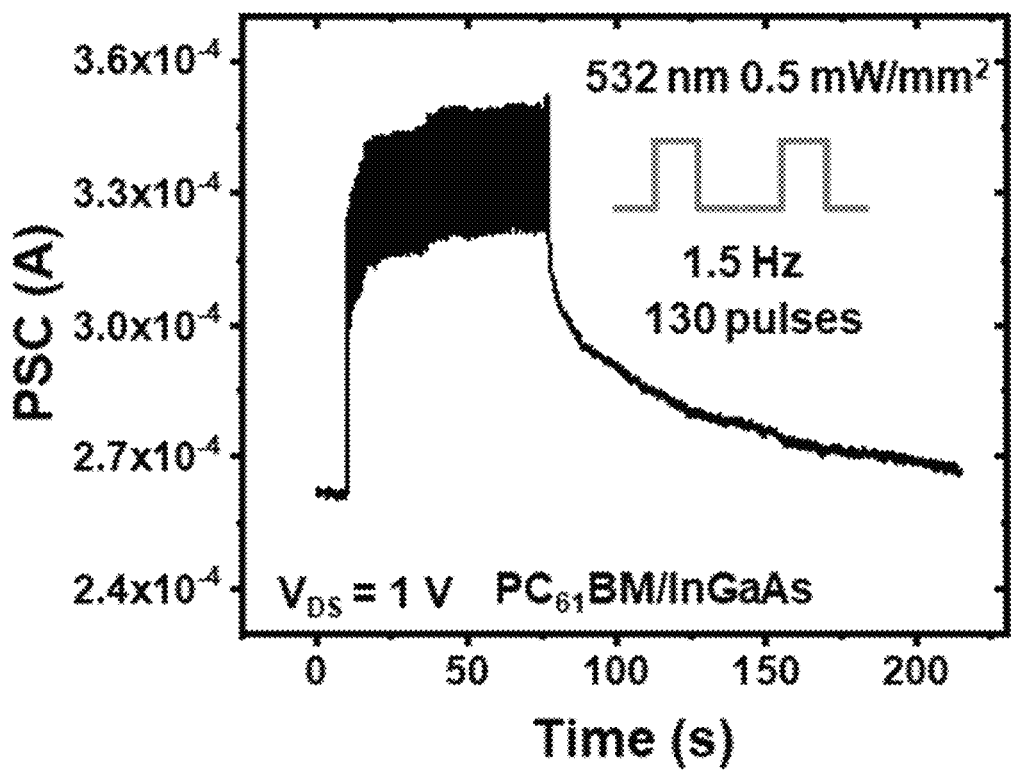
FIG. 30b shows the LTP characteristics of the artificial photosynaptic device with 532 nm light pulses.
Figure 30C:
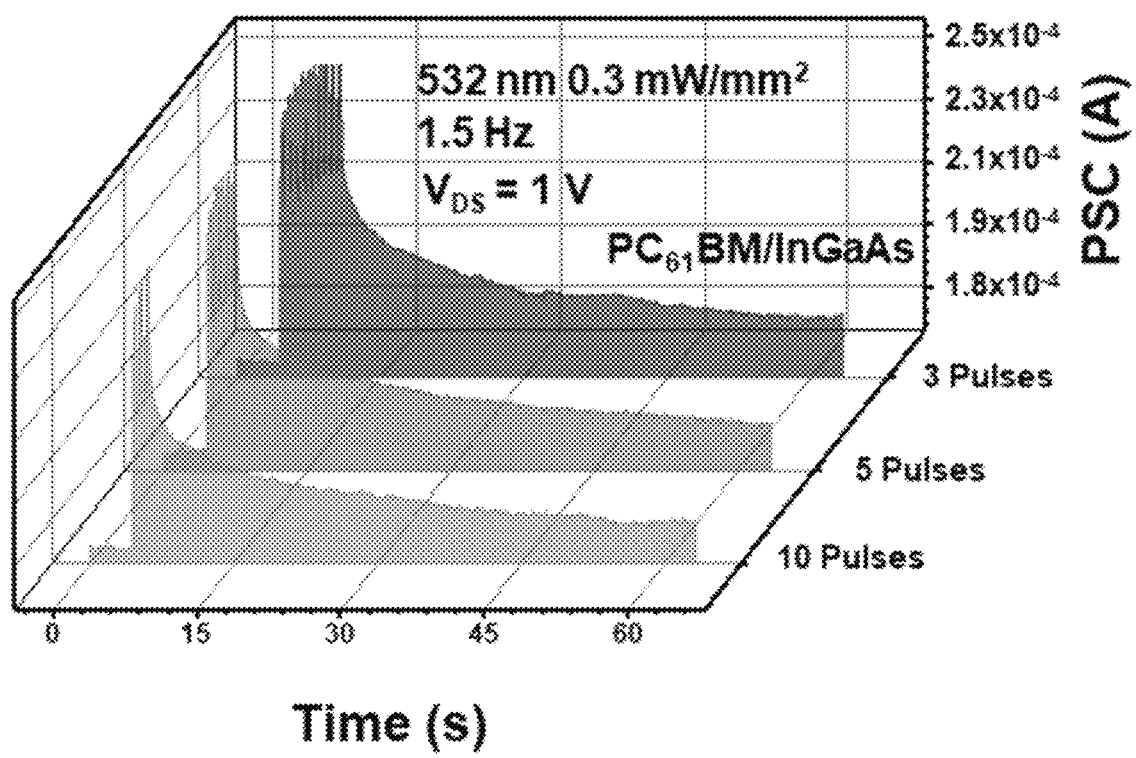
FIG. 30c shows the EPSC behaviors of the synaptic device with different numbers of 532 nm light pulses and the fixed frequency (1.5 Hz).
Figure 31A:
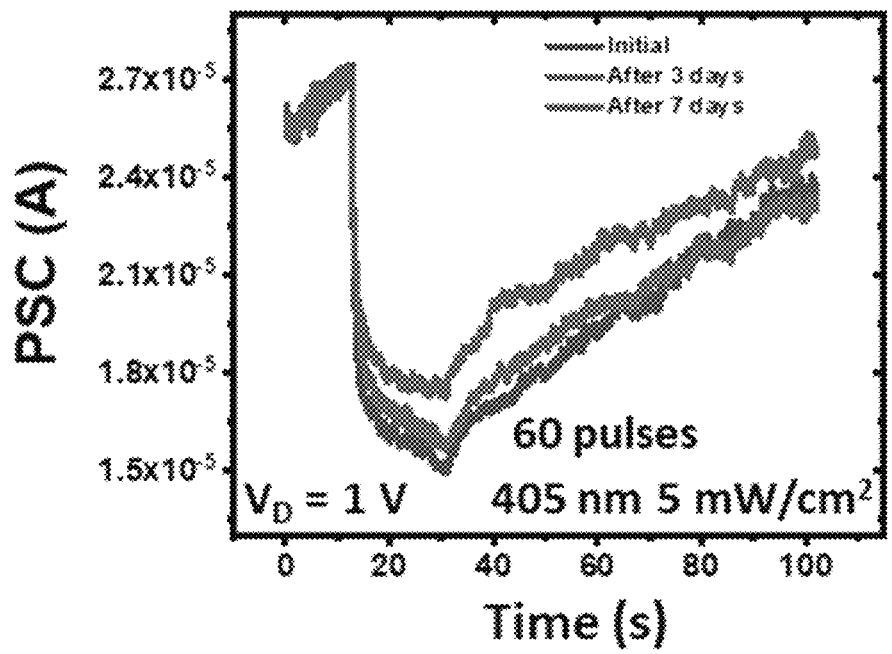
FIG. 31a shows the air stability of photosynaptic devices based on C8-BTBT/InGaAs NWs.

Apart from injecting heterogeneous carriers into the InGaAs/C8-BTBT heterojunction for persistent NPC phenomena, PC$_{61}$BM, another popular organic material widely used in solar cells, is as well introduced to construct the type-I n-n InGaAs/PC$_{61}$BM heterojunction.[53, 54] The SEM images and EDS analysis of the fabricated device are shown in FIGS. 24a-24d. The molecular structure, optical images, and AFM analysis of PC$_{61}$BM covering the printed InGaAs NW arrays are compiled in FIGS. 25a-25c. It is evident that the deposited PC$_{61}$BM film is conformal and dense without any obvious pinholes, with constituent elements uniformly distributed. This observation demonstrates the high quality of the deposited film, which is essential for constructing the high-quality heterojunction. Also, the PPC phenomenon can be successfully realized by the InGaAs/PC$_{61}$BM heterojunction, which illustrates the potential of building artificial visual systems with positive photocurrent. The LTP characteristics and EPSC behaviors with light pulses of 405 nm irradiation are shown in FIGS. 4a and 4b. The artificial photosynaptic devices based on these n-n heterojunctions yield good weight inheritance and preservation behaviors in LTP characteristics under successive 405 nm and 450 nm irradiation with different power densities (FIGS. 4a and 4d). The EPSC behaviors of 405 nm (0.13 mW/mm$^{-2}$) and 450 nm (0.14 mW/mm$^{-2}$) irradiation with different duration times are investigated in FIGS. 4b and 4e. Furthermore, the 3, 5 and 10 pulses with 405 nm (0.13 mW/mm$^{-2}$) and 450 nm (0.14 mW/mm$^{-2}$) lasers are shown in FIGS. 4c and 4f, and show the SNDP characteristic. The transformation from STM to LTM can be simply achieved by modulating the irradiation time and pulse numbers. Similar to the InGaAs/C8-BTBT heterojunction, the artificial photosynapse with the n-n InGaAs/PC$_{61}$BM heterojunction can as well mimic the synaptic behaviors successfully. Moreover, the EPSC behavior is also highly sensitive to the irradiation wavelengths, power densities, and pulse numbers. The laser pulses with shorter wavelengths are easier to induce higher EPSC, demonstrating the potential for visual and color recognition. The absorption spectrum of PC$_{61}$BM and the band structure of InGaAs/PC$_{61}$BM heterojunction are depicted in FIGS. 26a-26b, which illustrate the different mechanisms of PPC here.[55, 56] Explicitly, the photogenerated electrons in PC$_{61}$BM would first inject into the InGaAs NWs under laser pulses. Then, the type-I heterojunction prevents the reflux of the electrons. Besides, due to the relatively large gap between the HOMO level of PC$_{61}$BM (−6.1 eV) and VB of InGaAs, the transfer of holes from PC$_{61}$BM to InGaAs NWs is difficult. Hence, more photogenerated electrons would inject into the NWs than the hole counterparts, inducing the PPC phenomenon. PL and time-resolved PL spectra were collected for the InGaAs/PC$_{61}$BM heterojunction to evaluate and confirm the charge carrier transfer under laser irradiation (see FIGS. 27a-27b). The PPF effect as a basic synaptic characteristic is also mimicked successfully based on the photosynaptic InGaAs/PC$_{61}$BM device. The two consecutive pulses of 405 nm (0.33 s, 0.14 mW/mm$^{-2}$) and 450 nm (0.33 s, 0.17 mW/mm$^{-2}$) irradiation with the fixed duration time and power density were applied with the responses presented in FIGS. 28a-28h and FIGS. 29a-29h, respectively. For the 405 nm laser, when ΔTime is 1 s, the maximum PPF index value is found to be 130%, and the $t_1$ and $t_2$ values extracted from the double exponential decay function in FIG. 2h are 0.88 s and 3.11 s, accordingly (see FIG. 28a).[46] Subsequently, similar to 405 nm laser, the maximum PPF value obtained by 450 nm laser pulses is 133% with ΔTime of 1 s. The $t_1$ and $t_2$ values are found to be 0.39 s and 2.69 s obtained from the same double exponential decay function (FIG. 29a). Moreover, because of the relatively wide absorption range of PC$_{61}$BM, the 261 nm and 532 nm wavelength lasers were adopted to induce LTP characteristics with the PC$_{61}$BM/InGaAs photosynaptic device (see FIGS. 30a-30b). Besides that, spike-number dependent plasticity (SNDP) is also realized by a different number of 532 nm laser pulses, as shown in FIG. 30c. In this case, the heterojunction devices can effectively mimic a series of synaptic behaviors, revealing their great capabilities in constructing high-performance artificial visual systems composed of positive and negative photoconductors. In order to show the potential for practical applications, the air stability of two photosynaptic devices was investigated and shown in FIGS. 31a-31b. The devices were put into a moisture-proof box with a fixed humidity of 40% in air atmosphere and tested with the LTP characteristics. As shown in FIG. 31a, for the device based on C8-BTBT/InGaAs NWs, the PSC decreases 5.6% (3 days) and 18.5% (7 days) with 405 nm light pulses, respectively. Moreover, the air stability of photosynaptic devices with PC$_{61}$BM/

Figure 31B:
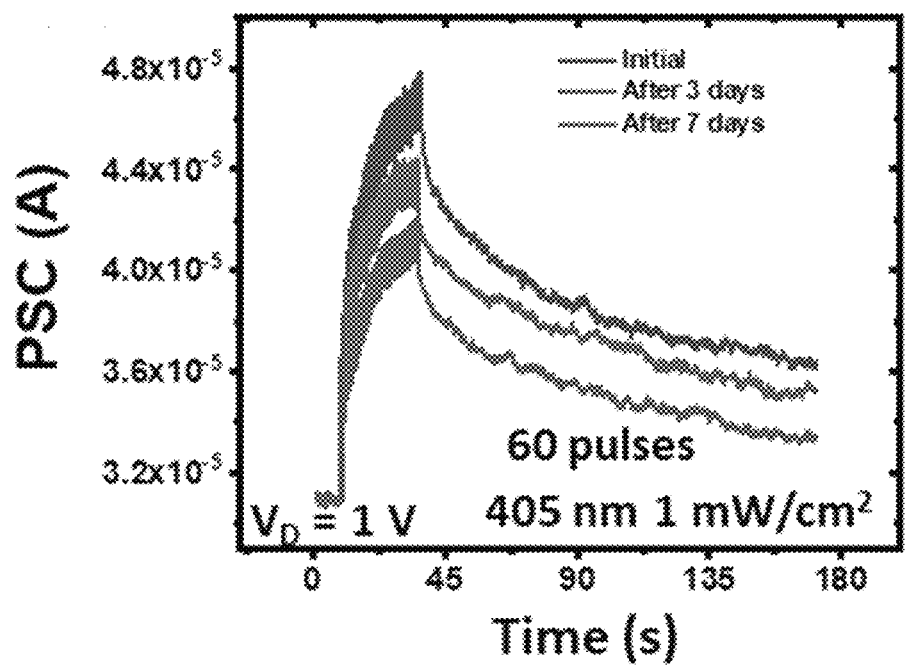
FIG. 31b shows the air stability of photosynaptic devices based on PC$_{61}$BM/InGaAs NWs.

InGaAs NWs is shown in FIG. 31b. The PSC decreases by 18.1% (3 days) and 33.3% (7 days) with 60 blue light pulses, accordingly.

Figure 5C:
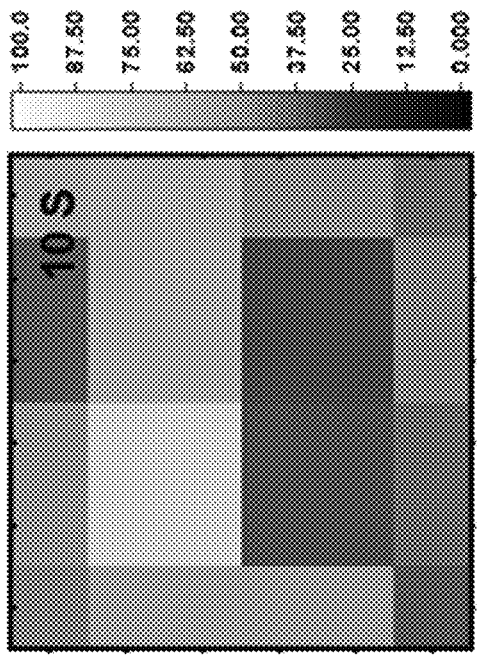
FIG. 5c shows different memory states configured with the NPC phenomenon.
Figure 5D:
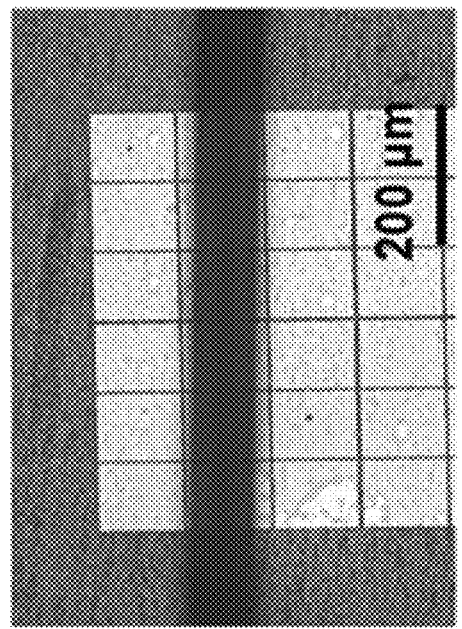
FIG. 5d shows optical image of the 4×4 arrays based on InGaAs/C8-BTBT heterojunction devices and the human hair is used to block the laser irradiation.
Figure 5E:
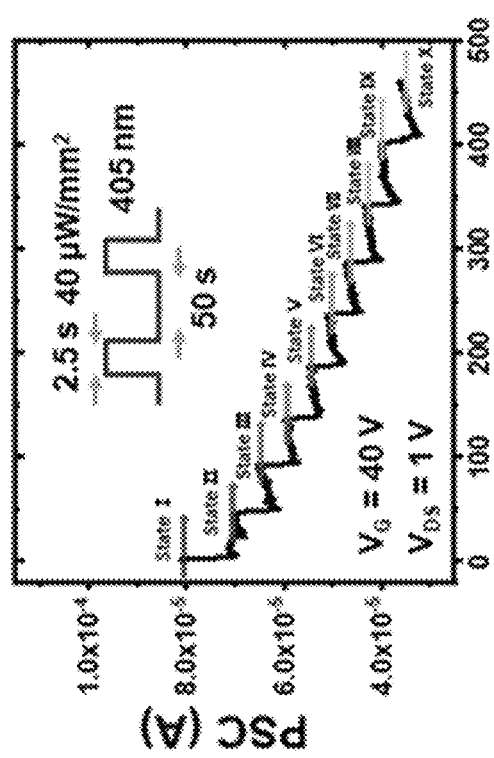
FIGS. 5e-5i depict the percentage change of EPSC after a single 405 nm pulse irradiation.
Figure 5F:
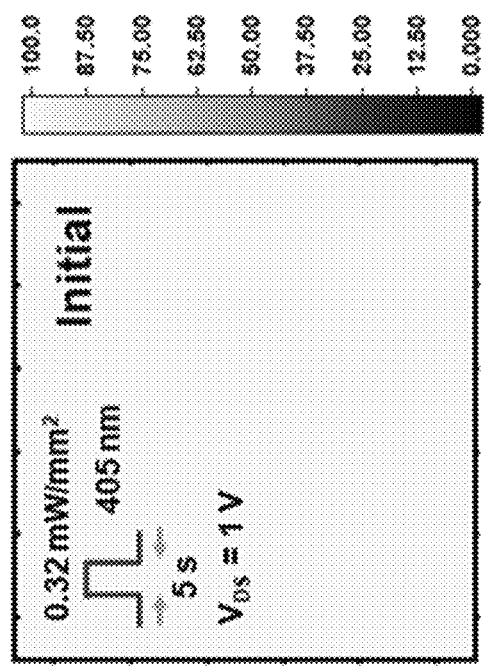
Figure 5G:
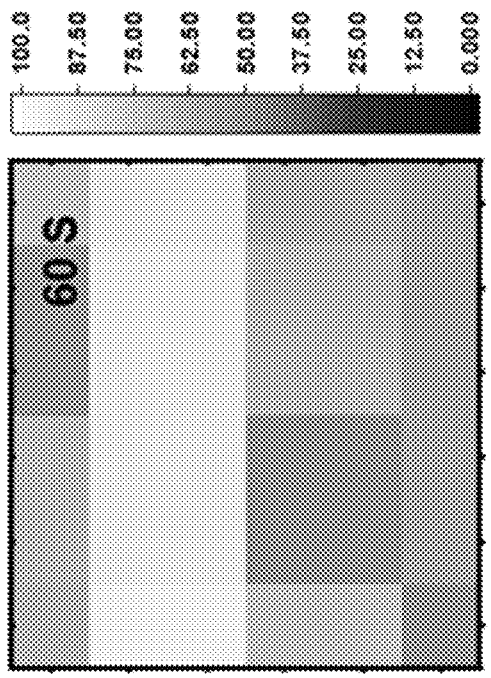
Figure 5H:
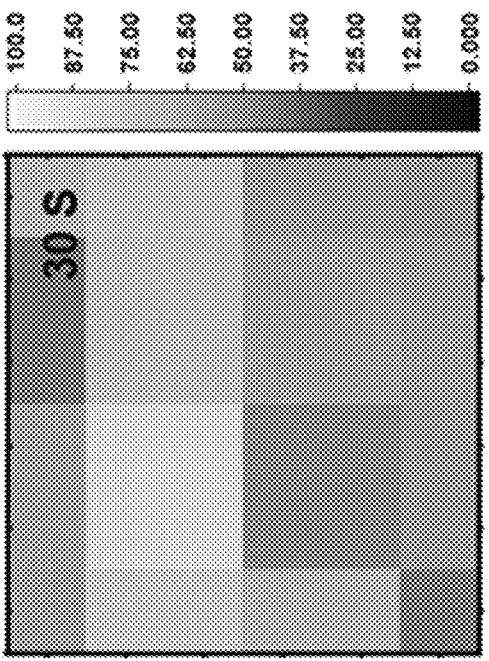
Figure 5I:
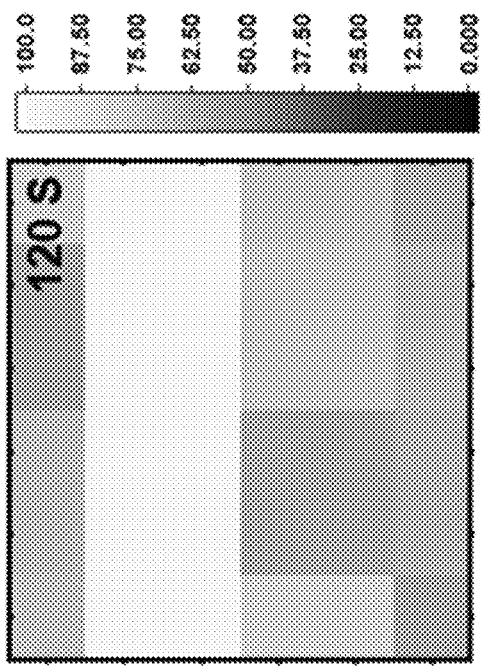

According to some embodiments of the invention, both NPC and PPC phenomena can be observed by controllably injecting different photogenerated charge carriers into the two different heterojunctions. For the InGaAs/C8-BTBT heterojunction photosynaptic device, the holes injected from C8-BTBT under the laser irradiation would cause carrier recombination in the NWs. Furthermore, the V G bias can be introduced to investigate the memory characteristics of these artificial photosynaptic devices. When the large positive $V_G$ (40 V) is applied to the gate, there are large numbers of electrons accumulated in the NW channel.[21, 52, 57] Once the 405 nm laser (1.1 mW/mm$^{-2}$, 5 s) is irradiated onto the device, the PSC value would drop as expected. However, since the channel is already accumulated with electrons before irradiation, generating substantial additional amounts of electrons in the channel is not accessible after recombination. This way, the current of the synaptic device can maintain at a low level for a relatively long time. FIG. 5a shows the synergistic photoelectric modulation for long-time memory (>10$^4$ s). The relaxation time fitted with the Kohlrausch stretched exponential function demonstrates that the memory loss here is also consistent with the situation in biological systems (FIG. 5b).[12, 14, 58] The different memory states are as well tested and shown in FIG. 5c. Under the synergistic photoelectric modulation, the weak 405 nm laser (40 µW/mm$^{-2}$) can realize more than eight memory states in the photosynaptic InGaAs/C8-BTBT device, which show the potential in achieving over 3 bits (8 distinguishable levels) memory function.[59, 60] Moreover, the 261 nm and 532 nm laser stimuli are applied to the InGaAs/C8-BTBT and InGaAs/PC$_{61}$BM heterojunction devices, respectively, to achieve the LTM function with synergistic photoelectric modulation (see FIGS. 32a-32b). For human visual systems, millions of nerve fibers transfer data to the brain for various processing. In this case, device integrability and scalability are indispensable for artificial visual systems. The printable NW arrays combined with the solution-processable organic thin films are suitable for this large-area fabrication, which can overcome the shortcomings of being difficult to integrate heterojunction devices on a large scale. Besides, lithography techniques, such as photolithography, can be used to fabricate the device arrays with high density. Hence, the 4×4 array based on photosynaptic InGaAs/C8-BTBT devices are fabricated in this study, and a human hair is utilized to create a pattern for laser irradiation onto the device arrays (FIG. 5d).[61] The 405 nm laser pulse was then applied, and the percentage change of output current is shown in FIGS. 5e-5i). Because of the light blocking, the covered devices give faster current recovery. As shown in FIG. 5i, the location covered by the hair can still be identified 120 s after irradiation.

Figure 6D:
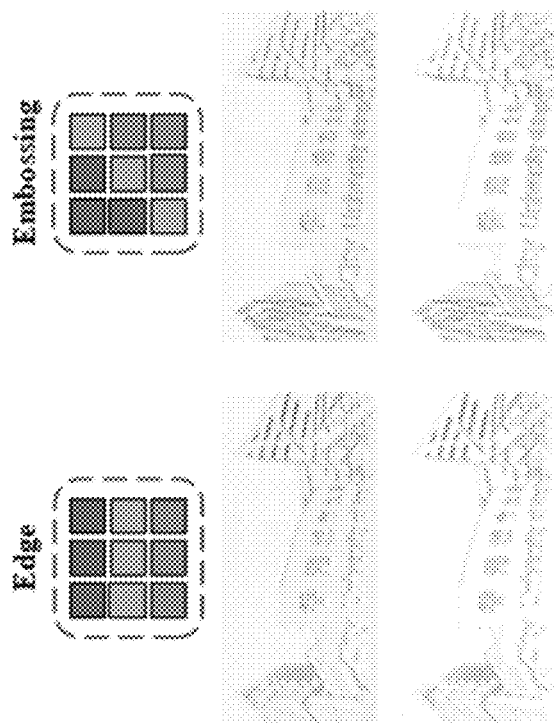
FIG. 6d shows experimental and simulation results of the hardware kernel operation.
Figure 35:
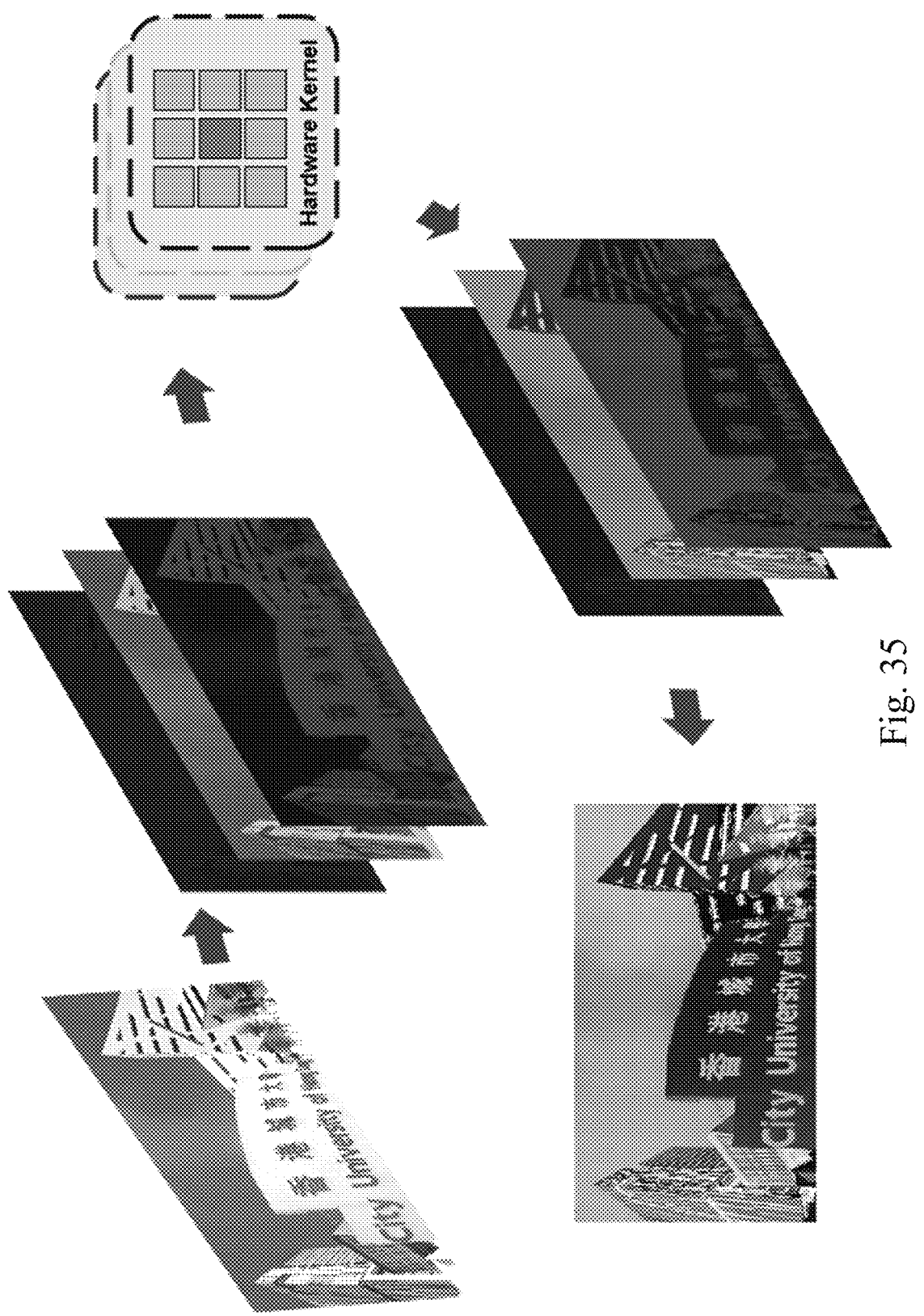
FIG. 35 illustrates experimental details of the visual processing.

More importantly, the two different photosynaptic devices with negative and positive photoconductivities (i.e., InGaAs/C8-BTBT and InGaAs/PC$_{61}$BM) were used to build an array to define the hardware kernel. The photoresponse characteristics of these synaptic devices to different irradiation power densities and wavelengths (i.e., red, green, and blue regimes) are utilized to simulate the visual processing and recognition functions of the human eye, as shown in FIGS. 33a-33c and FIGS. 34a-34c.[62] The key role of the receptive field on the human retina is to speed up visual perception in the brain by extracting its key features to process visual information early (FIG. 6a). Using this principle, one can extract key features of the image by the 3×3 hardware kernels, and different hardware kernels have the function of extracting different vital features.[63] In this case, the 9 PPC and 9 NPC devices construct their own arrays, respectively. Furthermore, one PPC device is corresponded to one NPC device, while the devices' conductance can be modulated with irradiation power densities and wavelengths. Each pair of the photosynaptic devices was input through a corresponding voltage.[64] According to Kirchhoff s law, the final output current ($I_{output}$) is the sum of the PPC device's current and the NPC device's current. This way, a hardware convolution kernel array[65] is formed successfully, where a pair of positive and negative photoconductive devices is considered a complete device. Therefore, both "On"-response and "Off"-response can exist in one kernel array, as presented in FIG. 6b. Also, FIG. 6c demonstrates the function of visual processing based on the hardware kernel, including extracting the key features of the image and experimental details found in FIG. 35. As a demonstration, three different hardware kernels are used in visual processing here. One can then achieve three different ways of processing images by modulating specific conductance values for each device with varying irradiation wavelengths. In this case, it is possible to map the reverse, edge, and embossing of the convolution kernels (3×3) to the hardware kernel array. The experimental results of the hardware kernel operation are in good agreement with the software simulation results, which reproduce the image features as shown in FIG. 6d. It is noted that the experimental results were extracted from the photoresponse data of the InGaAs/PC$_{61}$BM and InGaAs/C8-BTBT devices. In addition, the experimental results of the edge and embossing reveal that the image features can be more colorful due to the difference in the conductance amplitude between two different devices in the hardware kernel.

Figure 6F:
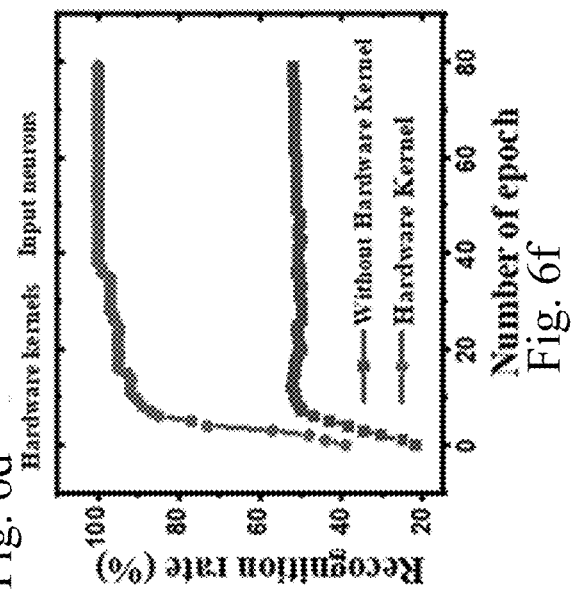
FIG. 6f shows the recognition rate of the neural network evaluated with and without hardware kernels.
Figure 6E:
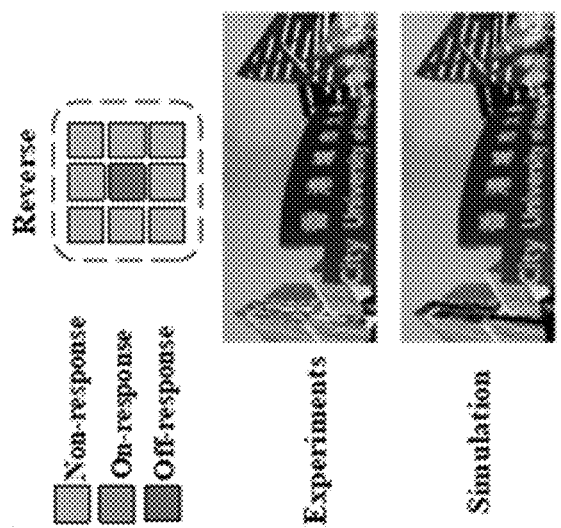
FIG. 6e shows schematic illustration of the neural network for classification and recognition.

In another experiment setup, features detected by the hardware kernel (constructed from devices with tunable conductivities) were inputted into the neural network for classification and recognition to evaluate the neural network's performance. The dataset is made of 6 color figures (3×3 pixels) containing the two letters of 'V' and 'L' in red (R), green (G), and blue (B), respectively.[66] In this work, the image input signals are defined as 0.8 V to 1 V (for R), 0.4 V to 0.6 V (for G) and 0.1 V to 0.3 V (for B).[23] This way, one can randomly generate images based on this definition. The 250 images are arbitrarily generated from each of the 6 color figures. Therefore, 1200 images are employed as a training set for learning, while 300 images are used as a test set to evaluate classification accuracy. FIG. 6e shows the key feature values of the image as the input signals of the neural network through 9 hardware kernels, which are composed of 3 red, 3 green, and 3 blue light conductance hardware kernels. Moreover, all hardware kernels possess reverse, edge, and embossing features. Therefore, the single-layer-perceptron neural network consists of 9 input and 6 output neurons. The recognition rate of the neural network is then evaluated with and without hardware kernels, respectively (FIG. 6f). Impressively, the recognition rate with hardware kernels reaches 100%; in comparison, only ≈51% is obtained without hardware kernels, which verifies that the hardware kernel has the ability to detect and classify target features with different colors. In general, since it takes 3 neurons to recognize the color of an image pixel, the 9-pixel image here requires 27 input neurons. The color can be directly differentiated through our hardware kernel. The number of input neurons required by the neural network has changed to 9. Notably, when constructing the artificial hardware neural network, the hardware kernel can greatly reduce the number of input neurons and synaptic weights, thus reducing the complexity and power consumption of the neural network. All these results evidently demonstrate the applicability of the hardware kernel constructed by two different kinds of devices (i.e., InGaAs/C8-BTBT and InGaAs/PC$_{61}$BM) with tunable photoconductivities for artificial visual systems.

In conclusion, the artificial photosynaptic device arrays according to some embodiments of the invention are successfully configured with the InGaAs NW arrays top-wrapped with the organic semiconductor thin films of C8-BTBT or PC$_{61}$BM to realize persistent NPC or PPC phenomena, respectively. The two different organic-inorganic type-I heterojunctions are fabricated with the InGaAs NW parallel arrays to realize the tunable persistent NPC or PPC. The two type-I heterojunctions (i.e., InGaAs/C8-BTBT and InGaAs/PC$_{61}$BM) can effectively mimic the essential synaptic visual behaviors, such as PPF and EPSC, based on their different photoconductivities. In order to demonstrate the large-scale processability of printable NW arrays and solution-processed organic thin films, 4×4 artificial photosynaptic device arrays are fabricated, exhibiting reliable optical memory functions when applying different gate voltages. More importantly, utilizing these two different photosynaptic devices with negative and positive photoconductivities, the hardware kernel can be constructed for simulating the visual processing and recognition of the human eye. Due to the tunable photoconductivity and response to different irradiation wavelengths, an efficient neural network with 100% classification accuracy is achieved. All these results evidently indicate the promising potential of artificial photosynaptic devices based on organic molecule-nanowire heterojunctions for practical utilization in artificial visual systems. The device arrays with multi-wavelength NPC and PPC phenomena are adopted to build the hardware kernel for the visual system, which reaches a 100% recognition rate with lower complexity and power consumption.

One can see that embodiments of the invention can provide an innovative approach to devise a versatile device structure with high mobility III-V semiconductor nanowires and organic semiconductor materials, thus not only realizing human visual function with negative/positive photoconductivity, but also simplifying the fabrication process to achieve large-area integration and array.

The artificial visual systems based on organic molecule-nanowire heterojunctions can mimic the human visual functions with NPC or PPC. The irradiation with different wavelengths (solar-blind to visible ranges) and power densities can stimulate the devices, effectively realizing the synaptic behaviors with two different photoconductivities. Compared with the devices which can realize positive and negative photoconductivities in different wavelengths, the complex transfer process is avoided and the air stability is improved. Moreover, the large-area heterojunction arrays are realized with solution-process. In this regard, it is ideal to utilize III-V NW arrays integrated with organic semiconductors for heterojunctions in order to construct high-performance artificial visual systems.

As a demonstration and proof-of-concept, using this device structure with III-V semiconductor nanowires and organic semiconductor materials, the hybrid device shows the two different photoconductivities. It is remarkable that STP, LTM, EPSC, and LTP/LTD synaptic behaviors are reliably demonstrated with both visible and UV lasers, including the solar-blind range. Furthermore, the integration of printed NW arrays and solution-processed organic materials illustrate their great potential as active materials for large-area neural visual networks.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In one variation, there is provided an artificial visual system with tunable photoconductivity based on organic molecule-nanowire heterojunctions to realize multiple visual nerve functions, including color recognition, PPF/EPSC and long-term and multi-state light memory. The constituent III-V semiconductor nanowires and organic semiconductor materials are configured as the device channel. There is provided an integrated structure of the III-V semiconductor nanowire and organic semiconductor layered materials. In addition, there is provided a process to fabricate the nanowire/organic semiconductor materials heterojunction device.

In some variations of the preferred embodiments, the III-V semiconductor nanowires are either p-type, n-type or ambipolar.

In some variations of the preferred embodiments, the III-V semiconductor nanowires are either binary, ternary or quaternary.

In some variations of the preferred embodiments, the III-V semiconductor nanowire could either be on or beneath the organic semiconductor materials.

In some variations of the preferred embodiments, the dielectric layer of the device is the thermally grown SiO$_2$ layer on the Si wafers.

In some variations of the preferred embodiments, the electrode pattern method for nanowires and organic semiconductor materials are the combination of UV photolithography, spin-coating and electron beam lithography.

What is claimed is:

1. An artificial photosynaptic device comprising organic molecule-nanowire heterojunctions, further comprising a first heterojunction including a first organic material film wrapped around a first nanowire device.

2. The artificial photosynaptic device of claim 1, further comprising a second organic molecule-nanowire heterojunction.

3. The artificial photosynaptic device of claim 2, wherein the second organic molecule-nanowire heterojunction includes a second organic material film wrapped around a second nanowire device.

4. The artificial photosynaptic device of claim 3, wherein the first and second nanowire devices are printed nanowire arrays.

5. The artificial photosynaptic device of claim 3, the first and second nanowire devices are III-V semiconductor nanowire arrays.

6. The artificial photosynaptic device of claim 5, wherein the first and second nanowire devices are InGaAs nanowire arrays.

7. The artificial photosynaptic device of claim 6, wherein the InGaAs nanowire arrays are synthesized through a two-step catalytic solid-source CVD method.

8. The artificial photosynaptic device of claim 5, wherein the III-V semiconductor nanowire arrays are either p-type, n-type or ambipolar.

9. The artificial photosynaptic device of claim 5, wherein the III-V semiconductor nanowire arrays are either binary, ternary or quaternary.

10. The artificial photosynaptic device of claim 5, wherein the III-V semiconductor nanowire arrays are located on or beneath the first organic material film or the second organic material film.

11. The artificial photosynaptic device of claim 3, wherein the first organic material film is different from the second organic material film so that the artificial photosynaptic device has a tunable photoconductivity.

12. The artificial photosynaptic device of claim 3, wherein persistent negative photoconductivity (NPC) or positive photoconductivity (PPC) is induced in the first and second heterojunctions.

13. The artificial photosynaptic device of claim 1, wherein a dielectric layer of the device is a thermally grown $SiO_2$ layer on Si wafers.

14. A method of manufacturing an artificial photosynaptic device of claim 1, comprises the steps of UV photolithography, spin-coating and electron beam lithography.

15. An artificial photosynaptic device comprising organic molecule-nanowire heterojunctions, further comprising a first heterojunction including a first organic material film wrapped around a first nanowire device, and a second heterojunction including a second organic material film wrapped around a second nanowire device,
wherein the first organic material film is different from the second organic material film so that the artificial photosynaptic device has a tunable photoconductivity, and
wherein the first organic material film is C8-BTBT, and the second organic material film is $PC_{61}BM$.

* * * * *